United States Patent [19]

Inoue et al.

[11] Patent Number: 5,546,483
[45] Date of Patent: Aug. 13, 1996

[54] INTEGRATED OPTICAL WAVEGUIDE CIRCUIT AND OPTICAL BRANCH LINE TEST SYSTEM USING THE SAME

[75] Inventors: Yasuyuki Inoue; Masao Kawachi; Katsunari Okamoto, all of Mito; Norio Takato, Katsuta; Fumihiko Yamamoto, Mito; Hiroyuki Suda, Mito; Shinichi Furukawa, Mito; Akira Morinaka, Mito, all of Japan

[73] Assignee: Nippon Telegraph and Telephone Corporation, Tokyo, Japan

[21] Appl. No.: 285,633

[22] Filed: Aug. 1, 1994

[30] Foreign Application Priority Data

Aug. 2, 1993 [JP] Japan .................................. 5-191183
Sep. 16, 1993 [JP] Japan .................................. 5-230266
Nov. 12, 1993 [JP] Japan .................................. 5-283348

[51] Int. Cl.$^6$ .............................. G02B 6/12; H04B 10/24; G01B 9/02
[52] U.S. Cl. .............................. 385/14; 385/15; 385/17; 385/18; 385/24; 385/31; 385/42; 385/43; 385/46; 385/131; 385/132; 359/113; 359/114; 359/110; 359/124; 359/125; 356/345
[58] Field of Search .............................. 385/14, 15, 17, 385/18, 24, 27, 31, 39, 42, 44, 45, 46, 129, 130, 131, 132; 359/113, 114, 115, 110, 124, 125, 143; 356/345

[56] References Cited

U.S. PATENT DOCUMENTS

| | | | |
|---|---|---|---|
| 4,911,515 | 3/1990 | So et al. | 385/24 |
| 5,064,263 | 11/1991 | Stein | 385/14 |
| 5,093,876 | 3/1992 | Henry et al. | 385/28 |
| 5,221,983 | 6/1993 | Wagner | 359/125 |
| 5,285,305 | 2/1994 | Cohen et al. | 359/110 |
| 5,321,541 | 6/1994 | Cohen | 359/127 |
| 5,414,548 | 5/1995 | Tachikawa et al. | 359/130 |

FOREIGN PATENT DOCUMENTS

| | | | |
|---|---|---|---|
| 546707 | 6/1993 | European Pat. Off. | 385/24 X |
| 613263 | 8/1994 | European Pat. Off. | 385/24 X |

OTHER PUBLICATIONS

Optics Letters, vol. 17, No. 7, Apr. 1, 1992, pp. 499–501, "Polarization–Insensitive Arrayed–Waveguide Grating Wavelength Multiplexer on Silicon", Takahashi et al.

Electronics Letters, vol. 28, No. 10, May 7, 1992, pp. 920–922, "Silicon Based Fibre Pigtailed 1 ×16 Power Splitter", Day et al.

Electronics Letters, vol. 28, No. 7, Mar. 26, 1992, pp. 644–645, "Wavelength–Insensitive 2 ×16 Optical Splitters Developed Using Planar Lightwave Circuit Technology", Hanafusa et al.

Proc. of the 5. Conf. on Optical Hybrid Access Networks '93, vol. 1, (1993), pp. 5.02.02–5.02.06, "In–Service Remote Access and Measurement Methods for Passive Double Star Networks", Yamamoto et al. (No Month of Publication).

(List continued on next page.)

*Primary Examiner*—Brian Healy
*Attorney, Agent, or Firm*—Spencer & Frank

[57] ABSTRACT

An integrated optical waveguide circuit includes a substrate; an optical wavelength multiplexer and an optical power splitter formed on a same surface of the substrate. The optical wavelength multiplexer is composed of a first slab optical waveguide, a second slab optical waveguide, a single or a plurality of input optical waveguides connected to the first slab optical waveguide at one end of the first slab optical waveguide, a plurality of arrayed optical waveguides arranged in parallel and having different lengths and connected to the first slab optical waveguide and the second slab optical waveguide, and a plurality of output optical waveguides arranged in parallel and connected to the second slab optical waveguide. The optical power splitter is composed of the second slab optical waveguide, one or more input optical waveguides, and the plurality of output optical waveguides arranged in parallel and connected to the second slab optical waveguide.

19 Claims, 50 Drawing Sheets

OTHER PUBLICATIONS

NTT Review, vol. 4, No. 6, Nov. 1992, pp. 92–96, "Integrated Optical Circuit Technologies", Yoshida et al.

"Efficient Multichannel Integrated . . . Coupler on Silicon" C. Dragone et al., IEEE Photonics Technology Letters, vol. 1, No. 8, Aug., 1989, pp. 241–243.

"Arrayed–Waveguide Grating . . . With Nanometre Resolution" H. Takahashi et al., Electronics Letters, vol. 26, No. 2 Jan., 1990, pp. 87–88.

"Four–Channel Integrated–Optic . . . Polarization Dependence", Arjen R. Vellekoop et al., Journal of Lightwave Tech., vol. 9, No. 2, Mar., 1991, pp. 310–314.

"Silicon Based Fibre Pigtailed 1×16 Power Splitter", S. Day et al., Electronics Letters, vol. 28, No. 10, May, 1992, pp. 920–922.

"In–Service Remote Access . . . Passive Double Star Networks" Fumihiko Yamamoto et al., 5th Conference on Optical Hybrid Access Networks, 1993, pp. 5.02.01–06.

"Silica–Based Optical . . . to Integrated–Optic Devices", Masao Kawachi, Kogaku, vol. 18, pp. 681–686, 1989.

"Silica Waveguides . . . To Integrated–Optic Components", Masao Kawachi, Optical and Quantum Electronics, vol. 22, 1990, pp. 391–416.

"Polarization Mode Converter . . . Planar Lightwave Circuits" Y. Inoue et al., IEEE Photonics Technology Letters, vol. 6, No. 5, May, 1994, pp. 626–628.

INTEGRATED OPTICAL WAVEGUIDE CIRCUIT AND OPTICAL BRANCH LINE TEST SYSTEM USING THE SAME

BACKGROUND OF THE INVENTION

1. Field of the Invention

The present invention relates to integrated optical waveguide circuits used in optical components for optical communications and optical information processing, more specifically to an integrated optical waveguide comprising an optical power splitter integrated with an arrayed-waveguide grating wavelength multiplexer, and an optical line test system for testing individual optical lines using the integrated optical circuit in a passive double star (PDS) system for branching an optical line using only passive optical components.

2. Description of the Prior Art

Recently, with the advance in an optical communication system and with the aim of expanding application of the optical communication system, various types of optical waveguide circuit components have been developed. In particular, a planar lightwave circuit comprising glass waveguides formed on a silicon substrate is drawing attention as a practical optical component for its reduced optical loss. A typical circuit of this kind is an arrayed-waveguide grating wavelength multiplexer, which is disclosed in H. Takahashi, K. Kato, and I. Nishi, "Arrayed-Waveguide grating for wavelength division multi/demultiplexer with nanometer resolution," Electron. Lett., vol. 26, pp. 87–88, 1990 and A. R. Vellekoop and M. K. Smit, "Four-Channel Integrated-Optic Wavelength Demultiplexer with Weak Polarization Dependence", J. Lightwave Technol. vol. 9, pp. 310–314 (1991). Further, as an example of an optical power splitter, one which uses light diffraction in a slab optical waveguide is disclosed in S. Day, E. Bellerby, G. Cannel, and M. Grant, "Silicon based fiber pigtailed 1×16 splitter," Electron. Lett., vol. 28, pp. 920–922, 1992, and an N×M splitter is described in C. Dragone et al. "Efficient Multichannel Integrated Optics Star Coupler on Silicon", IEEE Photonic Tech. Lett. vol. 1, pp. 241–243 (1989).

Construction of an arrayed-waveguide grating wavelength multiplexer is shown in FIG. 1. The arrayed-waveguide grating wavelength multiplexer comprises a plurality of input optical waveguides 301 formed on a substrate 1, a slab optical waveguide 401 for demultiplexing the light to the plurality of waveguides, a plurality of arrayed-waveguides (i.e., an array of waveguides) 302 with different lengths disposed after the slab optical waveguide 401, and slab optical waveguides 402 for making interference of light emitted from the arrayed-waveguides 302, and a plurality of output optical waveguides 308.

The arrayed-waveguide grating wavelength multiplexer has a function to demultiplex light input from an optical waveguide according to the wavelength of the light, and output the demultiplexed light to the individual output optical waveguides. Further, it is also possible to multiplex light of a different wavelength by reversing the input side and the output side. Such a function to select the destination of light in accordance with the wavelength of the incident light is referred to as a wavelength routing function. Such a wavelength multiplexing/demultiplexing function is very effective for wavelength multiplexing or routing using the optical wavelength in the optical communication system.

Further, construction of an N×M star coupler type optical power splitter is shown in FIG. 2. In the N×M star coupler type optical power splitter, light incident from any one of N input optical waveguides 304 is distributed to the individual M output optical waveguides 309 independent of the wavelength. Therefore, this device is important in a system requiring demultiplexing of light to a number of lines. The device comprises a plurality of input optical waveguides 304, slab optical waveguides 406 for developing light confined in the channel waveguide, and output optical waveguides 309 for receiving and outputting the developed light.

In short, the arrayed-waveguide grating selects an output optical waveguide in accordance with the wavelength of input light. On the other hand, the star coupler type power splitter distributes input light to individual output optical waveguides independent of wavelength of the light.

As described above, there have been present a wavelength multiplexer having wavelength routing function for selecting an output optical waveguide depending on the wavelength of input light, and an optical power splitter having an optical power splitter function for distributing light to all output optical waveguides independent of the wavelength of input light. Therefore, if an optical integrated circuit having both of wavelength routing function and the optical power splitter function is achieved, such a device can be widely utilized in a PDS test system and other optical communication systems. However, an optical integrated circuit having both functions has not been known in the past.

An optical communication system using an optical fiber and other optical lines uses an optical pulse line test system (OTDR: Optical Time Domain Reflectometer) for detecting a breakage of the optical line and determining the broken position. The optical pulse line test system utilizes that when light transmits in an optical line, a Rayleigh backscatter of the same wavelength generates and transmits in the reverse direction. That is, when an optical pulse (test light) is input to the optical line, Rayleigh backscatter of the same wavelength as the optical pulse continues to generate until the optical pulse reaches the broken point, and output from the input surface of the optical pulse. The broken position in the optical line can be determined by measuring the duration time of the Rayleigh backscatter.

There is an optical branch line (PDS) system as one of optical subscriber systems, construction of which is shown in FIG. 3A. In the optical branch line system, an optical signal transmitting station 10a is provided with an optical signal transmitter 11 and an optical power splitter 12, and N units of optical lines 13 are connected in a star form centering around the optical signal transmitting station 13. Further, an optical power splitter 14a is connected to the tip of each optical line 13, each optical power splitter 14a is connected with M units of optical lines 15 in a star form, and a terminal 16 is connected to the tip of each optical line 15.

In the Figure, only one system is shown after the optical power splitter 14a which is out of the optical signal transmitting station 10a. A system in which the optical power splitter 14a is formed only of passive optical components to ensure high reliability is referred particularly to as an optical branch line system.

Construction of the optical power splitter 14a is shown in FIG. 3B. The optical power splitter 14a combines 4 stages of Y branches to achieve 16 branches. The Y branch has a branch loss of 3 dB in the going way, and light distributed to one of 16-branched optical lines 15 in principle has a branch loss of 12 dB. Further, the Y branch also has a radiation loss of 3 dB in the returning way, and light from one optical line 15 through each Y branch to the optical line 13 is theoretically subject to a 12 dB loss.

The optical branch line system can distribute signal light to a relatively large number of terminals 16 using a fewer number of optical lines. However, test for breakage of the individual lines 15 branched by the optical power splitter 14a is an important problem. That is, a conventional optical line test system using an optical pulse line test device is effective with only a single optical line, and cannot be applied to the optical branch line system. This is because test light is evenly distributed to the individual optical lines 15 branched by the optical power splitter 14a, and it is impossible to determine which optical line is broken.

There has been proposed a method in which, to distinguish the broken line after branching, specific wavelengths are allocated to the individual optical lines, and the optical pulse line test device can change over the wavelength of the test light to select an optical line to be individually tested (F. Yamamoto, I. Sankawa, S. Furukawa, Y. Koyamada, N. Takato, "In-Service Remote Access and Measurement Methods for Passive Double Star Networks", in 5th Conference on Optical Hybrid Access Networks (Montreal 1993), pp. 5.02.01–5.02.06). Construction of the optical branch line test system is shown in FIGS. 4A and 4B. FIG. 4A is a schematic view showing the entire structure, and FIG. 4B shows construction of an optical power splitter 14b. Similar components to those used in the optical branch line system shown in FIGS. 3A and 3B have similar reference symbols.

An optical signal transmitting station 10b comprises an optical pulse line test device (OTDR) 21a, a space switch (SW) 22, and an optical coupler 23 individually provided in the individual optical lines 13 branched by the optical power splitter 12. An optical line 24 for test light is disposed between the optical pulse line test device 21a and the optical power splitter 14b through the space switch 22. The PDS test system makes tests in two steps, a test of the optical line 13 from the optical signal transmitting station 10b to the optical power splitter 14b, and a test of the optical line 15 from the optical power splitter 14b to each terminal 16.

Test of the optical line 13 from the optical signal transmitting station 10b to the optical power splitter 14b is achieved by coupling the test light transmitted from the optical pulse line test device 21a to the optical line 13 by the optical coupler 23. Here, in order to test a plurality of optical lines 13 by a single optical pulse line test device 21a, connection of the optical pulse line test device 21a with the individual optical lines 13 is selected over time using the space switch 22, thereby testing the individual optical lines 13 in time share.

Test of the optical line 15 from the optical power splitter 14b to the individual terminals 16 is achieved by taking in the test light transmitted from the optical pulse line test device 21a to the optical power splitter 14b through the space switch 22 and the optical line 24, thereby testing individually the optical lines 15. That is, test light taken in the optical power splitter 14b is first split into four lines and input to wavelength filters $25_1$ to $25_4$ which individually pass light of a predetermined wavelength. Here, test light set to a predetermined wavelength is output from the corresponding wavelength filter. On the other hand, signal light input from the optical line 13 is split into 16 lines by repeated halving, and 2-input 2-output 3 dB couplers $26_1$ to $26_4$ are disposed at a point from four-split to eight-split, where test light output from the individual wavelength filters are multiplexed. This thereby enables testing of a designated optical line corresponding to the wavelength of test light.

Since, in the construction shown in FIG. 4B, test light coupled with the 3 dB coupler 26 is two-split, and further two-split in the next Y branch, four optical lines 15 are tested at a time. This is because selection wavelengths of the wavelength filters 25 cannot be arranged closely. Even though the test light is 16-split to select each wavelength, in the step of coupling with each optical line 15, the test light is subjected to a loss of 15 dB (12 dB by 16-split and 3 dB by the optical coupler), and as a result a loss of Rayleigh backscatter reaches 30 dB inclusive of loss of the test light.

Also, in the construction shown in FIGS. 4A and 4B, test light is finally subject to a 12 dB loss (6 dB by the first 4-split, 3 dB by the 3 dB coupler, and 3 dB by the next Y branch), and the loss of Rayleigh backscatter reaches 24 dB inclusive of the loss of the test light. Further, in practice, there are an optical line loss and a wavelength filter insertion loss, and the total loss is a very high value including these losses.

As described above, the conventional PDS test system splits the test light, and each of the split test light is selected by the wavelength filter to be coupled to the optical line (multiplexed to the split signal light). Thus, the test system is inevitably subject to a substantial loss. Therefore, it has been very difficult to test each optical line 15 after the optical power splitter 14b. Further, when a plurality of optical lines 15 are totally tested, since test light is evenly distributed to the individual optical lines and thus has a very small power, test is very difficult depending on the scale of the branch.

SUMMARY OF THE INVENTION

A primary object of the present invention is to provide an integrated optical waveguide circuit having both a wavelength routing function and an optical power splitting function, that is, a new combined function that light incident from an input port is distributed to individual output optical waveguides independent of the wavelength of light, and light incident from another input port is output from a specific output optical waveguide in dependence on the wavelength.

Another object of the present invention is to provide a PDS test system which changes over the wavelength of test light in an optical pulse line test device to select an optical line to be tested, thereby enabling individual test of each branched optical line while minimizing loss of test light.

A further object of the present invention is to provide a system which, in optical branch lines, achieves line identification by inputting test light from the individual branch lines towards the optical power splitter and checking the return light intensity.

A further object of the present invention is to provide an optical communication system which, in an optical communication system comprising a central station and a plurality of terminals, simultaneously achieves a 1×N broadcasting type communication from the central station to the terminals and 1 to 1 communication between the central station and a terminal or between the terminals.

According to a first aspect of the present invention, there is provided an integrated optical waveguide circuit comprising:

a substrate;

an optical wavelength multiplexer formed on a surface of the substrate and composed of a first slab optical waveguide, a second slab optical waveguide, a single or a plurality of input optical waveguides connected to the first slab optical waveguide at one end of the first slab optical waveguide, a plurality of arrayed optical waveguides arranged in parallel and having different lengths and connected to the first slab optical waveguide and the second slab optical waveguide, and a plurality of output optical waveguides arranged in parallel and connected to the second slab optical waveguide; and an optical power splitter formed on the surface of the substrate and composed of the second slab optical waveguide, means for inputting light to the second slab optical waveguide, and the plurality of output optical waveguides arranged in parallel and connected to the second slab optical waveguide.

Here, the integrated optical waveguide circuit may further comprise; another optical power splitter formed on the surface of the substrate and composed of the first slab optical waveguide, a single or a plurality of input optical waveguides connected to the first slab optical waveguide at another end of the first slab optical waveguide, and the optical waveguides connected to the first slab optical waveguide at the one end of the first slab optical waveguide, as output optical waveguides.

The means for inputting light to the second slab optical waveguide may be a single or a plurality of input optical waveguides.

The means for inputting light to the second slab optical waveguide may be an optical fiber and the optical fiber may be inserted in a groove formed on a surface of the second slab optical waveguide.

A wavelength filter may be provided in the second slab optical waveguide.

According to a second aspect of the present invention, there is provided an integrated optical waveguide circuit comprising:

a substrate;

an optical wavelength multiplexer formed on a surface of the substrate and composed of a first slab optical waveguide, a second slab optical waveguide, a third slab optical waveguide, means for inputting light to the first and second slab optical waveguides, a first arrayed optical waveguides arranged in parallel and having different lengths, a second arrayed optical waveguides arranged in parallel and having different lengths, the first slab optical waveguide being connected to the third slab optical waveguide via the first arrayed optical waveguides and the second slab optical waveguide being connected to the third slab optical waveguide via the second arrayed optical waveguides, and a plurality of output optical waveguides arranged in parallel and connected to the third slab optical waveguide; and an optical power splitter formed on the surface of the substrate and composed of the third slab optical waveguide, an input optical waveguide formed between the first arrayed optical waveguides and the second arrayed optical waveguides and connected to the third slab optical waveguide, and the plurality of output optical waveguides arranged in parallel and connected to the third slab optical waveguide.

Here, the means for inputting light to the first and second slab optical waveguides may be composed of an input optical waveguide and a Y-branch for branching the input optical waveguide to two branched optical waveguides, branched optical waveguides being connected to the first and second slab optical waveguides respectively, and thermo-optic phase shifters formed on respective branched optical waveguides.

The means for inputting light to the first and second slab optical waveguides may be composed of a plurality of input optical waveguides, a Mach-Zehnder interferometer for separating light to introduce into the input optical waveguide of the optical power splitter and a Y-branch, the Y-branch branches the input optical waveguide to two branched optical waveguides, branched optical waveguides being connected to the first and second slab optical waveguides respectively, and thermo-optic phase shifters formed on respective branched optical waveguides.

According to a third aspect of the present invention, there is provided an integrated optical waveguide circuit comprising:

a substrate;

an optical wavelength multiplexer formed on a surface of the substrate and composed of a single or a plurality of input/output optical waveguides arranged in parallel, a slab optical waveguide connected to the input/output optical waveguide(s), a plurality of arrayed optical waveguides arranged in parallel and having different lengths and connected to the slab optical waveguide, and a mirror being provided at an end of the arrayed optical waveguide and reflecting light of a specific wavelength; and an optical power splitter formed on the surface of the substrate and composed of the slab optical waveguide, a single or a plurality of input waveguides arranged in parallel and connected to the slab optical waveguide, and the input/output optical waveguides as an output optical waveguides.

Here, angle of the input optical waveguide of the optical power splitter at a substrate end face may be not 90°; and angle of the arrayed optical waveguide of the optical wavelength multiplexer other than the input optical waveguide of the optical power splitter is 90°.

A groove may be provided in the arrayed optical waveguide of the optical wavelength multiplexer, the groove may be perpendicular or nearly perpendicular to the substrate, and a waveplate may be inserted in the groove so that its optical principal axis is inclined by 45° to the substrate.

The groove may be provided in the vicinity of substrate end face of the arrayed optical waveguide; and the waveplate may be a quarter waveplate for the wavelength used in the optical wavelength multiplexer.

The waveplate may be a half waveplate for the wavelength used in the optical wavelength multiplexer.

At least one end face of the output optical waveguide of the optical power splitter may be optical reflection treated.

According to a fourth aspect of the present invention, there is provided an optical distribution line test system comprising:

an optical line test device for inputting test light to individual optical lines branched by an optical splitter formed only using passive optical components;

wherein the optical splitter is a optical power splitter with wavelength router composed of an optical wavelength multiplexer and an optical power splitter formed on a surface of a substrate, and the optical line test device includes a wavelength variable light source and means for selecting an optical line to be tested by changing over the wavelength of the test light.

Here, the optical power splitter with wavelength router may comprise:

a substrate;

an optical wavelength multiplexer formed on a surface of the substrate and composed of a first slab optical waveguide, a second slab optical waveguide, a single or a plurality of input optical waveguides connected to the first slab optical waveguide at one end of the first slab optical waveguide, a plurality of arrayed optical waveguides arranged in parallel and having different lengths and connected to the first slab optical waveguide and the second slab optical waveguide, and a plurality of output optical waveguides arranged in parallel and connected to the second slab optical waveguide; and an optical power splitter formed on the surface of the substrate and composed of the second slab optical waveguide, means for inputting light to the second slab optical waveguide, and the plurality of output optical waveguides arranged in parallel and connected to the second slab optical waveguide.

The optical power splitter with wavelength router may comprise:

a substrate;

an optical wavelength multiplexer formed on a surface of the substrate and composed of a single or a plurality of input/output optical waveguides arranged in parallel, a slab optical waveguide connected to the input/output optical waveguide(s), a plurality of arrayed optical waveguides arranged in parallel and having different lengths and connected to the slab optical waveguide, and a mirror being provided at an end of the arrayed optical waveguide and reflecting light of a specific wavelength; and an optical power splitter formed on the surface of the substrate and composed of the slab optical waveguide, a single or a plurality of input waveguides arranged in parallel and connected to the slab optical waveguide, and the input/output optical waveguides as an output optical waveguides.

A groove may be provided in the arrayed optical waveguide of the optical wavelength multiplexer; the groove may be perpendicular or nearly perpendicular to the substrate, a waveplate may be inserted in the groove so that its optical principal axis is inclined by 45° to the substrate; the groove may be provided in the vicinity of a substrate end face of the arrayed optical waveguide; the waveplate may be a quarter waveplate for the wavelength used in the optical wavelength multiplexer; and the optical line test device may include means for sweeping wavelength of the wavelength variable light source in a predetermined range to detect a return light intensity, and setting wavelength of test light with respect to a wavelength of the strongest return light intensity. The wavelength variable light source may comprise an optical amplifier, a 1×N switch, and a second optical wavelength multiplexer, connected in a ring form; and the second optical wavelength multiplexer may comprise a single or a plurality of input waveguides arranged in parallel, a first slab optical waveguide, a plurality of arrayed optical waveguides arranged in parallel and having different lengths, a second slab optical waveguide, and a plurality of output optical waveguides arranged in parallel, being connected in series.

According to a fifth aspect of the present invention, there is provided PDS test system for line identification of individual optical lines branched by an optical splitter formed only of passive optical components comprising:

means for inputting test light from individual distribution lines to the optical splitter;

means for varying wavelength of the test light within a predetermined range;

means for measuring a return light intensity to test the individual optical lines;

wherein the optical splitter is a optical power splitter with wavelength router composed of an optical wavelength multiplexer and an optical power splitter formed on a surface of a substrate.

Here, the wavelength variable light source may comprise an optical amplifier, a 1×N switch, and a second optical wavelength multiplexer, connected in a ring form; and the second optical wavelength multiplexer may comprise a single or a plurality of input waveguides arranged in parallel, a first slab optical waveguide, a plurality of arrayed optical waveguides arranged in parallel and having different lengths, a second slab optical waveguide, and a plurality of output optical waveguides arranged in parallel, being connected in series.

According to a sixth aspect of the present invention, there is provided an optical communication system comprising:

a single or a plurality of central stations;

a plurality of terminals;

an optical splitter; and optical fibers for connecting the central station and the optical splitter, and the optical splitter and the plurality of terminals;

wherein the optical splitter is a optical power splitter with wavelength router composed of an optical wavelength multiplexer and an optical power splitter formed on a surface of a substrate.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The present invention will be described in detail with reference to the embodiments.

[ Integrated optical waveguide circuit]

Embodiment 1

Figure 5:
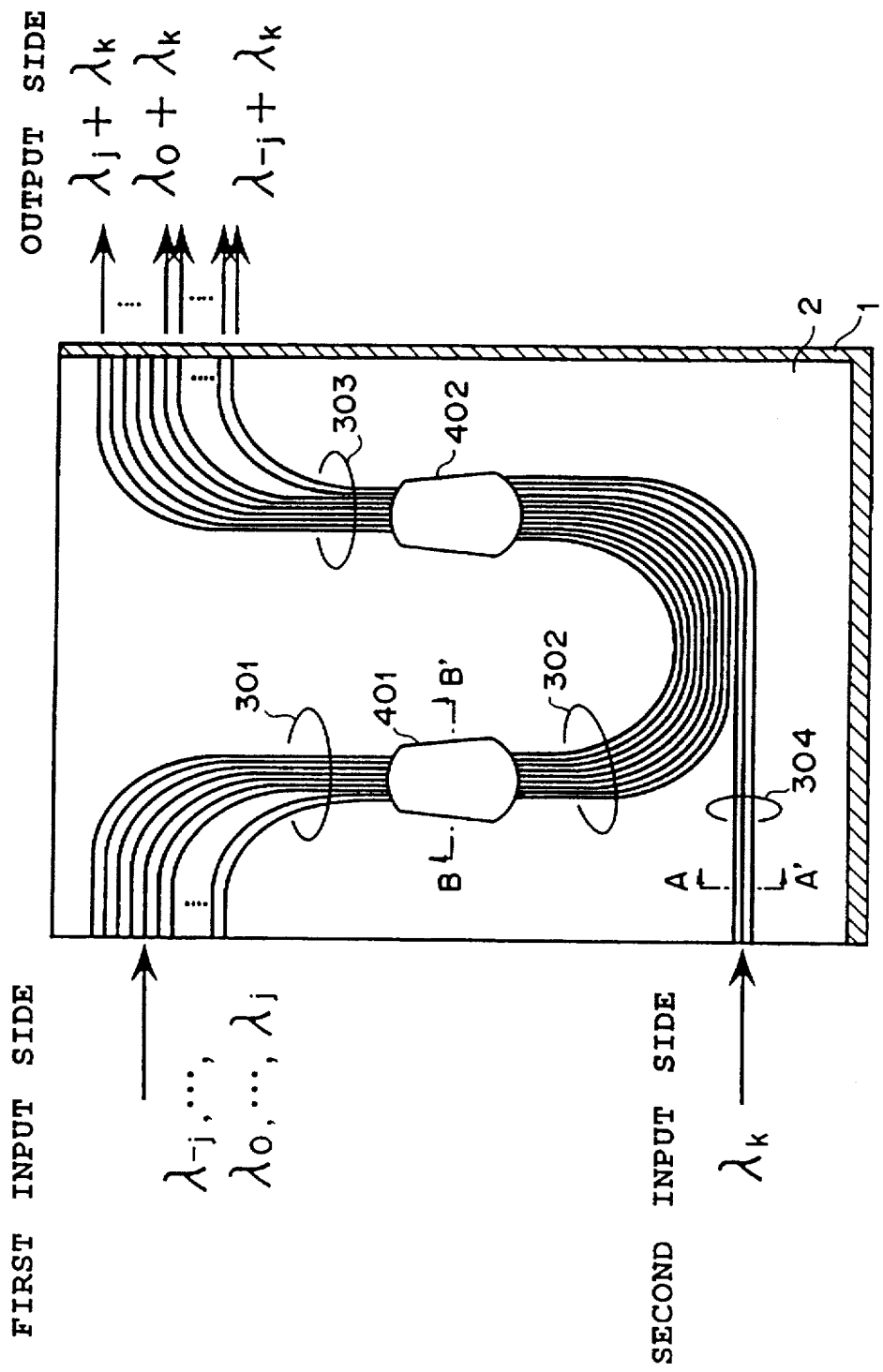
FIG. 5 is a schematic plan view showing a first embodiment of the optical power splitter with a wavelength routing function of the present invention.

FIG. 5 is a schematic plan view showing a first embodiment of the optical power splitter with optical wavelength routing function, that is, the integrated optical waveguide circuit integrated with an optical wavelength multiplexer and an optical power splitter of the present invention.

Figure 6:
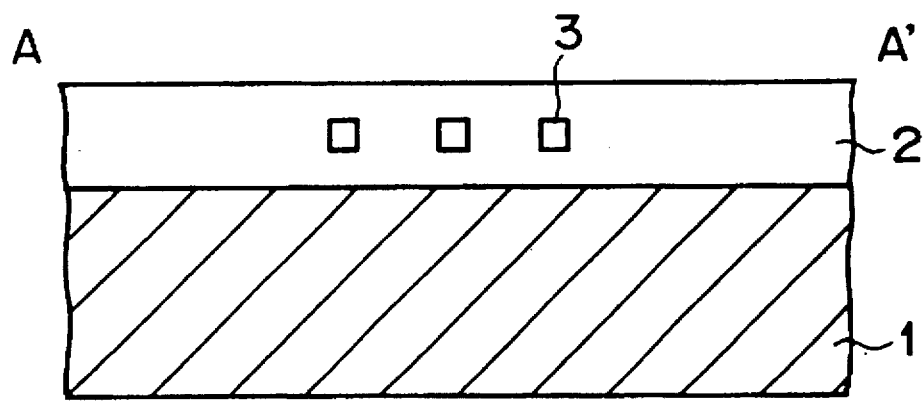
FIG. 6 is a schematic enlarged cross sectional view taken along line AA' in FIG. 5.
Figure 7:
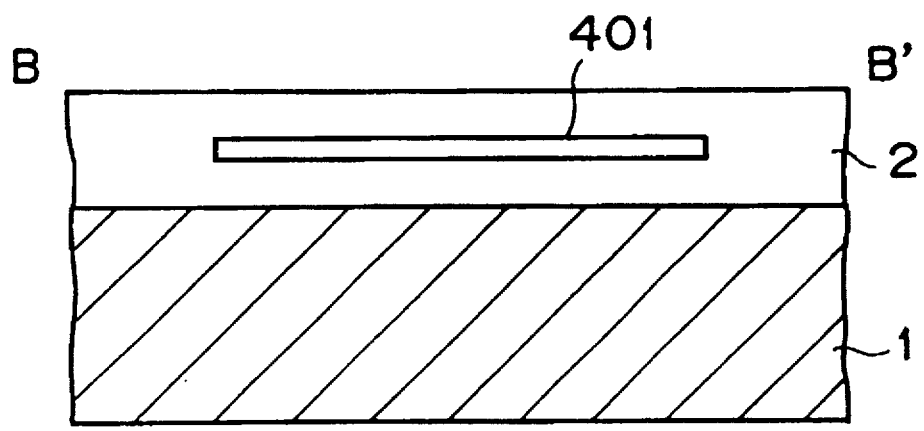
FIG. 7 is a schematic enlarged cross sectional view taken along line BB' in FIG. 5.
Figure 8:
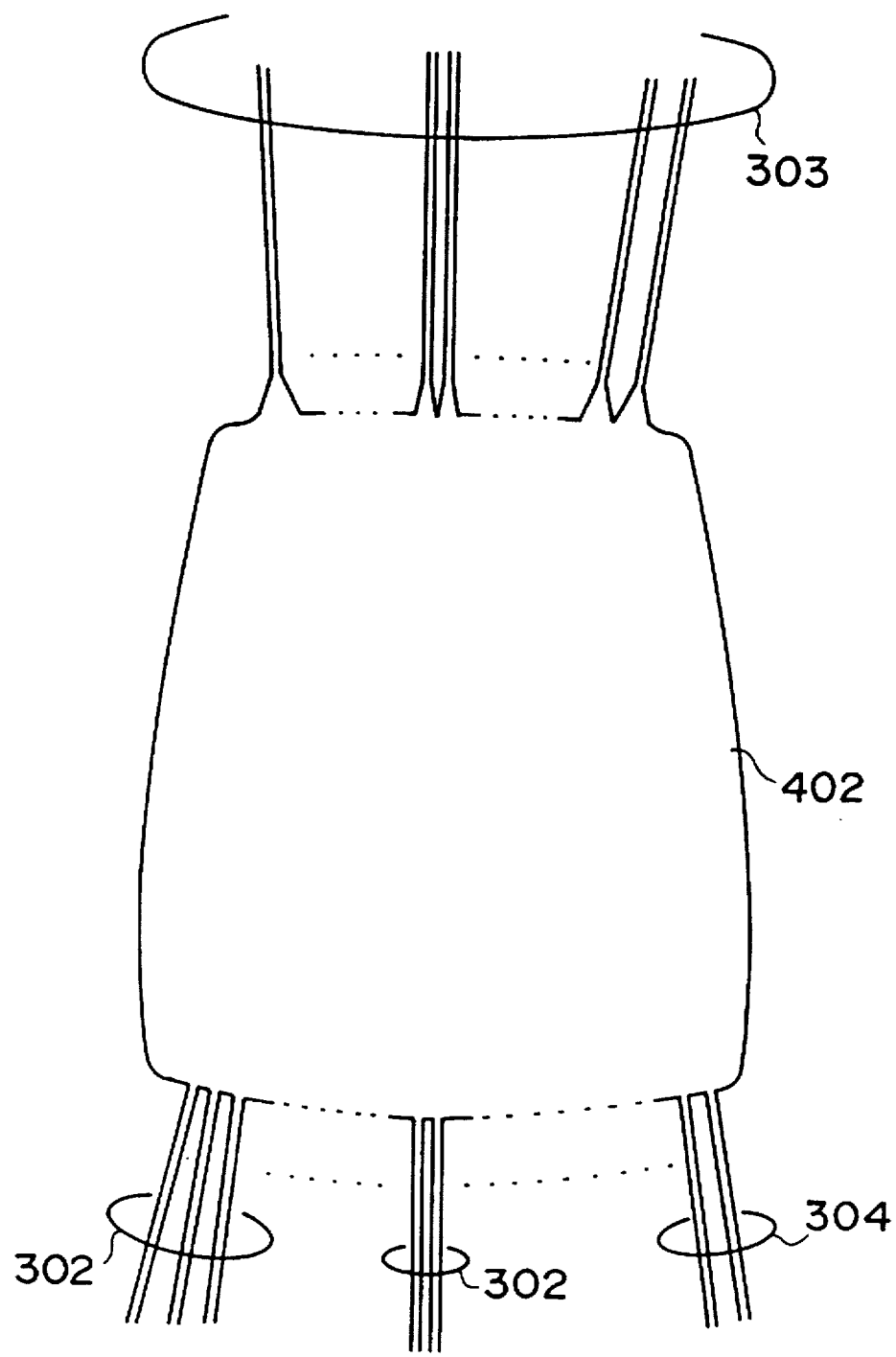
FIG. 8 is a schematic enlarged view showing an interface between an output waveguide and a slab waveguide of the arrayed-waveguide grating in FIG. 5.

FIG. 6 is a schematic enlarged cross sectional view of the integrated optical waveguide circuit shown in FIG. 5 taken along line AA', and FIG. 7 is a schematic enlarged cross sectional view of the integrated optical waveguide circuit shown in FIG. 5 taken along line BB'.

One or more input optical waveguides 301 of an arrayed-waveguide grating multiplexer, an arrayed optical waveguide (also referred to herein as an array of optical waveguides) 302 of the arrayed-waveguide grating multiplexer comprising a plurality of optical waveguides with different lengths arranged in parallel, output optical waveguides 303 of the arrayed-waveguide grating multiplexer and an optical power splitter, an input optical waveguides 304 of the optical power splitter, and slab optical waveguides 401 and 402 are formed on a substrate 1. An optical wavelength multiplexer is composed of the input optical waveguide(s) 301, the slab optical waveguide 401, the arrayed optical waveguide 302, the slab optical waveguide 402 and the output optical waveguides 303, and an optical power splitter is composed of the input optical waveguide 304, the slab optical waveguide 402 and the output optical waveguides 303.

As shown in FIGS. 6 and 7, a core 3 of the optical waveguides 301 to 303 and the slab optical waveguides 401 and 402 is covered with a cladding layer 2.

The arrayed-waveguide grating multiplexer is integrated with the splitter having the output side slab optical waveguide 402 and the output optical waveguide 303 which are held by the wavelength multiplexer and the optical power splitter in common. Light of wavelength $\lambda_k$ incident from the input optical waveguide 304 of the optical power splitter is split to the individual output optical waveguides 303 in a constant ratio or in an appropriate power ratio. On the other hand, since the arrayed optical waveguides 302 of the arrayed-waveguide grating multiplexer differ in the length, the optical wave front is inclined, and the inclination of the optical wave front varies with the wavelength, when the wavelength is varied, light is output to a different output optical waveguide of the output optical waveguides 303. Thus, the arrayed-waveguide grating functions as wavelength multiplexer/demultiplexer. That is, for example, light of wavelengths $\lambda_{-j}, \ldots, \lambda_j$ are multiplexed and input to one input optical waveguide 301 of the arrayed-waveguide grating, since the arrayed-waveguide grating has a wavelength routing function, light of different wavelengths are demultiplexed and output to the output optical waveguides 303.

An optical waveguide was formed on a silicon substrate to obtain a circuit shown in FIG. 5. The formation method is described in detail in M. Kawachi, "Silica-Based Optical Waveguide and Their Application to Integrated-Optic Devices" KOGAKU, vol. 18, pp. 681–686, 1989 and in M. Kawachi, "Silica Waveguides on Silicon and Their Application to Integrated-Optics Components," Optical and Quantum Electronics, vol 22, pp. 391–416, 1990. Specifically, a glass layer was formed on the silicon substrate by a flame hydrolysis deposition method, which was etched by a photolithography and reactive ion etching to a desired pattern to obtain a circuit shown in FIG. 5. The core size was 7 µm square, and difference in diffractive index between the core and the clad was 0.75%. Eight units of the output optical waveguides 303 were formed. In this case, the optical waveguides were designed so that the optical insertion loss of the optical power splitter is the smallest, and the split ratio between the output optical waveguides is constant. That is, light incident from the input optical waveguide 304 of the optical power splitter to the slab optical waveguide 402 spreads in accordance with the Gaussian distribution. To split the light to the output optical waveguides 303, a portion contacting the slab optical waveguide 402 side of the output optical waveguide 303 was formed as a horn-shaped taper, narrow in width at the center and wide in the periphery.

Figure 9:
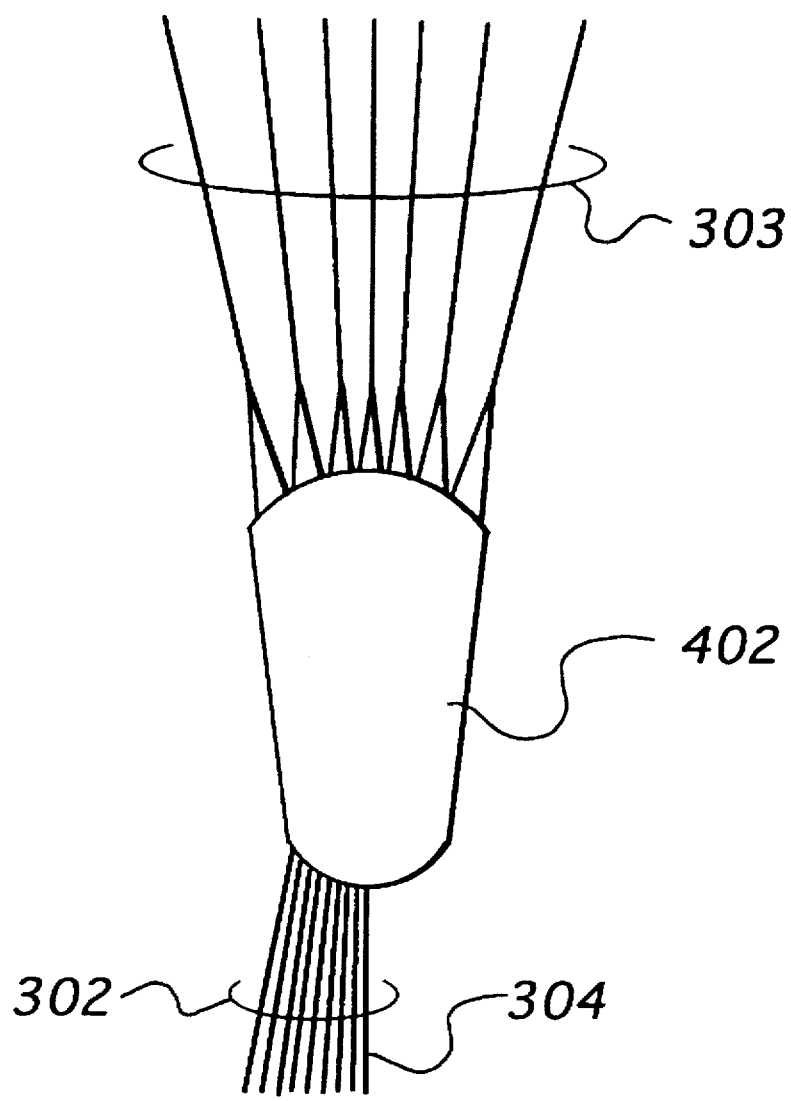
FIG. 9 is a schematic enlarged view in the vicinity of the output side slab waveguide.
Figure 10:
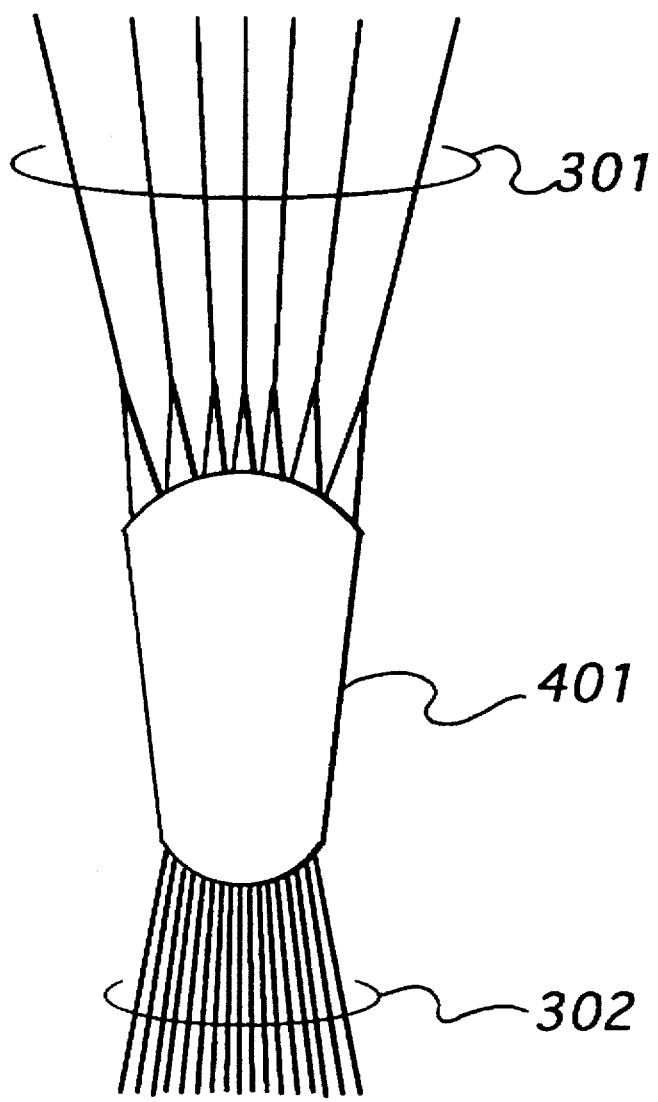
FIG. 10 is a schematic enlarged view in the vicinity of the input side slab waveguide.
Figure 11:
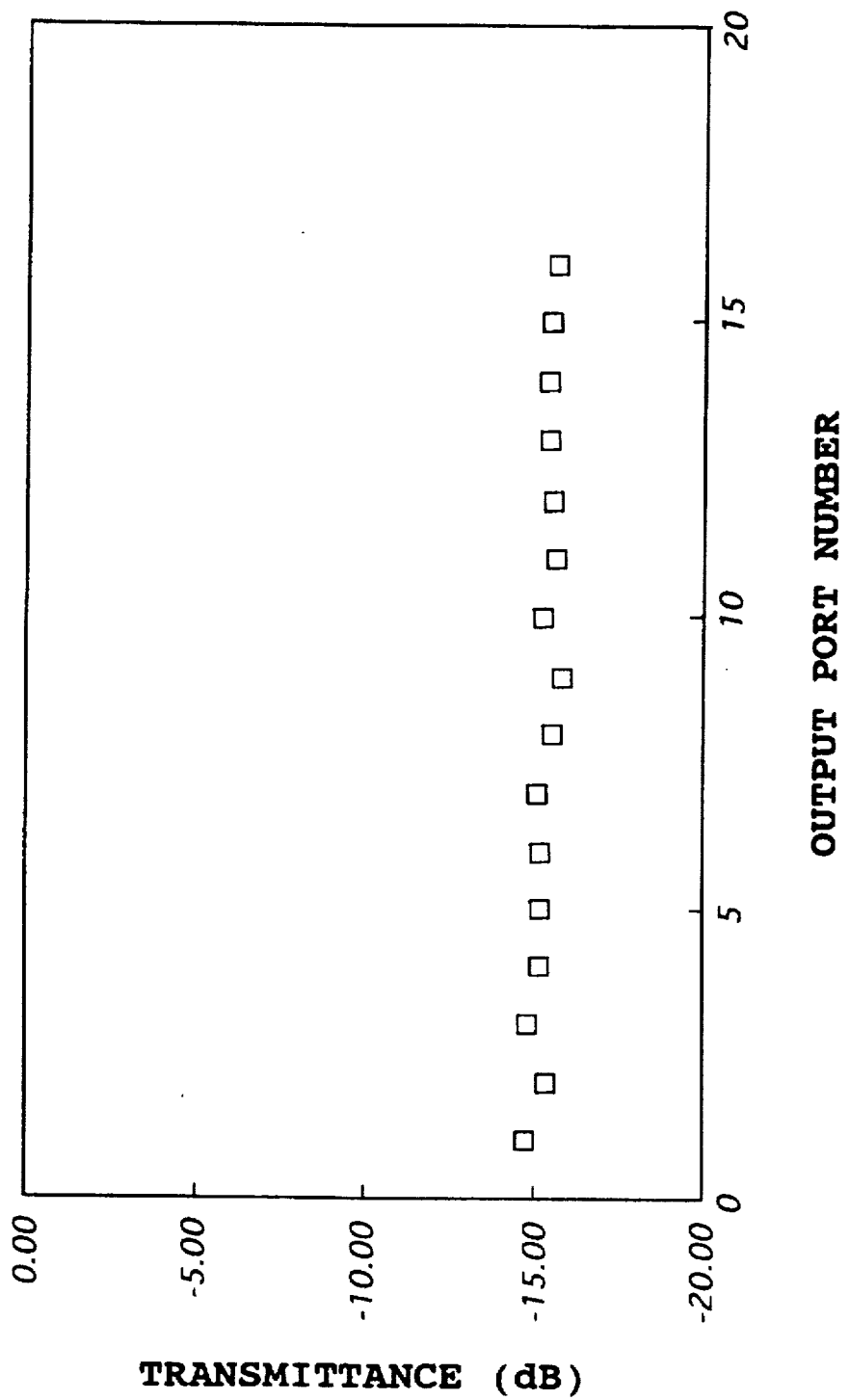
FIG. 11 is a diagram showing an insertion characteristic of the optical power splitter.
Figure 12:
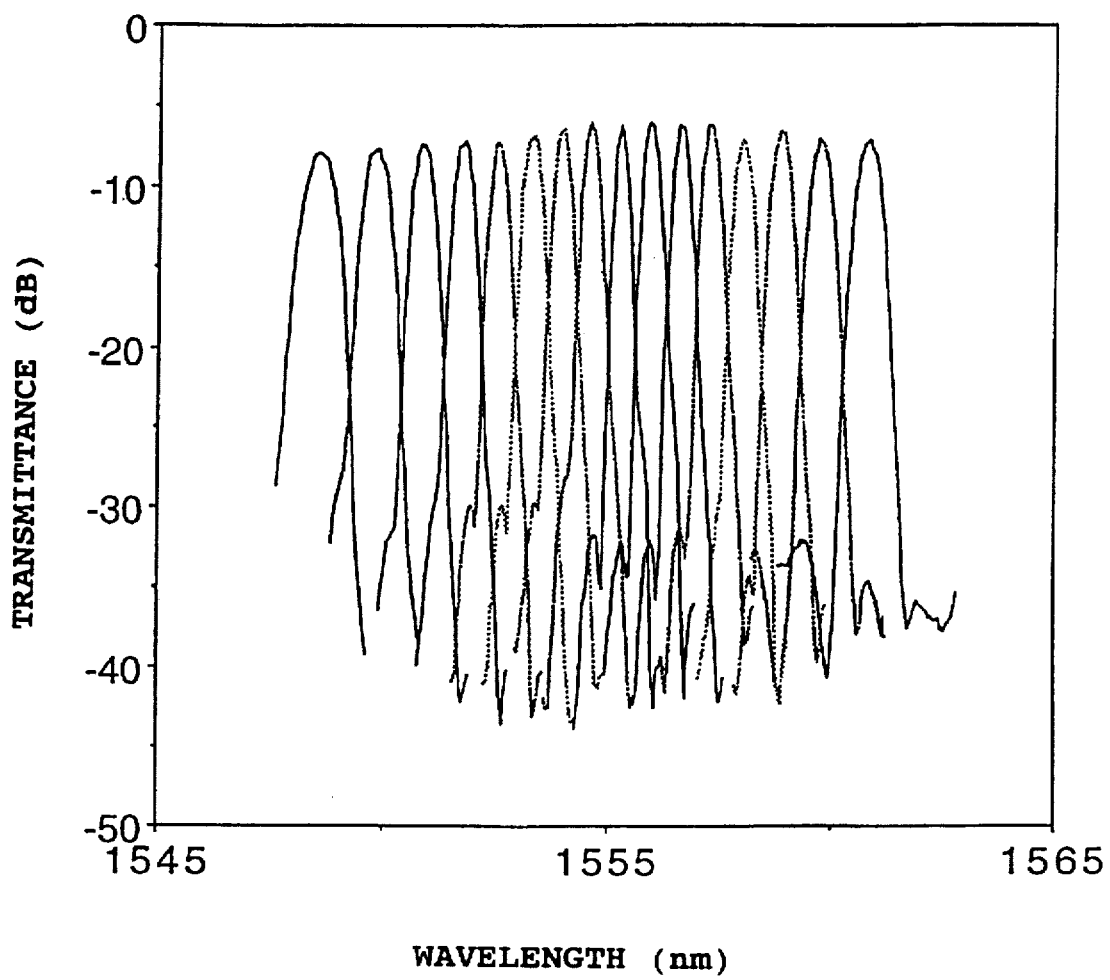
FIG. 12 is a diagram showing an insertion characteristic of the arrayed-waveguide grating.

Further, assuming that light output from the input waveguide 304 to the slab waveguide 402 distributes according to the Gaussian distribution, taper widths of the individual output waveguides 303 were set so that 80% of the light was received by the output waveguides. Further, the output waveguides 303 were radially disposed around the portion of the input waveguide 304 of the optical power splitter contacting the slab waveguide 402, and the arrayed-waveguide 302 was disposed at the side of the input waveguide 304. FIG. 9 is an enlarged view of the output side slab waveguide 402, and FIG. 10 is an enlarged view of the input side slab waveguide 401. The arrayed-waveguide grating was designed so that 16 units each of the input waveguides 302 and the output waveguides 303 were used, the slab waveguides 401 and 402 had a focal length of 9381 µm, optical path difference between adjacent arrayed-waveguides was 91.5 µm, number of the arrayed-waveguides 302 was 100, diffraction order was 59, and wavelength when the grating is used as a wavelength multiplexer was 1.55 µm. FIG. 11 shows transmittance of an actually manufactured optical power splitter, and FIG. 12 shows transmittance of the individual output waveguides 303 versus wavelength when light is incident from the input waveguide 304 at the center of the arrayed-waveguide grating. The transmittance and the insertion loss are the reverse in the sign. From FIG. 11, it can be seen that the excessive loss subtracted by the theoretical split loss 12 dB when 16-split is about 3 dB. From the wavelength multiplexing/demultiplexing characteristics of FIG. 12, it is seen that the insertion loss at the maximum transmission wavelength of the individual output waveguides of the arrayed-waveguide grating is about 7 dB. This value is greater than arrayed-waveguide grating wavelength multiplexers reported in the past. This is because the portion of the output waveguide contacting the output side slab waveguide is disposed to minimize the loss of the optical power splitter. That is, the output waveguides 303 are radially disposed about the portion that the input waveguide for the optical power splitter contacts to the slab waveguide 402, and the arrayed-waveguide 302 is disposed at the side of the input waveguide 304. As shown in FIG. 12, the central wavelength interval (channel interval) of light transmitting to the individual output waveguides is narrow in the output waveguide in the vicinity of the center, and wide in the output waveguides of both ends. This corresponds to the fact that the output waveguides are disposed so that the taper width is narrow in the vicinity of the center, and wide at both ends.

In the optical power splitter of the present embodiment, a circuit which utilizes the taper width of the output waveguides to make the split ratio constant for design simplicity. However, alternatively, one which utilizes coupling between a plurality of input waveguides incident to the slab waveguides to make the taper width of the output waveguides constant can also be used. This is shown in detail in C. Dragone, C. Henry, I. P. Kaminow, and R. C. Kistler, "Efficient Multichannel Integrated Optics Star Coupler on Silicon," IEEE Poton. Technol. Lett., vol. 1, pp. 241–243, 1989. However, this case requires use of optical coupling between input waveguides of the optical power splitter.

Figure 13:
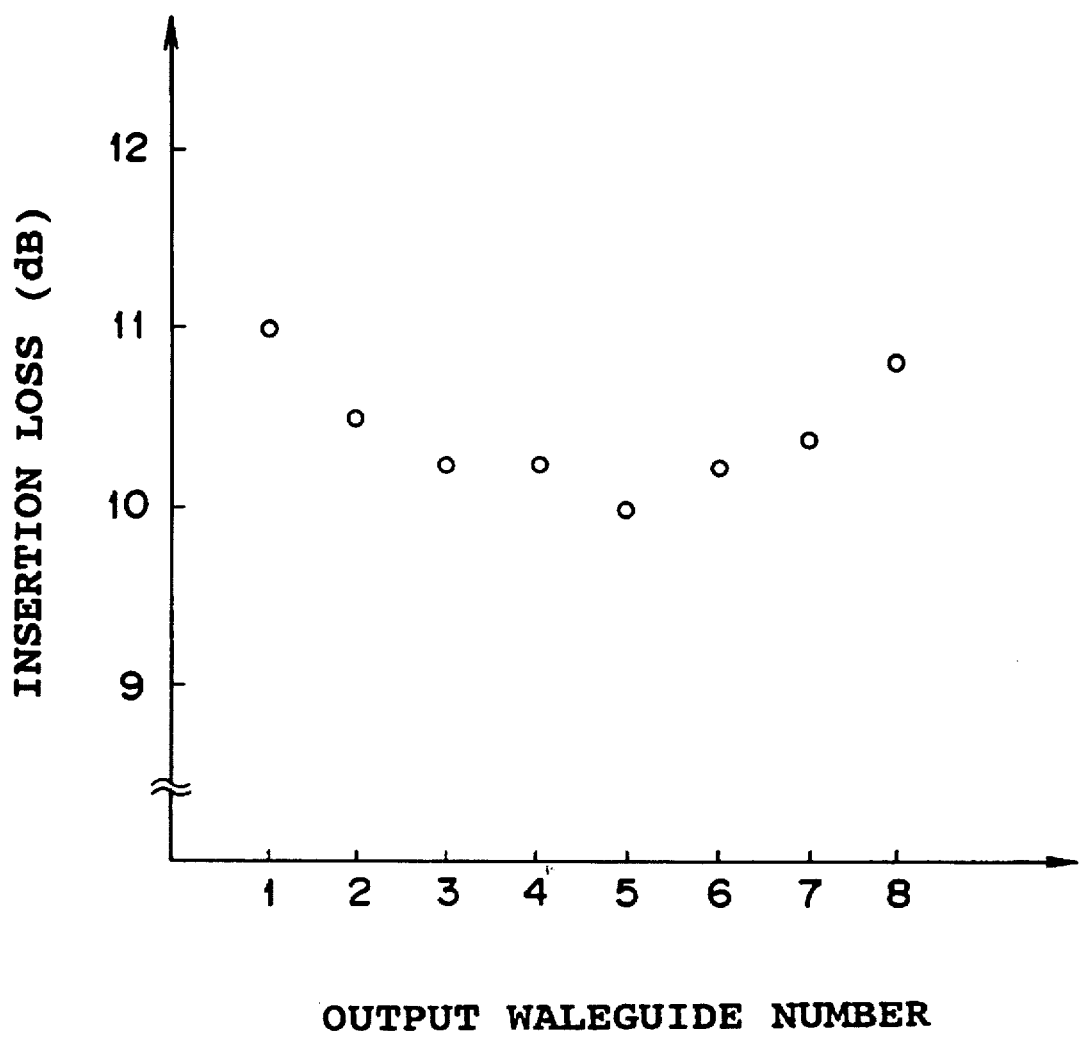
FIG. 13 is a diagram showing an insertion loss of the optical power splitter in the first embodiment of the present invention.
Figure 14:
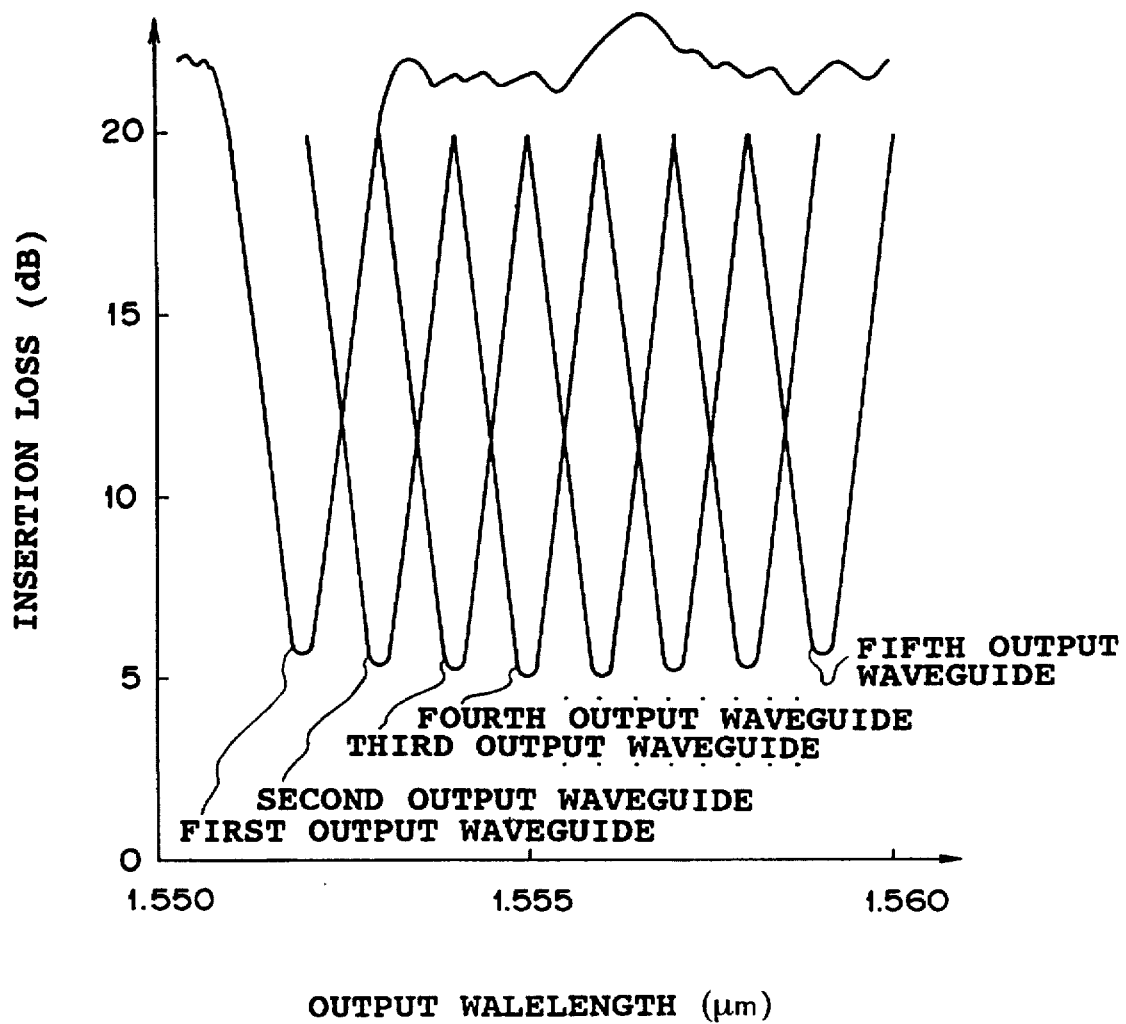
FIG. 14 is a diagram showing an insertion loss of the arrayed-waveguide grating in the first embodiment of the present invention.

FIG. 13 shows splitter insertion loss characteristics when 8 units of the output waveguides 303 are used and light is incident from the input optical waveguide at the center of the arrayed-waveguide grating, and FIG. 14 shows characteristics of insertion loss of the individual output optical waveguides against wavelength. It can be seen that since split loss of the optical power splitter is in principle 9 dB, from FIG. 13, excessive loss is 1 to 2 dB. This value was nearly constant for wavelengths of 1.3 to 1.55µ. From FIG. 14, it can be seen that the insertion loss at the maximum transmission wavelength of the individual output optical waveguides of the arrayed-waveguide grating is about 5 dB.

Embodiment 2

Figure 15:
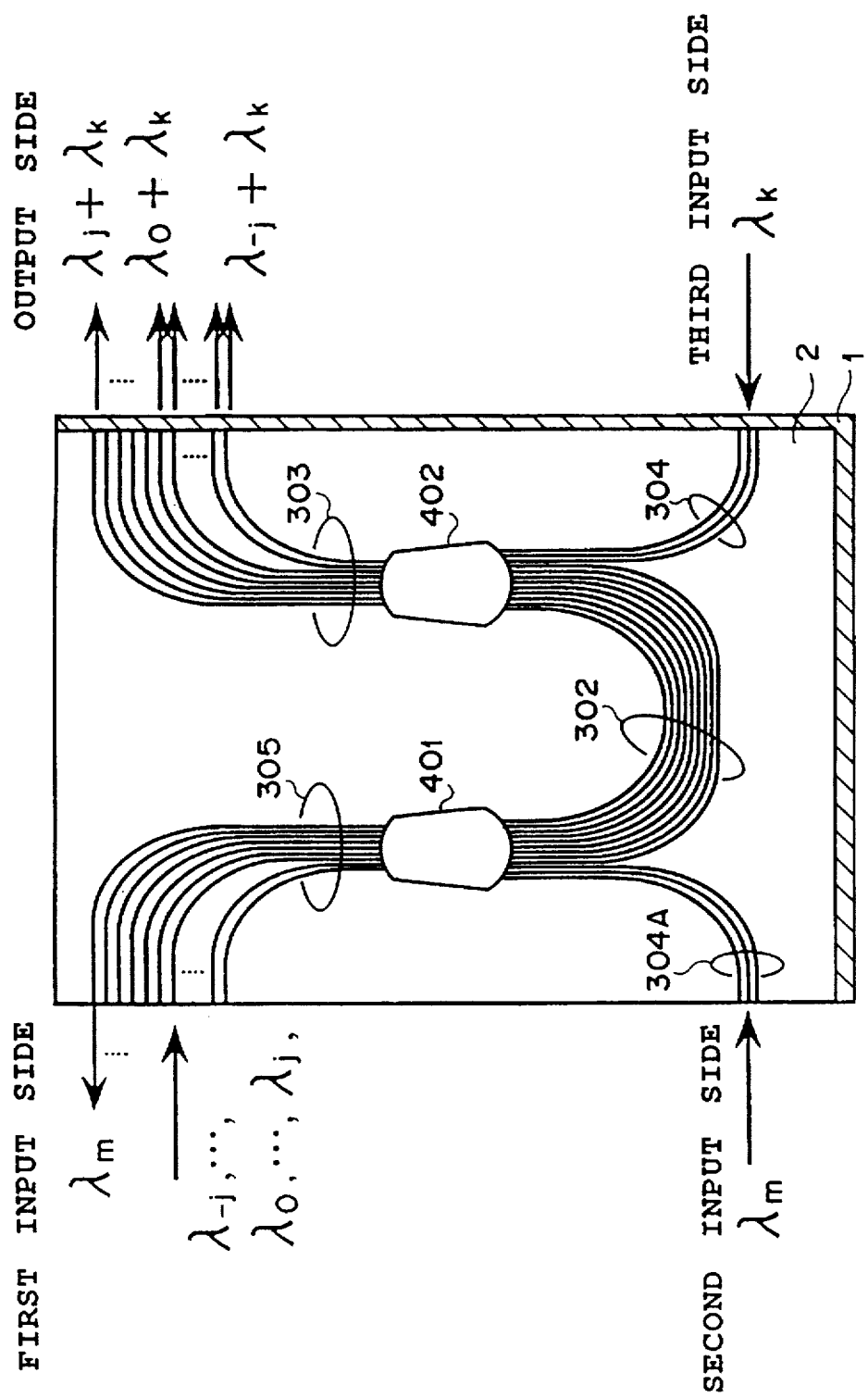
FIG. 15 is a schematic plan view showing an integrated optical waveguide circuit of a wavelength multiplexer and an optical power splitter in a second embodiment of the present invention.

FIG. 15 shows a second embodiment of the optical power splitter with wavelength routing function. In the Figure, the reference numeral 305 indicates an input optical waveguide of the arrayed-waveguide grating and an output optical waveguide of the optical power splitter.

This construction is nearly the same as the integrated optical waveguide circuit of Embodiment 1 but, in the integrated optical waveguide circuit of the present embodiment, another optical power splitter is also formed in the input side slab optical waveguide 401 of the arrayed-waveguide grating as in the output side. As a result, it is possible to input light of wavelength $\lambda_m$ to an input optical waveguide 304A of the optical power splitter to output light of wavelength $\lambda_m$ individually to the input optical waveguides 305 of the arrayed-waveguide grating.

Embodiment 3

Figure 16:
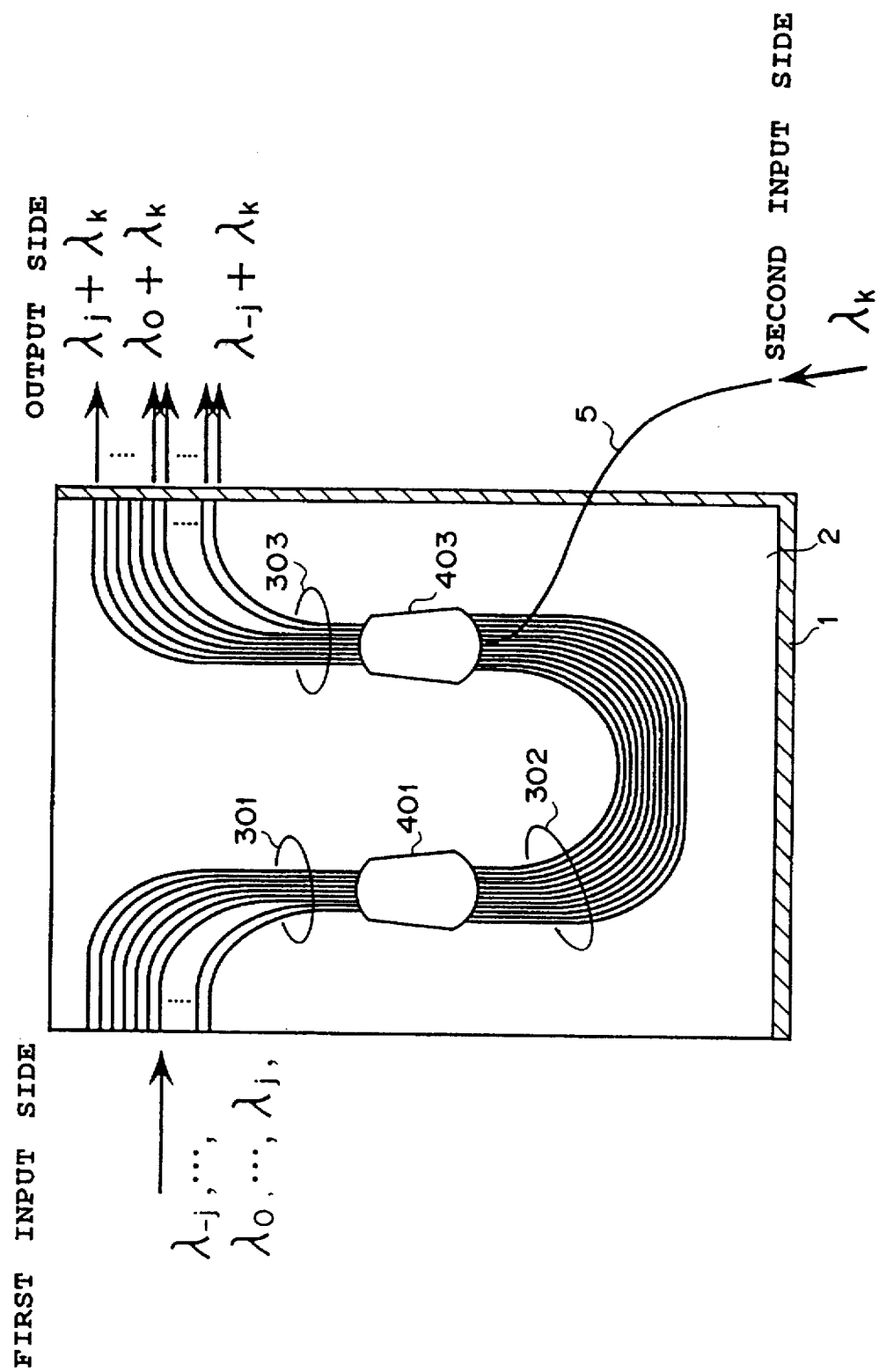
FIG. 16 is a schematic plan view showing an integrated optical waveguide circuit of a wavelength multiplexer and an optical power splitter in a third embodiment of the present invention.
Figure 17:
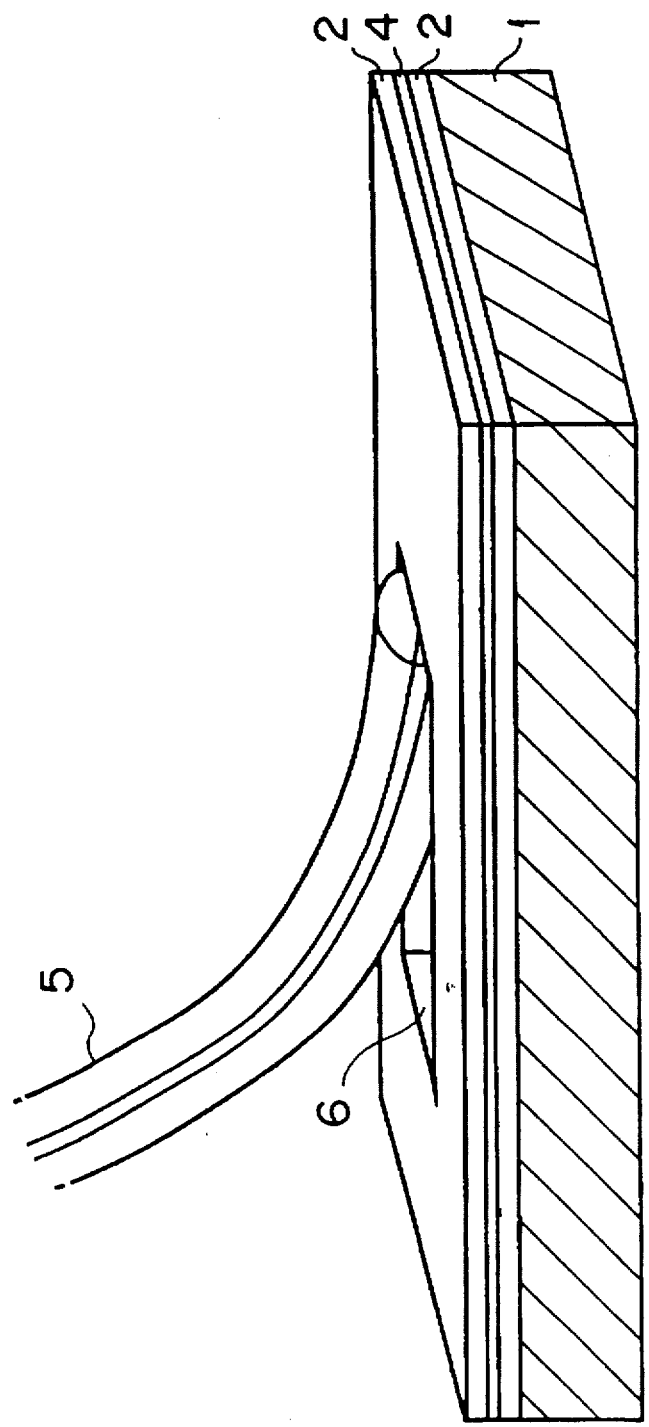
FIG. 17 is a schematic enlarged perspective view showing a connection of an optical fiber for inputting to the optical power splitter and a slab waveguide.

FIG. 16 shows a third embodiment of the optical power splitter with wavelength routing function of the integrated optical waveguide circuit of the present invention. FIG. 17 is a schematic enlarged perspective view showing part of a connection between an input optical fiber for an optical power splitter and the slab optical waveguide.

Figure 1:
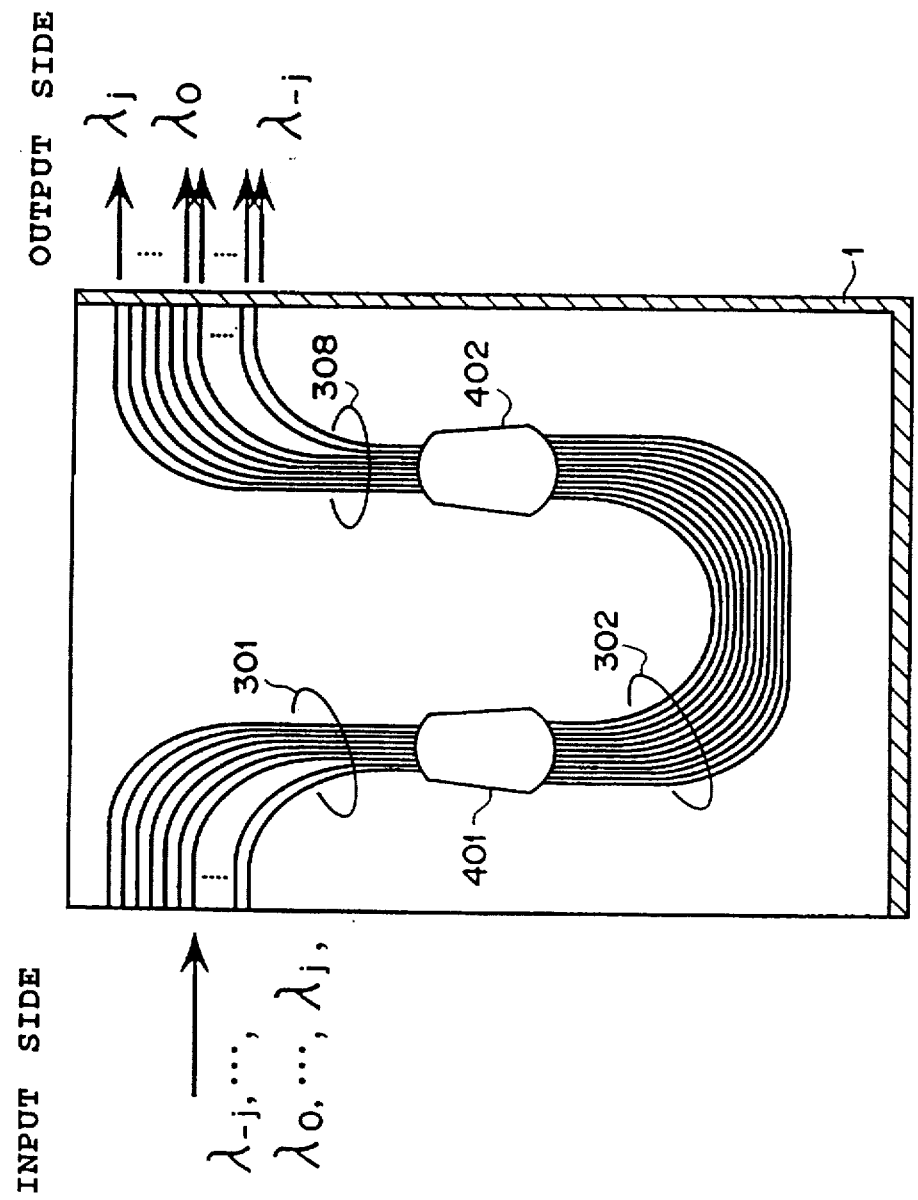
FIG. 1 is a schematic plan view of a prior art arrayed-waveguide grating wavelength multiplexer.
Figure 2:
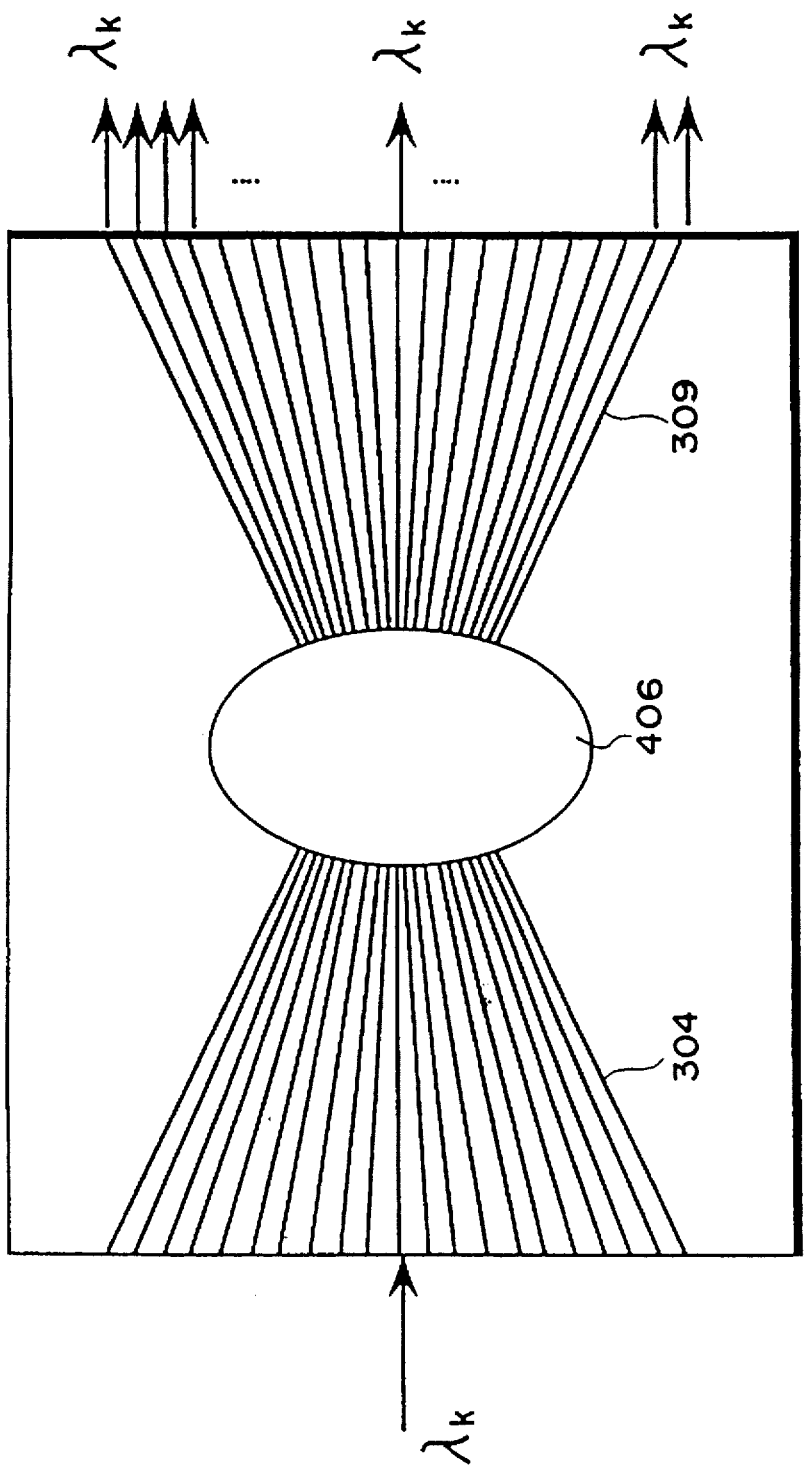
FIG. 2 is a schematic plan view of a prior art N×M star coupler optical power splitter.
Figure 3A:
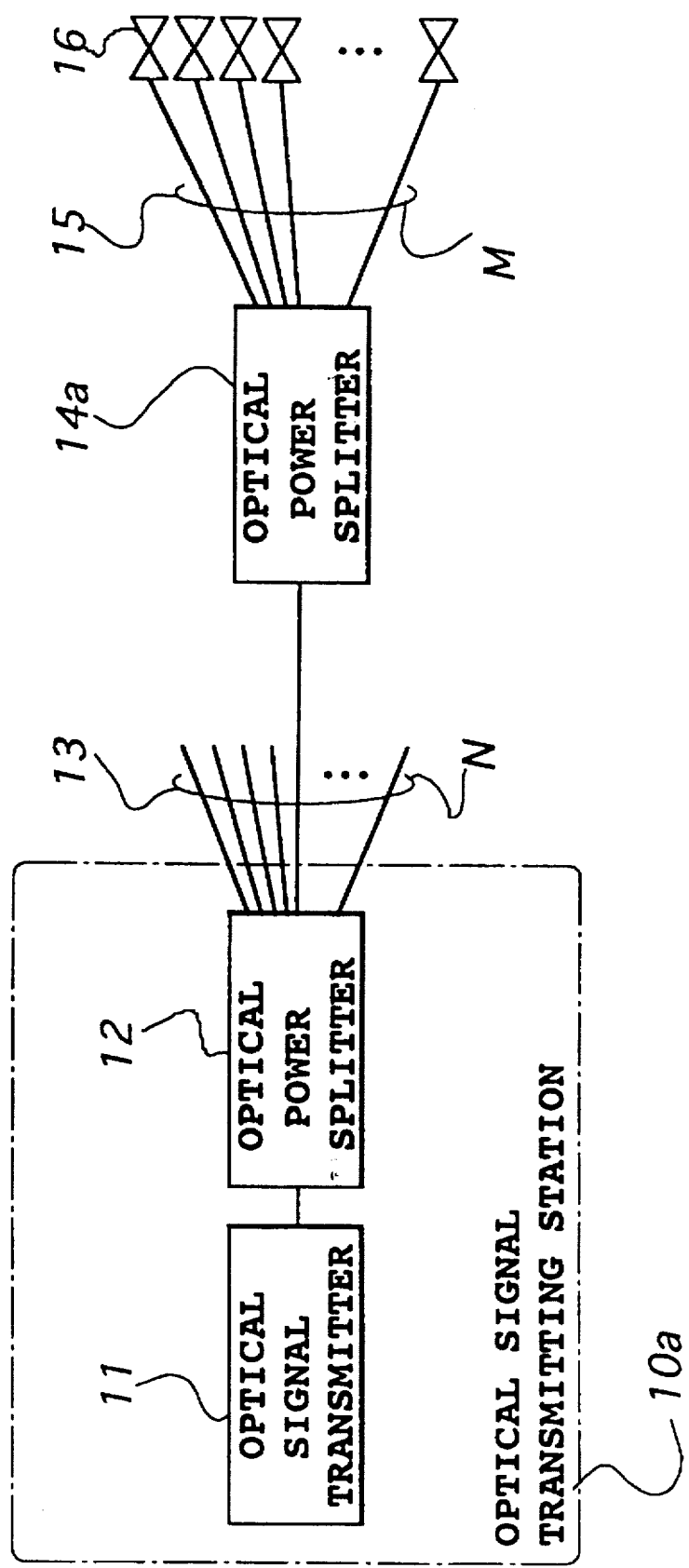
FIG. 3A is a schematic view showing construction of the optical branch line (PDS) system.
Figure 3B:
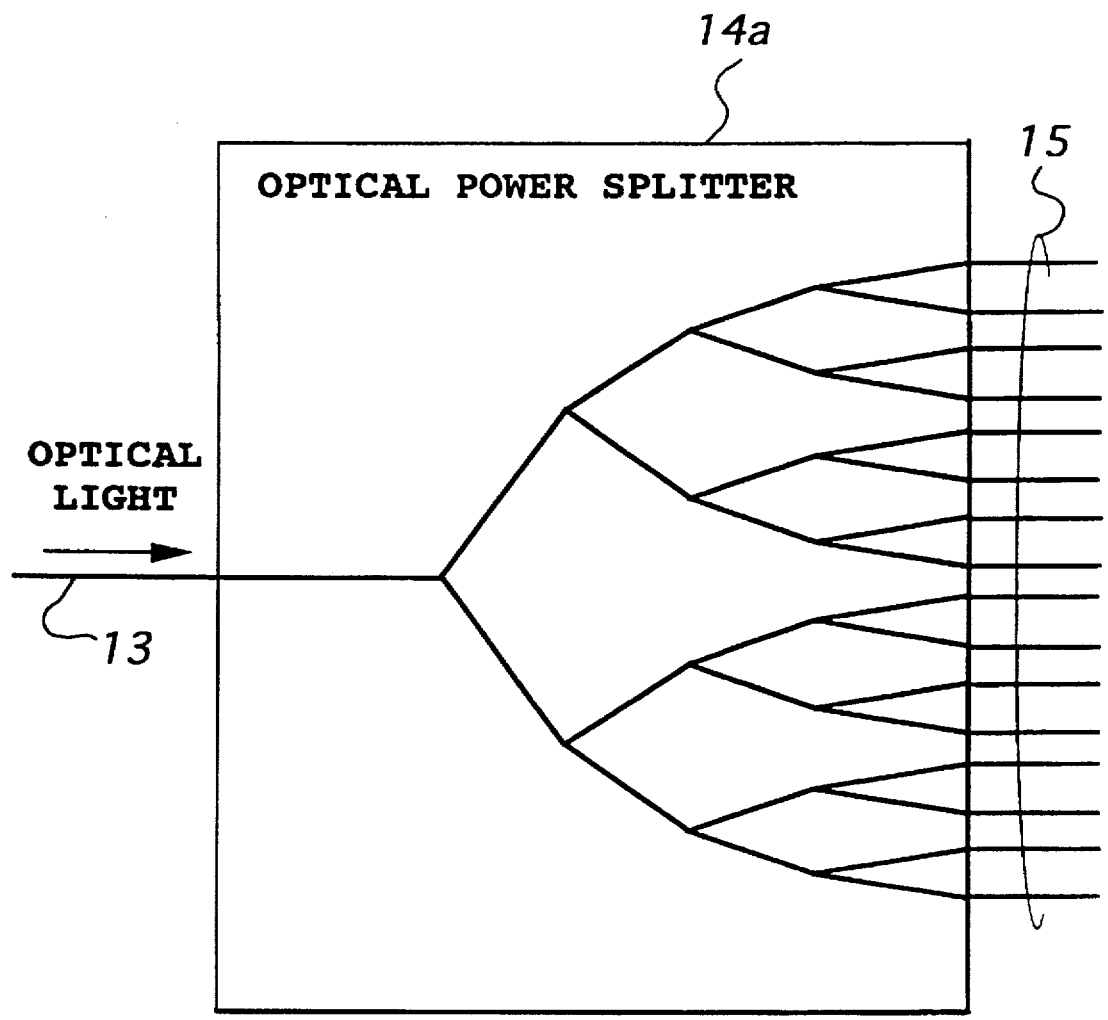
FIG. 3B is a schematic view showing construction of its optical power splitter.
Figure 4A:
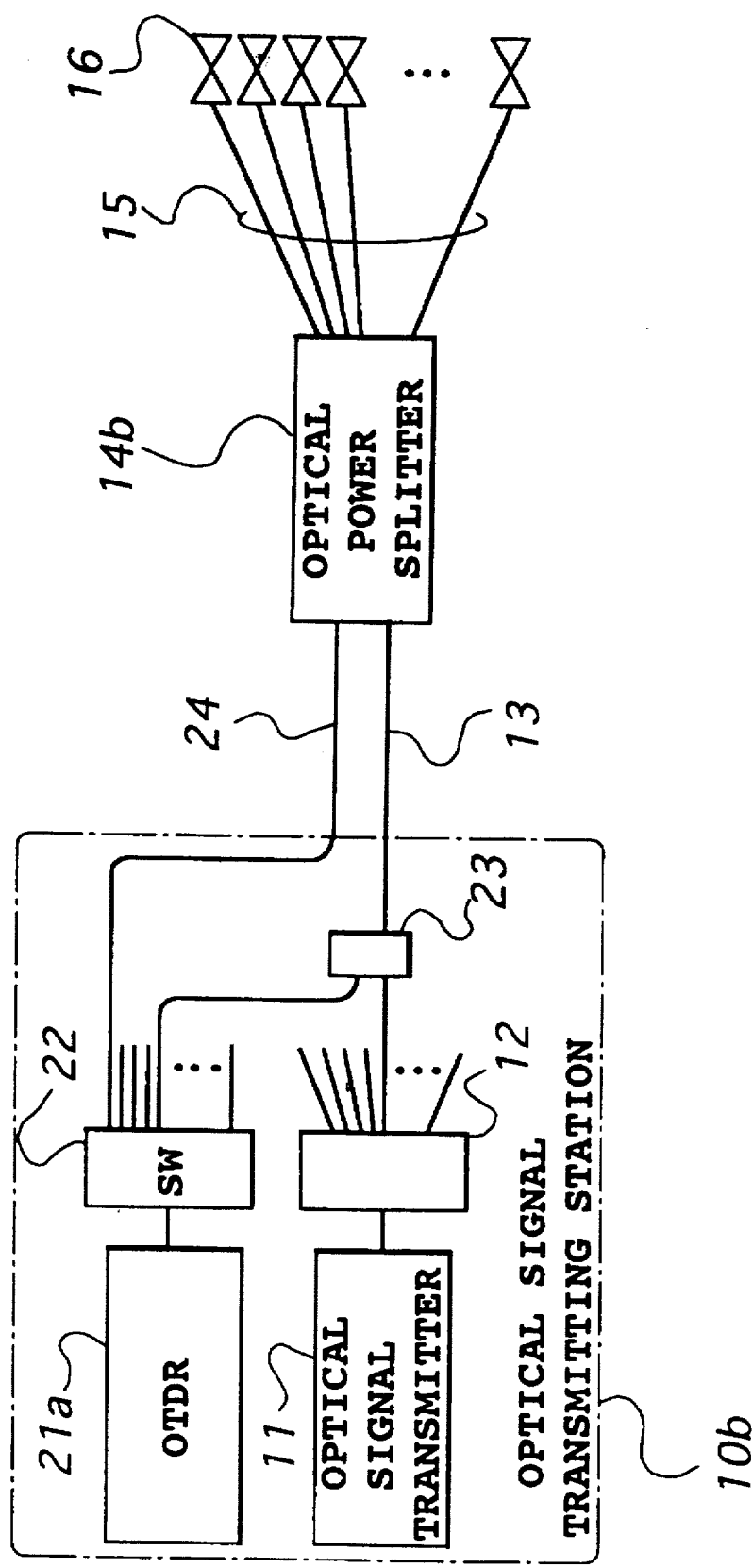
FIG. 4A is a schematic view showing construction of a prior art PDS test system.
Figure 4B:
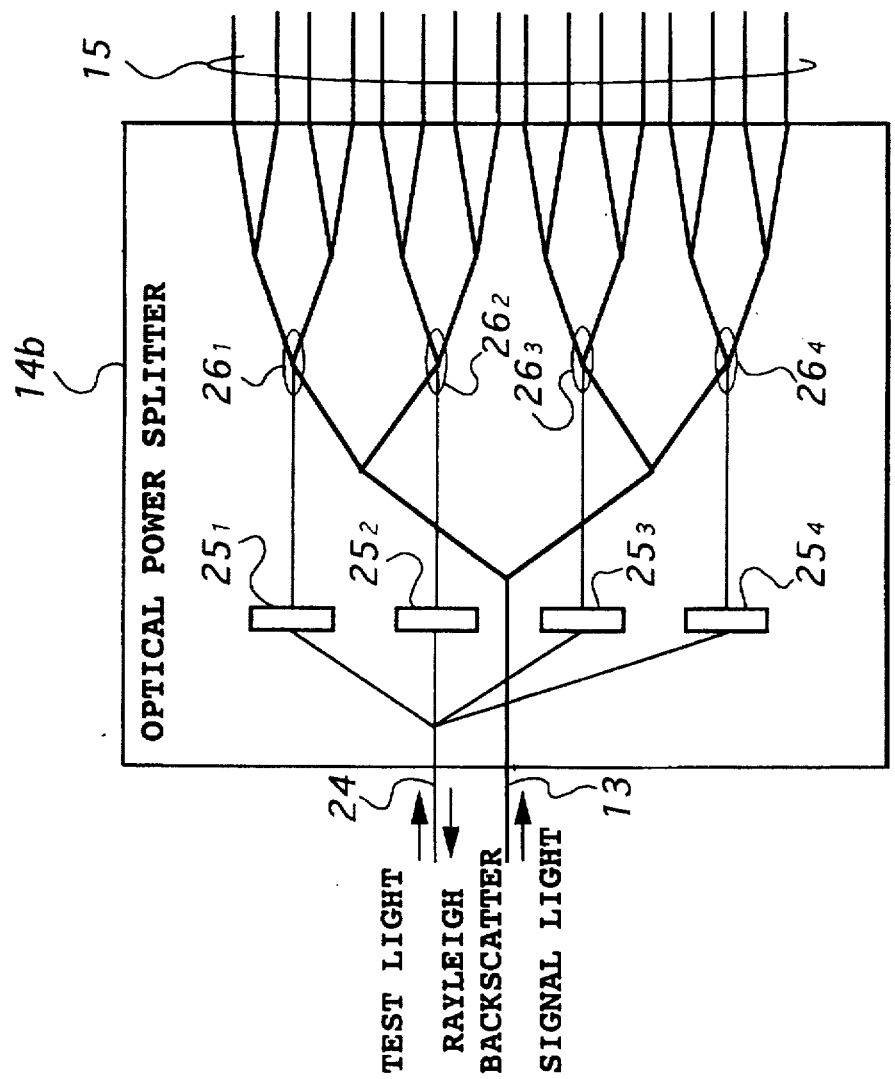
FIG. 4B is a schematic view showing construction of its optical power splitter.

In the Figure, a core layer 4 corresponds to part of the slab optical waveguide 401 of FIG. 3. However, clad surrounding the core layer is not shown. An input optical fiber 5 for the optical power splitter is inserted to an input fiber insertion groove 6.

This construction is also nearly the same as the integrated optical waveguide circuit of Embodiment 1 but, in the integrated optical waveguide circuit of the present embodiment, an optical fiber is used as an input of the optical power splitter, rather than an optical waveguide. This construction features that insertion loss of the optical power splitter can be minimized without increasing the insertion loss of the arrayed-waveguide grating.

That is, in Embodiment 1, to minimize the loss of the optical power splitter, the input waveguide for the optical power splitter, which is incident to the output side slab waveguide, is disposed at the center of the output side slab waveguide, and the arrayed-waveguide is disposed at its side. This resulted in an increased loss of the wavelength multiplexer in Embodiment 1. To improve this, in the present embodiment the arrayed-waveguide is disposed at the center of the output side slab waveguide, and the input fiber for the optical power splitter is disposed at the center sacrificing several arrayed-waveguides at the center.

The integrated optical waveguide circuit was produced using the method shown in Embodiment 1. In the final step, the fiber insertion groove 6 was formed by photolithography and reactive ion etching, and the optical fiber is fixed using an ultraviolet curing resin having the same diffractive index as the core.

Insertion loss of the optical power slitter when 16 units of the output waveguides 303 are used was about 16 dB, which was slightly greater than that shown in FIG. 13. This would be because the input optical fiber and the slab optical waveguide have a connection loss of about 1 dB. Insertion loss of the arrayed-waveguide grating is about 5 dB at the maximum transmission wavelength of the individual output optical waveguides, which is better than the insertion loss of the integrated optical waveguide circuit of Embodiment 1. Further, in the present embodiment, since the optical power splitter receives light through an optical fiber, the shape of the arrayed-waveguide grating can be optimized regardless of the shape of the optical power splitter.

Embodiment 4

Figure 18:
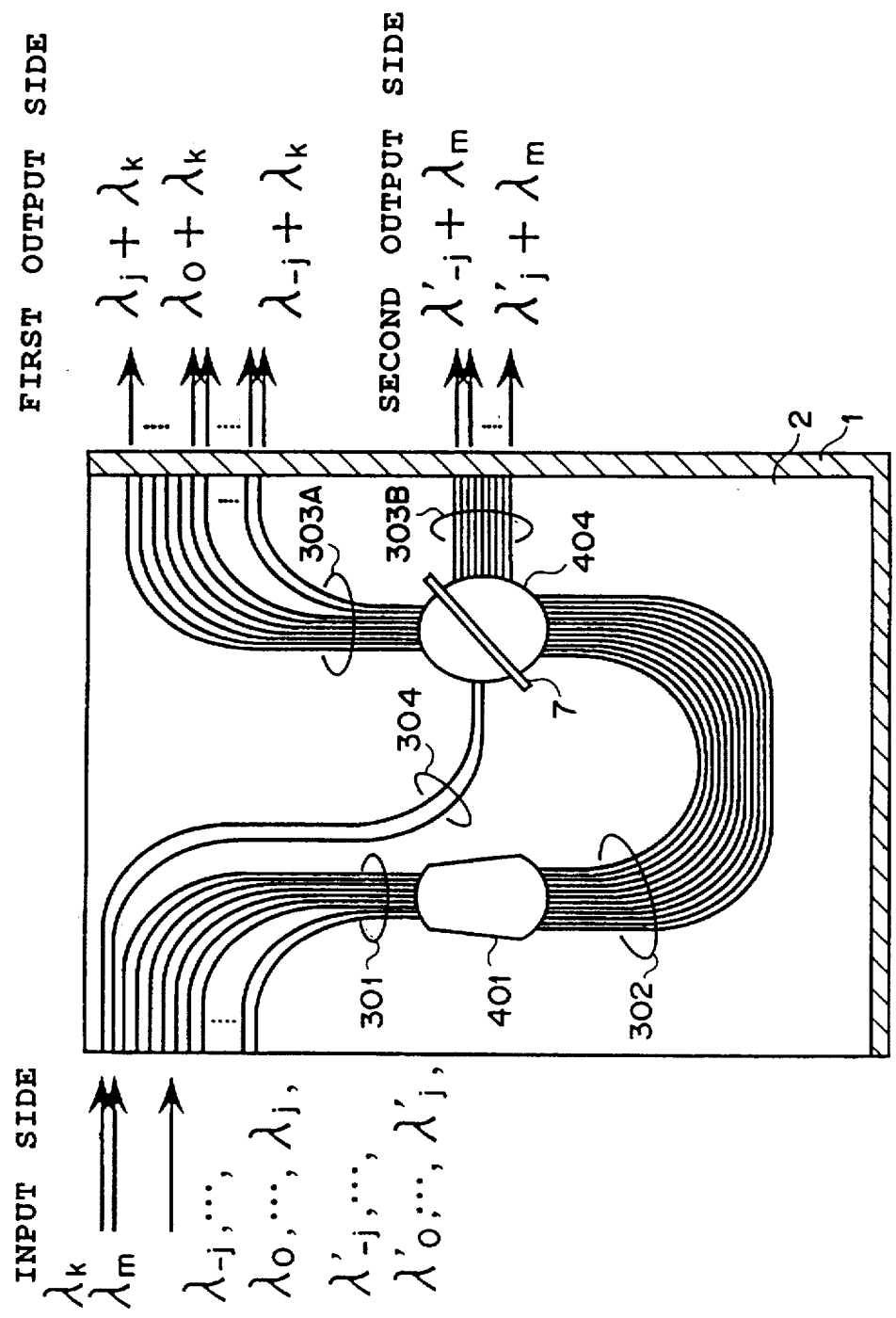
FIG. 18 is a schematic plan view showing an integrated optical waveguide circuit of a wavelength multiplexer and an optical power splitter in a fourth embodiment of the present invention.

FIG. 18 shows a fourth embodiment of the integrated optical waveguide circuit, that is, the optical power splitter with the wavelength routing function of the present invention.

Figure 19:
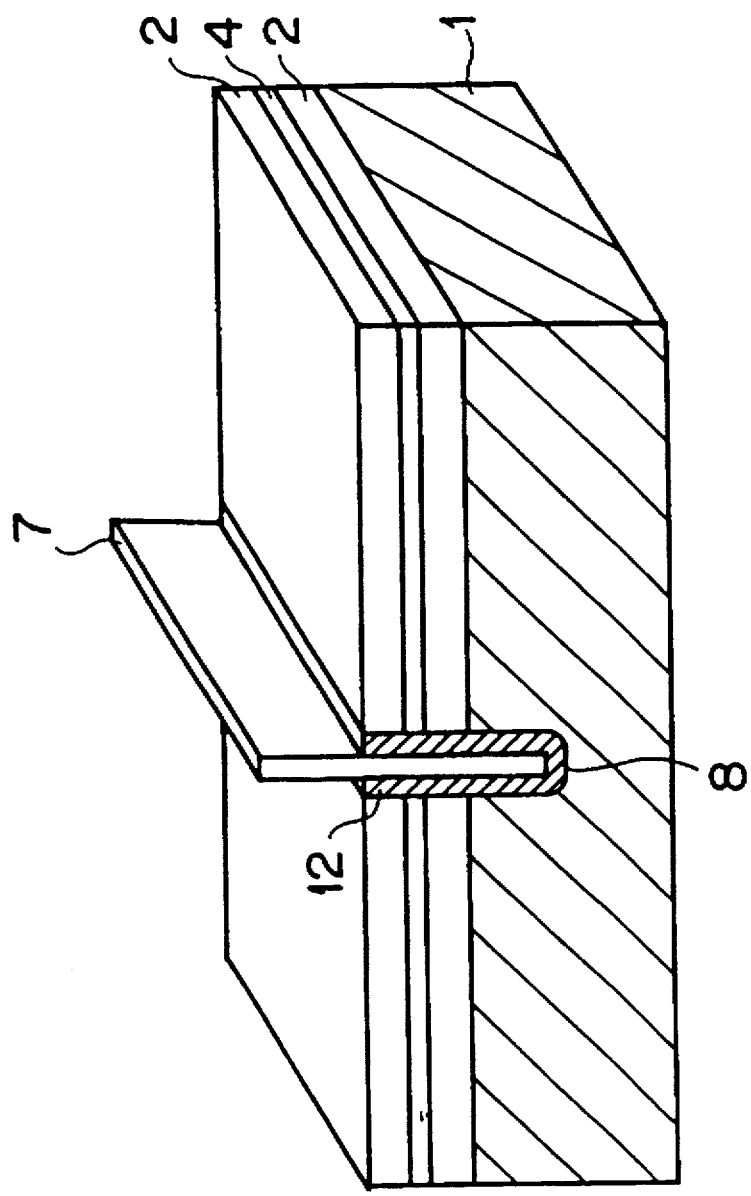
FIG. 19 is a schematic enlarged perspective view showing an insertion of a wavelength filter shown in FIG. 10.

A wavelength filter 7 is inserted in the slab optical waveguide 404. FIG. 19 is a schematic enlarged perspective view showing the insertion portion of the wavelength filter 7. Here, the wavelength filter 7 is produced, for example, by laminating $SiO_2$ and $TiO_2$ in multilayers on the surface of a polymer thin film comprising polyimide resin. The wavelength filter 7 is inserted in a groove 8. In the present embodiment, the wavelength filter 7 reflects light of 1.3 µm band, and transmits light of 1.55 µm. The wavelength filter 7 insertion groove is formed by photolithography and reactive ion etching, and the wavelength filter 7 is fixed by filling the groove 8 with an ultraviolet curing resin 8A having the same refractive index as the core.

The present embodiment differs from the integrated optical waveguide circuit of Embodiment 1 in that the wavelength filter 7 is inserted in the output side slab optical waveguide 404 of the arrayed-waveguide grating. This has a feature that by providing the thin film wavelength filter 7 with, for example, a function to separate light of 1.3 µm band and light of 1.55 µm band, wavelength splitting and power splitter independent of wavelength can be achieved at a time. Further, since the thin film wavelength filter 7 is inserted in the slab optical waveguide, loss is reduced compared to insertion halfway in a channel optical waveguide.

The function will be described in detail. As shown in FIG. 18, for the optical power splitter, light of 1.3 µm band as $\lambda_k$ and light of 1.55 µm as $\lambda_m$ are individually input through the input optical waveguide 304. The 1.3 µm band light is reflected by the thin film wavelength filter 7 in the output side slab optical waveguide 404 of the arrayed-waveguide grating, and the 1.55 µm band light transmits, thereby separating the two lights from each other. As a result, the 1.3 µm band light $\lambda_k$ is split to the individual output optical waveguides 303A at the first output side independent of the wavelength. Similarly, the 1.55 µm band light is split to the individual output optical waveguides 303B of the second output side. On the other hand, when light of 1.3 µm band as $\lambda'_j$ including several wavelengths arranged at 100 GHz intervals and light of 1.55µ band as $\lambda_j$ including several wavelengths are multiplexed and input from one of the input optical waveguides 301 of the arrayed-waveguide grating, the 1.3 µm band light and the 1.55 µm band light are separated from each other in the thin film filter 7 in the output side slab optical waveguide 404 as in the case of the optical power splitter. Further, the 1.3 µm band light is output from the output waveguide corresponding to the wavelength of the individual optical waveguides 303B at the second output side. Similarly, the 1.55 µm band light is output from the output waveguide corresponding to the wavelength of the individual output optical waveguides 303A at the first output side.

Embodiment 5

Figure 20:
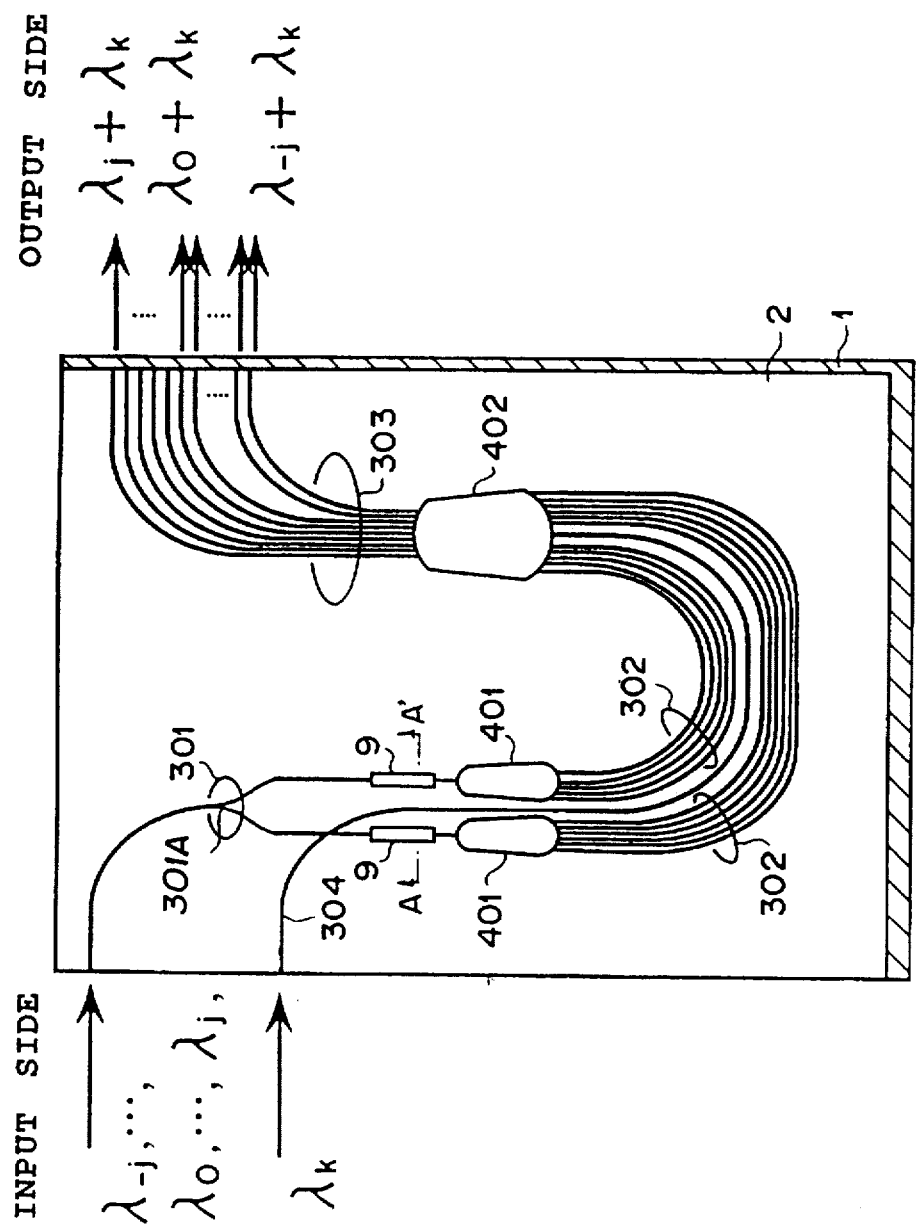
FIG. 20 is a schematic plan view showing an integrated optical waveguide circuit of a wavelength multiplexer and an optical power splitter in a fifth embodiment of the present invention.

A fifth embodiment of the integrated optical waveguide circuit, that is, the optical power splitter with the wavelength routing function of the present invention is shown in FIG. 20.

In this embodiment, a thermo-optic phase shifter 9 using a thin film heater and a Y branch 301A for separating input light to the arrayed-waveguide grating into two parts. The thermo-optic phase shifter controls the waveguide temperature by the thin film provided on the surface of the waveguide. As a result, it controls the optical path length of the waveguide by a thermo-optical effect. This is described in detail M. Kawachi, "Silica waveguides on silicon and their application to integrated-optic components," Optical and Quantum Electronics, vol. 22, pp. 391–416, 1990.

This construction differs from Embodiment 1 in that the input optical waveguide 304 of the optical power splitter is disposed at the center of the arrayed-waveguide 302 to reduce the insertion loss of the arrayed-waveguide grating while maintaining the optical power splitter insertion loss at a minimum value. For this purpose, the slab optical waveguide of the arrayed-waveguide grating is separated into right and left parts, and light is split to the arrayed-waveguides by the individual slab optical waveguides 401, 401. The thermo-optical phase shifter 9 is provided to adjust so that input light to the two-separated arrayed-waveguide gratings satisfy a certain relative phase condition.

Excessive loss of the optical power splitter of the present embodiment is nearly the same as that shown in Embodiment 1, and the split loss is about 15 dB. Insertion loss of the arrayed-waveguide grating is about 3 dB at the maximum transmission waveguide of the individual output waveguides, which is better than that of Embodiment 1. A disadvantage of the present embodiment is that the thermo-optic phase shifter 9 must be always supplied with a power. If a self-maintaining optical path length control becomes possible in the future, the wavelength multiplexer with wavelength routing function of this construction will be an effective circuit for its improved characteristics.

Embodiment 6

Figure 21:
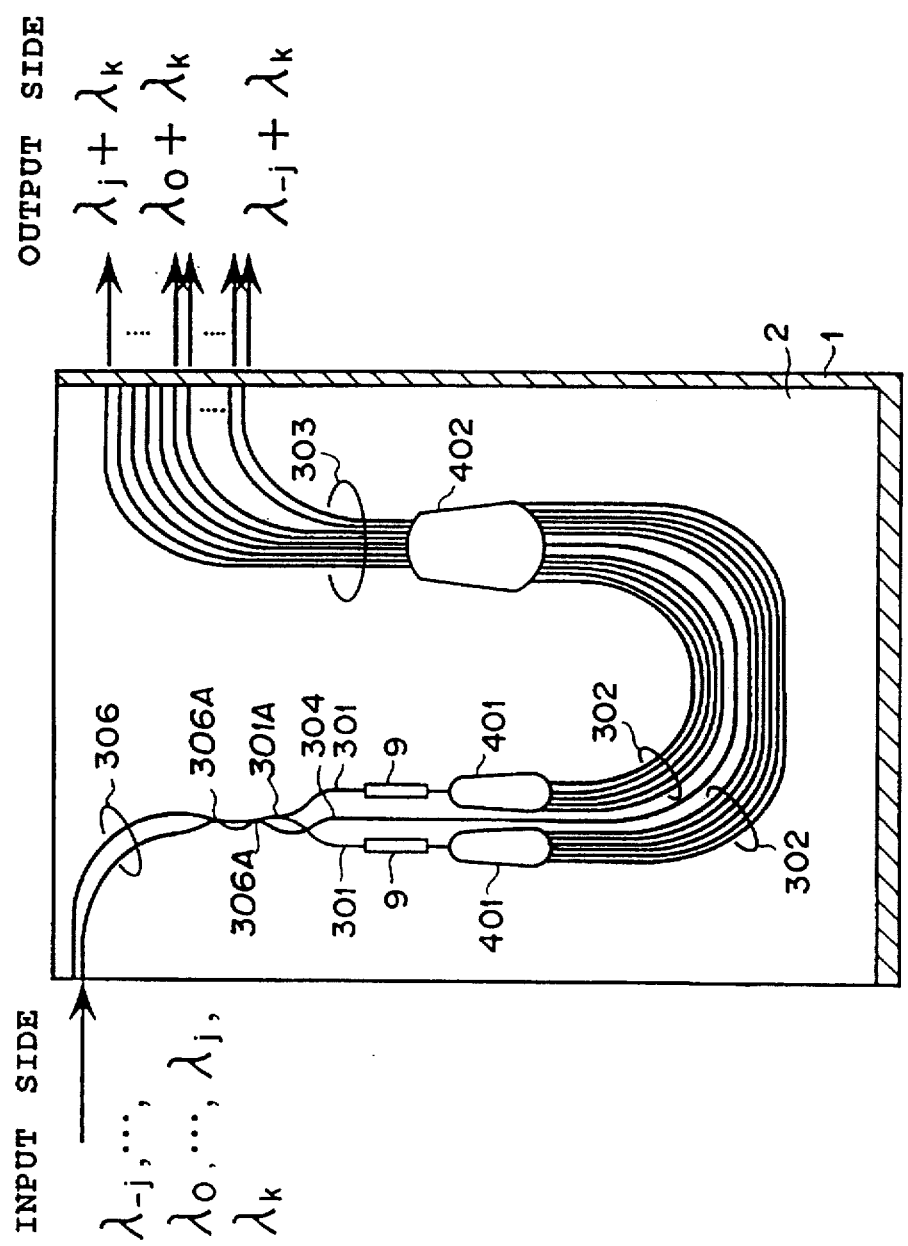
FIG. 21 is a schematic plan view showing an integrated optical waveguide circuit of a wavelength multiplexer and an optical power splitter in a sixth embodiment of the present invention.

FIG. 21 shows a sixth embodiment of the integrated optical waveguide circuit, that is, the optical power splitter with the wavelength routing function of the present invention. In the Figure, the reference numeral 306 indicates an input optical waveguide to the arrayed-waveguide grating and the optical power splitter, and 306A indicates a wavelength multiplexer using an asymmetric Mach-Zehnder interferometer.

This construction differs from the integrated optical waveguide circuit of Embodiment 5 in that a wavelength multiplexer using the asymmetric Mach-Zehnder interferometer 306A is disposed before the thermo-optic phase shifter 9 so that input light to the arrayed-waveguide grating and input light to the optical power splitter can be input from the same input optical waveguide 306. The wavelength multiplexer using the asymmetric Mach-Zehnder interferometer 306A has a function to separate, for example, light of 1.3 μm band and light of 1.55 μm band from each other.

The wavelength multiplexer using the Mach-Zehnder interferometer is described in M. Kawachi, "Silica waveguides on silicon and their application to integrated-optic components," Optical and Quantum Electronics, vol. 22, pp. 391–416, 1990.

For Embodiments 1 to 6, the characteristics are shown using TM mode light having a field component perpendicular to the substrate. In general, an optical waveguide formed on the substrate has birefringence (difference between a refractive index $n_{TM}$ to TM mode having a field component perpendicular to the substrate and a refractive index $n_{TE}$ to TE mode having a field component parallel to the substrate, Birefringence= $n_{TM}-n_{TE}$). Therefore, an interferometer like an arrayed-waveguide grating has characteristics depending upon the polarization condition of light, that is, polarization dependence. Also in the optical power splitter with wavelength routing function of the present invention has a polarization dependence in the wavelength multiplexing/demultiplexing characteristics. Polarization-independent operation can be achieved by inserting a half waveplate at the center of the arrayed-waveguide grating so that the optical principal axis is inclined by 45° to generate a TE/TM mode conversion at this part. The polarization-independent arrayed-waveguide grating is described in detail in Y. Inoue et al., "Polarization Mode Converter With Polyimide Half Waveplate in Silica-Based Planar Lightwave Circuits," IEEE Photon. Technol. Lett., vol. 6, pp. 626–628, 1994.

Embodiment 7

Figure 22:
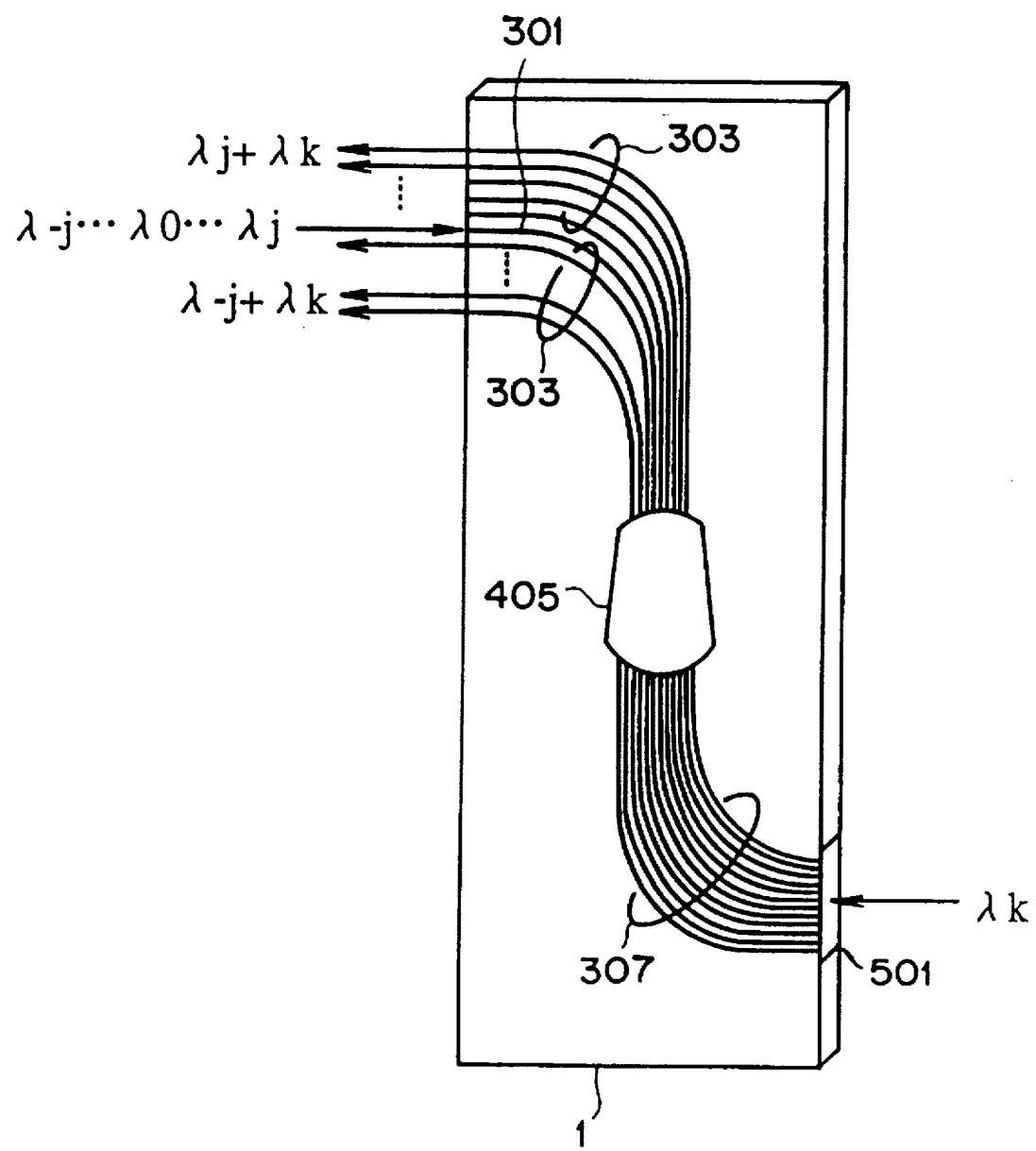
FIG. 22 is a schematic plan view showing an integrated optical waveguide circuit of a wavelength multiplexer and an optical power splitter in a seventh embodiment of the present invention.

FIG. 22 shows an integrated optical waveguide circuit as another embodiment of the optical wavelength multiplexer and optical power splitter.

In this optical waveguide circuit, the arrayed-waveguide grating is cut at the center, where, for example, a dielectric multilayer reflective filter 501 comprising $SiO_2$ and $TiO_2$ is formed to construct a reflective optical wavelength multiplexer. Light input to one or more input optical waveguide(s) 301 of the arrayed-waveguide grating is diffracted by a slab optical waveguide 405 and split into a plurality of arrayed optical waveguides 307. Then, the light is reflected by dielectric multilayer wavelength filters 501, and radiated again to the slab optical waveguide 405. At this moment, since the individual arrayed optical waveguides differ in length, the optical wave front inclines, and coupled with another output optical waveguide 303 different from the input optical waveguide 301. Since, the inclination of optical wave front varies with the wavelength, when the wavelength is varied, light is output to an output optical waveguide corresponding to the wavelength among the output optical waveguides 303. Thus, the optical waveguide circuit functions as a reflective optical wavelength multiplexer or a wavelength router. Here, the dielectric multilayer wavelength filter 501 is formed by vacuum evaporation after optical flat polishing of the end face of the substrate 1. In the present embodiment, it is designed so that light of 1.3 μm band is transmitted by the dielectric multilayer wavelength filter, and light of 1.55 μm band is reflected. Therefore, the arrayed-waveguide grating functions as a reflective wavelength multiplexer to light of 1.55 μm band.

On the other hand, when light of 1.3 μm band ($\lambda_k$), which transmits the dielectric multilayer wavelength filter 501, is input by butt joint using an optical fiber from the waveguide end face in the vicinity of the center of the arrayed optical waveguide 307, the light is diffracted by the slab optical waveguide 405 and split to the output optical waveguide 303. Therefore, the optical waveguide circuit also functions as an optical power splitter.

In the present embodiment, the portion contacting the slab waveguide of the input/output waveguide 303 is finely tapered in the vicinity of the center, and widely tapered at both ends so that the split ratios of the optical power splitter are equal to each waveguides other. The design is the same as that shown in FIG. 10.

Light of 1.3 μm band split into the input optical waveguide 301 of the arrayed-waveguide grating may have an adverse effect as a return light. However, this can be prevented by inserting a 1.3 μm band cut filter in the input optical waveguide 301 or halfway in the optical fiber for inputting the input optical waveguide 301.

Figure 23:
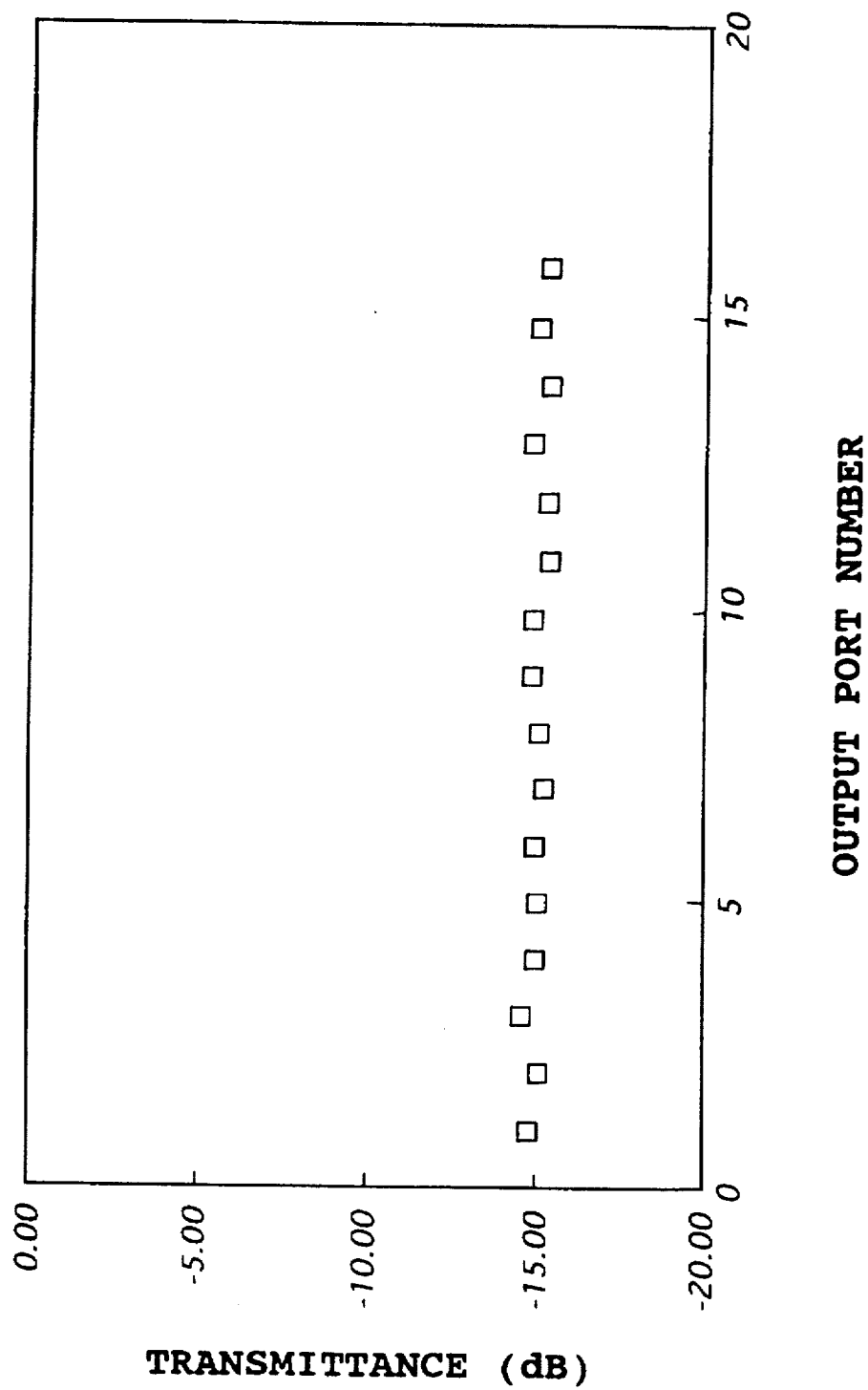
FIG. 23 is a diagram showing characteristics of the optical power splitter in the seventh embodiment.
Figure 24:
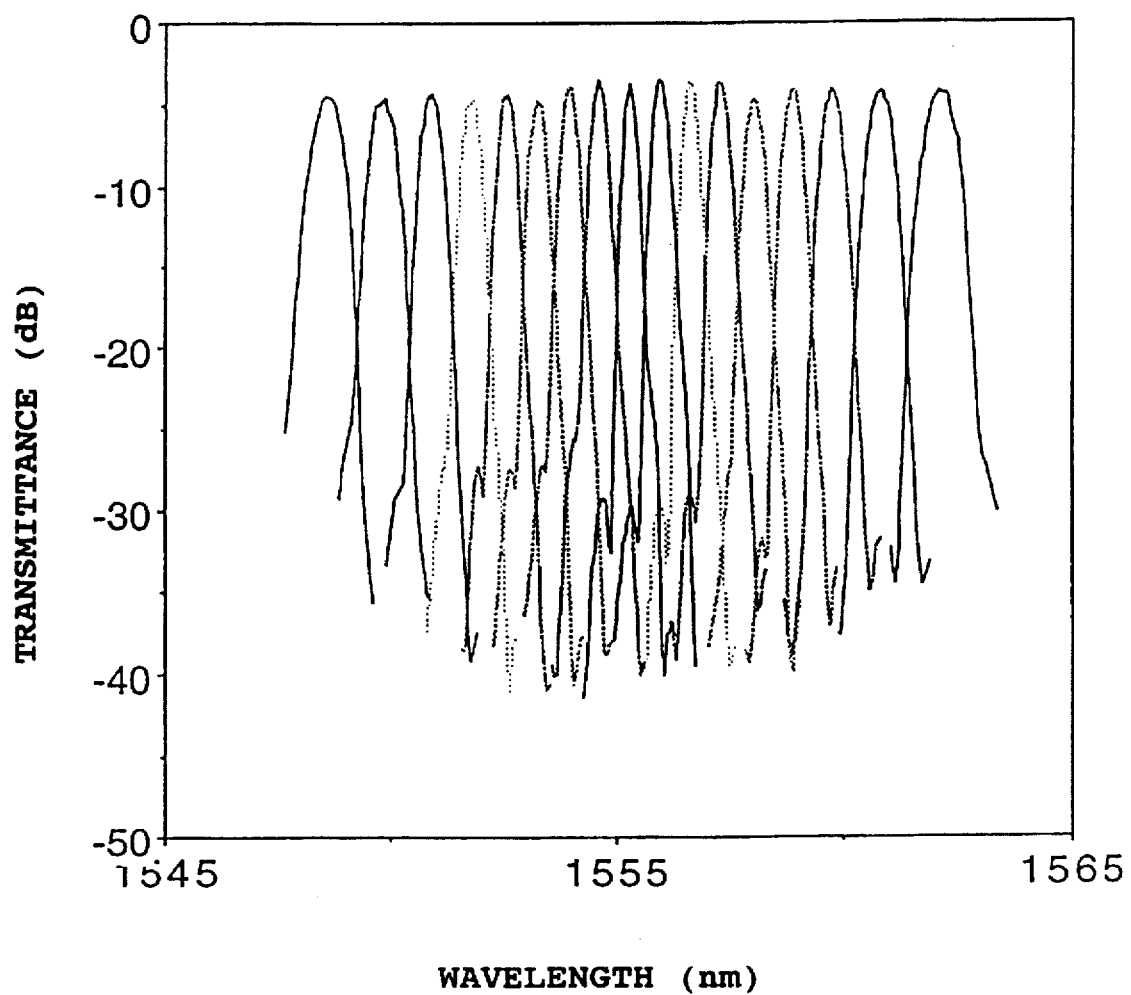
FIG. 24 is a diagram showing wavelength multiplexing characteristics of the arrayed-waveguide grating in the seventh embodiment.

FIG. 23 shows characteristics of the optical power splitter for 16-split of the present embodiment. The loss is about 15 dB, and the excessive loss subtracted by the theoretical loss of 12 dB is about 3 dB. FIG. 24 shows wavelength multiplexing/demultiplexing characteristics of the arrayed-waveguide grating. The insertion loss at the maximum transmission wavelength is about 4 dB. This is because the reflection portion of the dielectric multilayer wavelength mirror has a loss of about 1 dB.

In the present embodiment, a single input waveguide for optical power splitter is used. However, a plurality of input waveguides for optical power splitter may be used.

Embodiment 8

Figure 25:
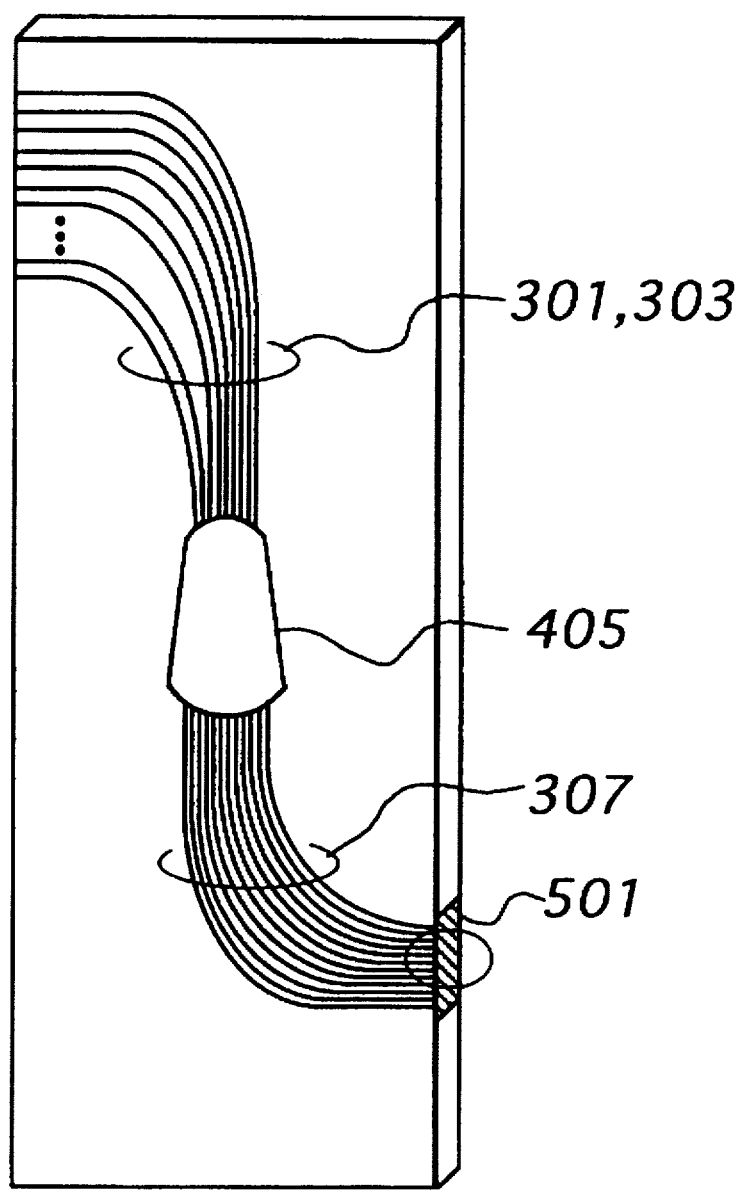
FIG. 25 is a schematic view showing the optical power splitter with a wavelength routing function in an eighth embodiment.

FIG. 25 shows an optical power splitter with wavelength routing function as an eighth embodiment of the present invention.

Figure 26:
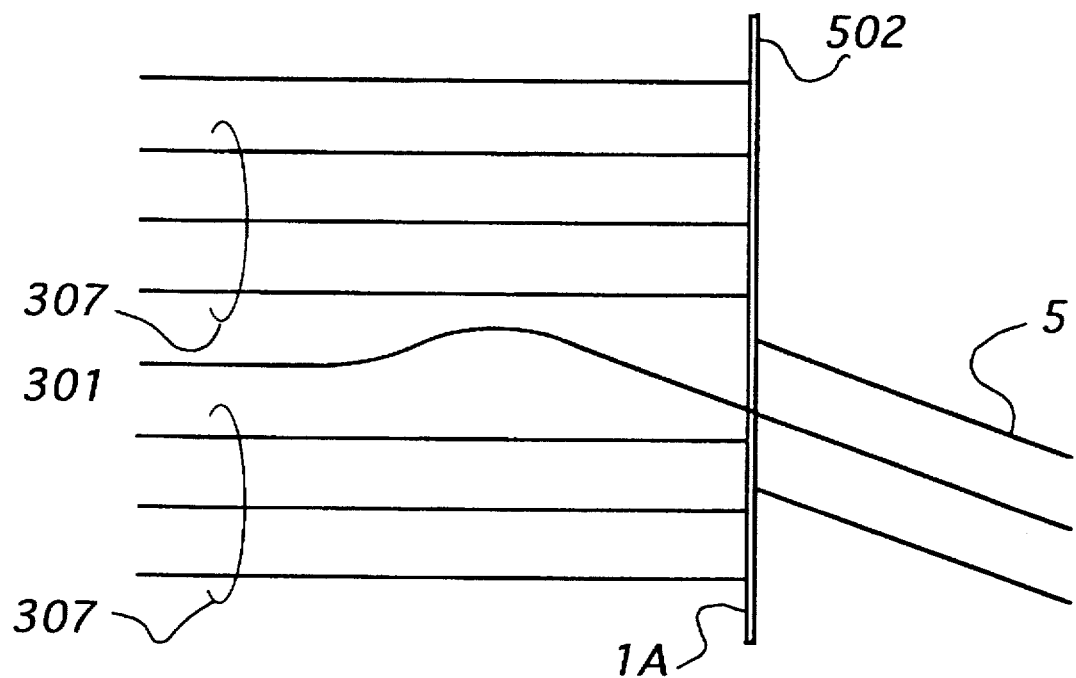
FIG. 26 is a schematic enlarged view showing part of FIG. 25.

The construction is almost the same as Embodiment 7, a difference being in the portion of a substrate end face 1A, where the input waveguide 301 for the optical power slitter is connected with an optical fiber 5. An enlarged view of this portion is shown in FIG. 26. Other adjacent arrayed-waveguides 307 are disposed perpendicular to the substrate end face 1A so that light is efficiently reflected by a dielectric multilayer mirror 502 provided at the substrate end face. However, only the input waveguide 301 of the optical power splitter is intentionally bent so that it does not cross perpendicular to the substrate end face 1A. This is for the reason shown below. It is designed that the dielectric multilayer mirror 502 reflects light (1.55 μm light in the present embodiment) input to the wavelength multiplexer, and transmits light (1.3 μm light in the present embodiment) input to the optical power splitter. However, in practice, about 0.3% (−25 dB) of light input to the optical power splitter is reflected by the dielectric multilayer mirror 502. The return light has an adverse effect on the system for transmitting analog signals. To prevent this, in the present embodiment, the angle between the incident end face to the optical power splitter, an the direction of incident light is intentionally shifted from perpendicular to suppress reflection. Specifically, the input waveguide 301 for the optical power splitter is designed to cross the substrate end face 1A at an angle of 82°. This angle is preferably less than 87°. This suppresses reflection return light in the input optical fiber 5 of the optical power splitter from −25 dB to −52 dB. In the present embodiment, the input fiber 5 for the optical power splitter is also diagonally polished by 82°.

Embodiment 9

Figure 27:
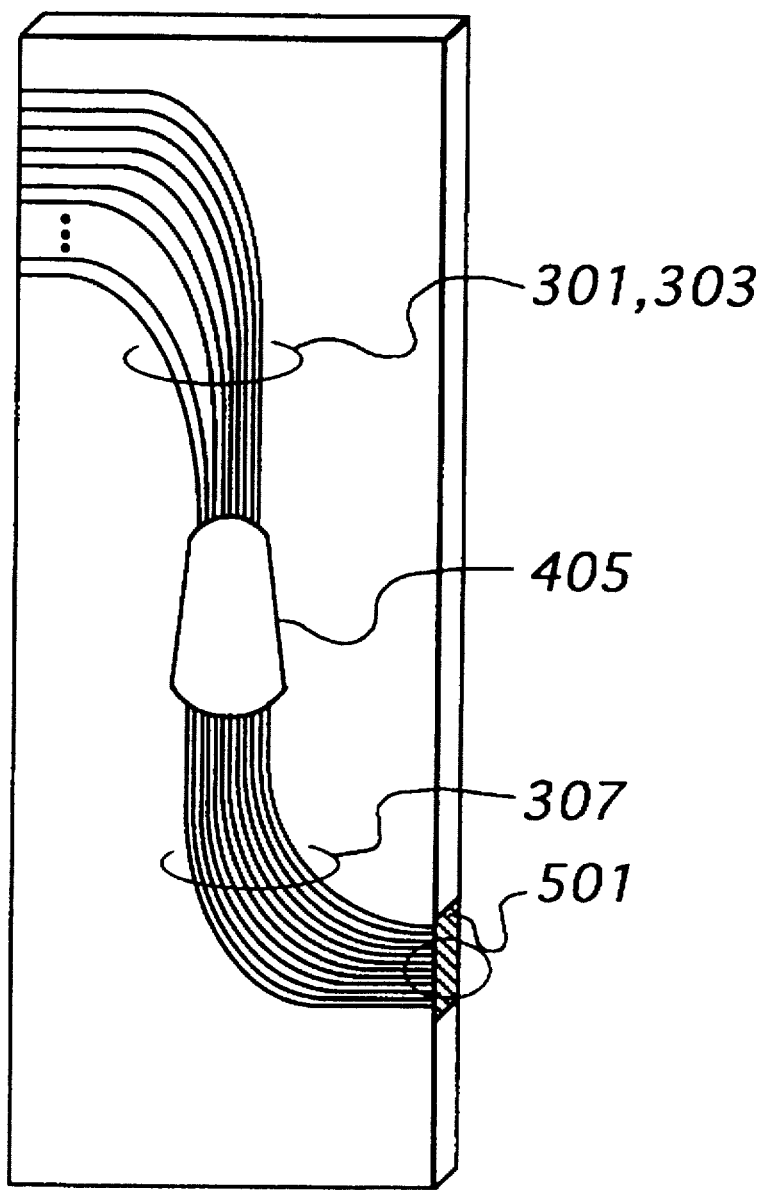
FIG. 27 is a schematic view showing the optical power splitter with a wavelength routing function in a ninth embodiment.

FIG. 27 shows an optical power splitter with wavelength routing function as a ninth embodiment of the present invention.

Figure 28:
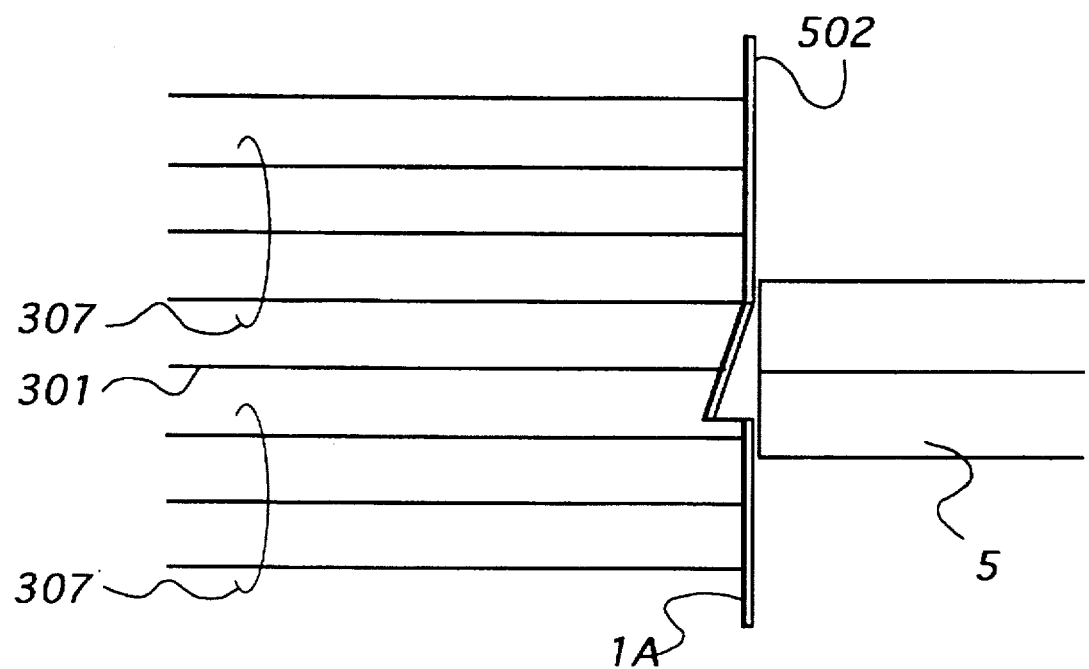
FIG. 28 is a schematic enlarged view showing part of FIG. 27.

The construction is nearly the same as Embodiment 7, but a difference is present in the portion of the substrate end face 1A connected with the input waveguide fiber 5 for the optical power splitter. An enlarged view of the portion is shown in FIG. 28. In Embodiment 8, the input waveguide 301 on the substrate end face is shifted from 90° to suppress reflection on the optical power splitter input end face. In the present embodiment, the portion of the substrate end face crossing the input waveguide is machined to have an angle of 80°. Specifically, the waveguide is etched by photolithography and reactive ion etching. A refractive index-matched adhesive is filled between the etched portion and the input fiber to suppress reflection. With this embodiment, reflection return light in the input fiber of the optical power splitter is reduced from −25 dB to −41 dB as in Embodiment 8.

Embodiment 10

Figure 29:
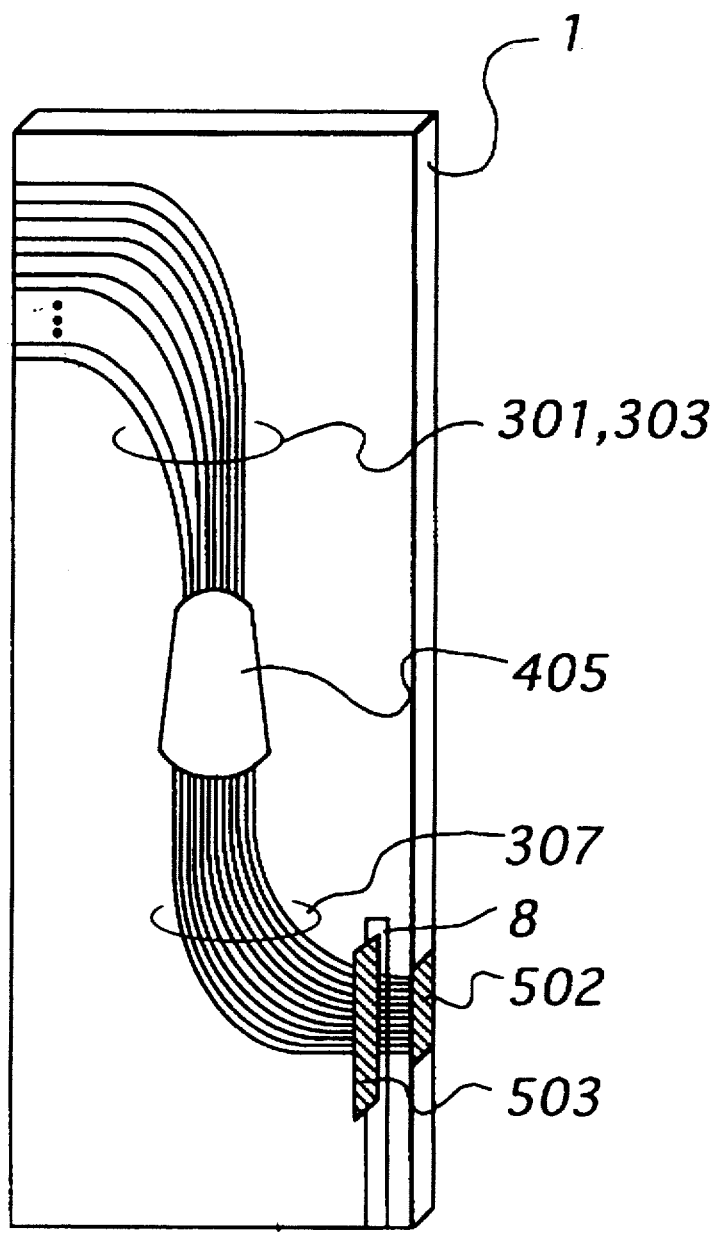
FIG. 29 is a schematic view showing the optical power splitter with a wavelength routing function in a tenth embodiment.

FIG. 29 shows an optical power splitter with wavelength routing function as a tenth embodiment of the present invention.

Figure 30:
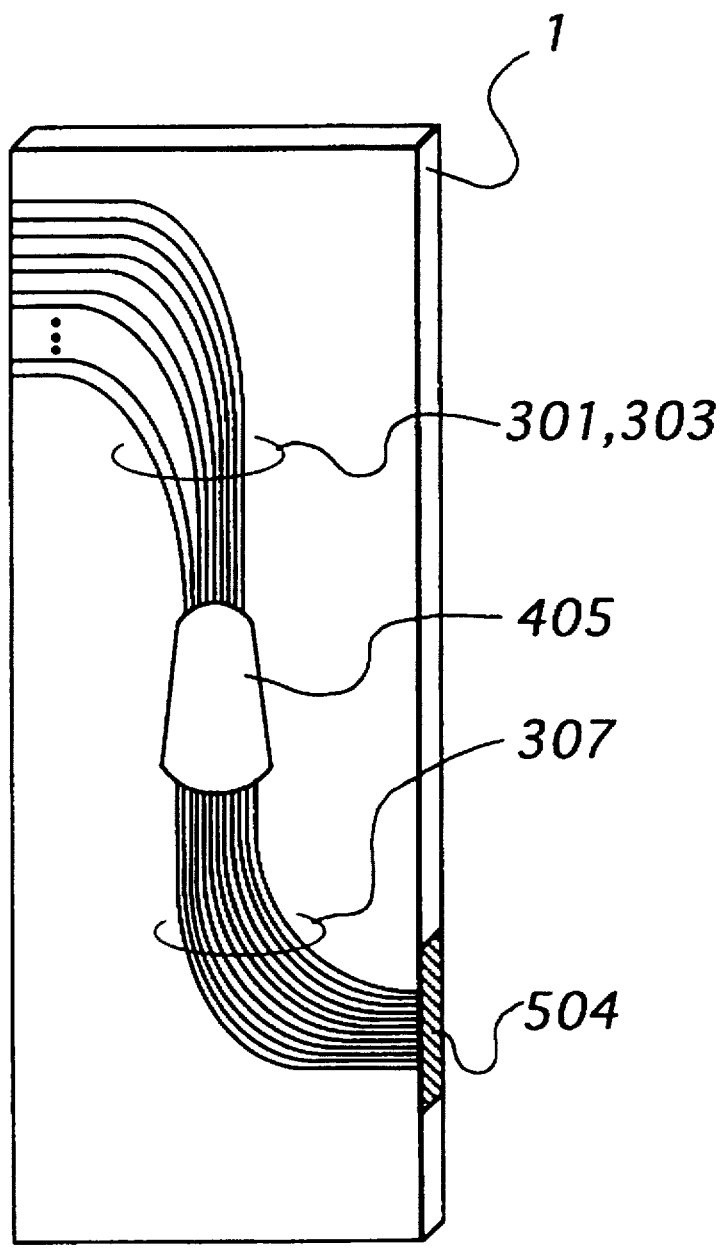
FIG. 30 is a schematic view showing a wavelength multiplexer having a quarter waveplate.
Figure 31:
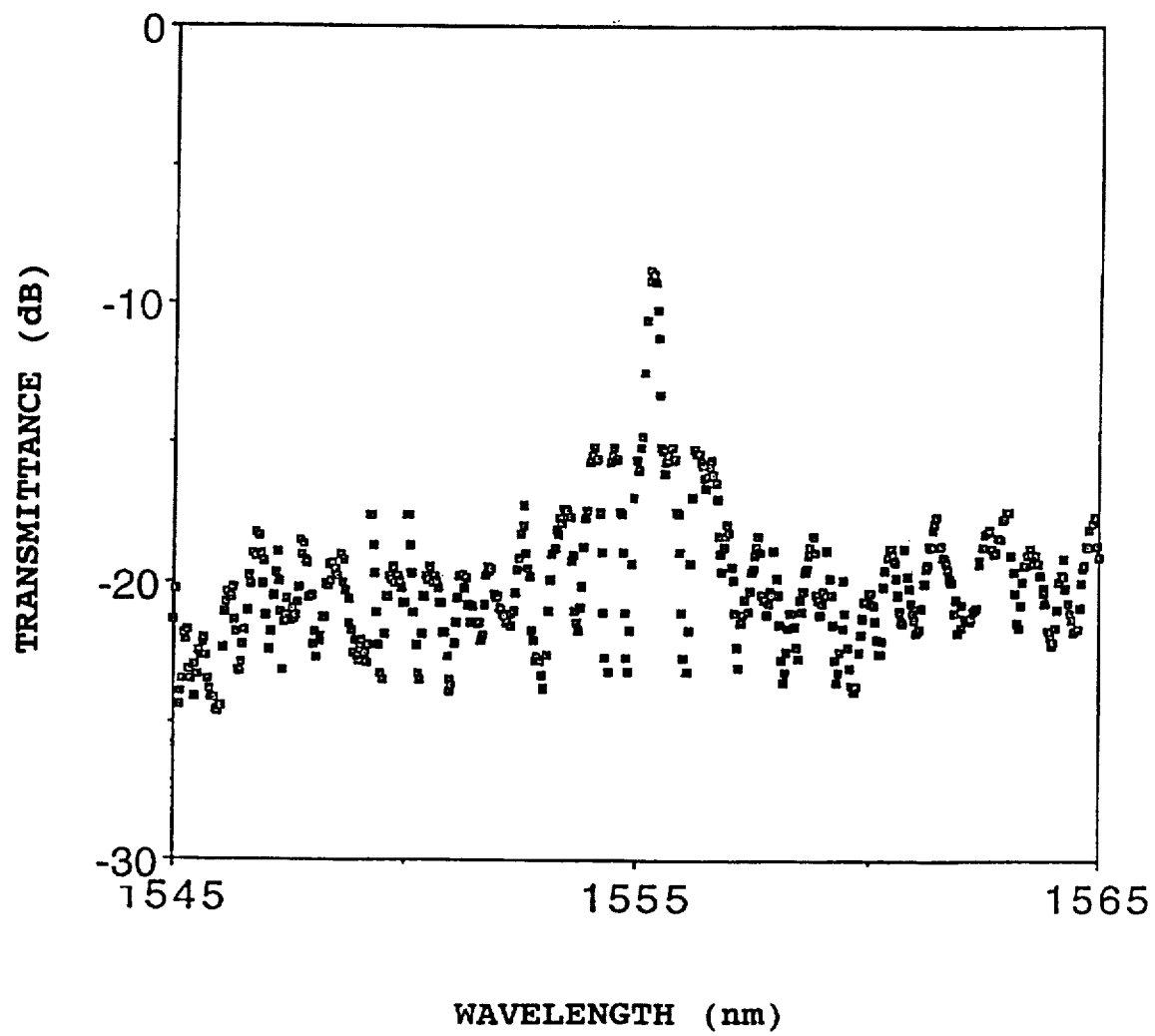
FIG. 31 is a diagram showing wavelength characteristics of the wavelength multiplexer of FIG. 30.
Figure 32:
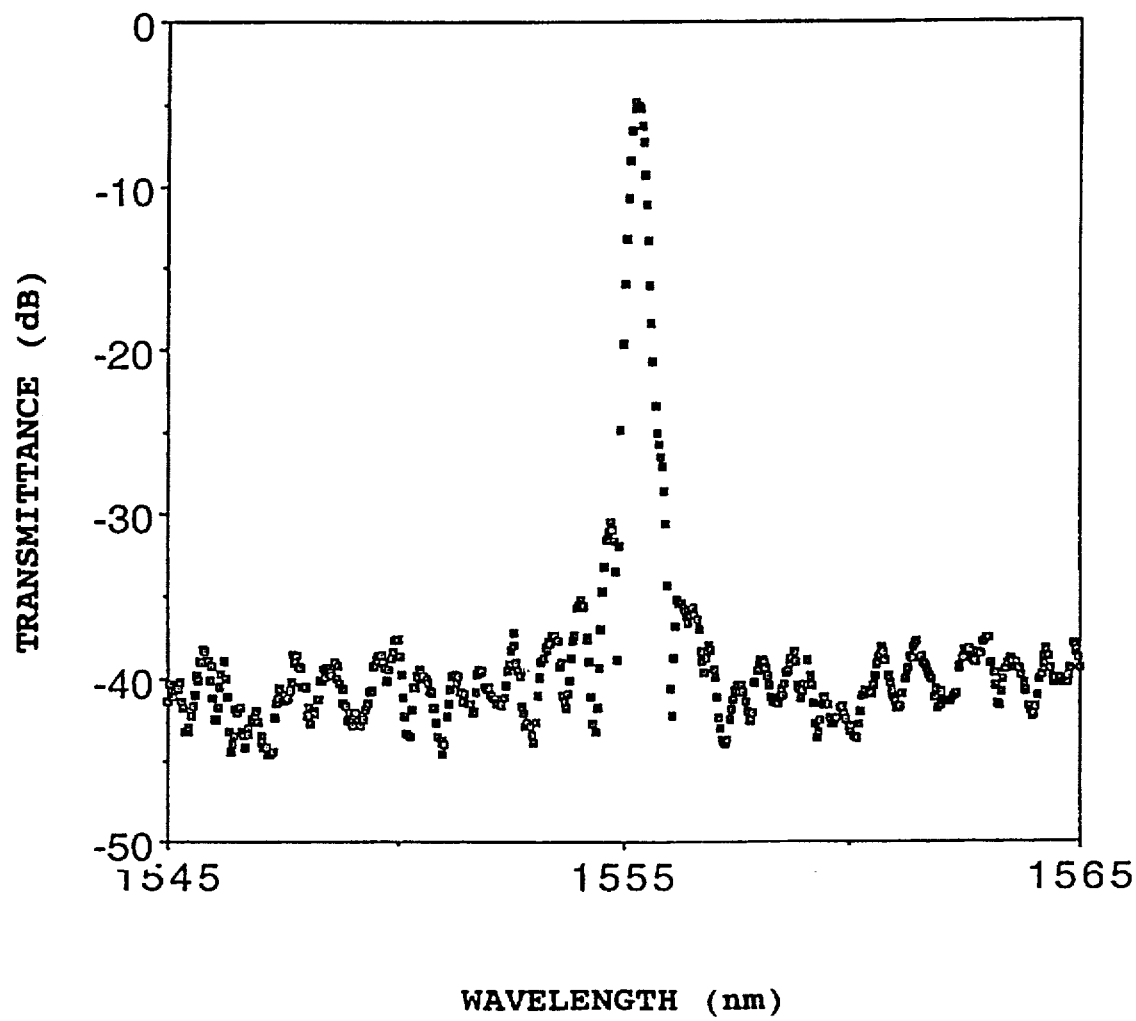
FIG. 32 is a diagram showing wavelength characteristics of the tenth embodiment.

The construction is nearly the same as Embodiment 7, but differs in that a groove 8 is formed in the vicinity of the substrate end face where the dielectric multilayer mirror 502 of the arrayed-waveguide 307 is provided, and a polyimide quarter waveplate 503 is inserted in the groove 8 with its optical principal axis inclined at an angle of 45° to the substrate. As described above, stance quartz glass waveguide has a birefringence, an interferometer composed of the waveguide has a polarization dependence. To prevent this, insertion of a half waveplate at the center of the interferometer is effective but, in a construction as Embodiment 7, which is not a symmetrical circuit, the half waveplate cannot be inserted at the center of the interferometer. Instead, a method in which a quarter waveplate vacuum evaporated with a dielectric multilayer mirror is stuck on the substrate end face to effect TE/TM mode conversion may be considered. This method is effective as a method for mode conversion of reflected light, but dissatisfactory when applied to an arrayed-waveguide grating as the present embodiment. This is because, in the arrayed-waveguide grating, unless the respective differences of optical path lengths of the adjacent arrayed-waveguides are equal with an accuracy of less than 0.1 μm, an error occurs when the light undergoes multiflux interference. This results in deteriorated characteristics. Therefore, in the method where a quarter waveplate vacuum evaporated with a dielectric multilayer mirror is stuck on the substrate end face, it is very difficult for 100 units of arrayed-waveguides to arrange spacings between the quarter waveplates and waveguides in line with an accuracy of within 0.1 μm. Construction of a reflective arrayed-waveguide grating wavelength multiplexer actually produced by a method of sticking a quarter waveplate 504 and its wavelength characteristics are shown in FIG. 30 and FIG. 31, respectively. It can be seen from the FIG. 31 that only about −10 dB of crosstalk is achieved. In the present embodiment, to solve the problem, a quarter waveplate 503 is inserted in the vicinity of the substrate end face of the arrayed-waveguide 307, and the dielectric multilayer mirror 502 is directly vacuum evaporated on the substrate end face. This achieves TE/TM mode conversion of reflected light, and prevents occurrence of errors in optical path length difference between adjacent arrayed-waveguides 307. Here, the vicinity of the substrate end face means that a distance D between the wavelength plate 503 and the substrate end face is a value which satisfies $$D < \lambda/(20 \cdot B)$$

where a distance between the wavelength plate and the substrate end face is D, a waveguide birefringence is B, and λ is an optical wavelength input to the arrayed-waveguide grating. Since the silica-based planar waveguide used in the present embodiment has a birefringence of $B= 1 \times 10^{-4}$, optical wavelength input to the arrayed-waveguide grating is λ= 1.55 μm, D is less than 625 μm. In practice, a 20 μm groove is machined by a dicing saw at a position of 100 μm from the substrate end face, and the quarter waveplate 503 is inserted so that the optical principal axis inclines at an angle of 45°. Wavelength characteristics of the practically produced wavelength multiplexer are shown in FIG. 32. The crosstalk is less than −30 dB. The reason why the crosstalk is reduced compared to FIG. 31 is that, as described above, a TE/TM mode converter is achieved in a condition where an optical path length error between the arrayed-waveguides is suppressed.

Embodiment 11

Figure 33:
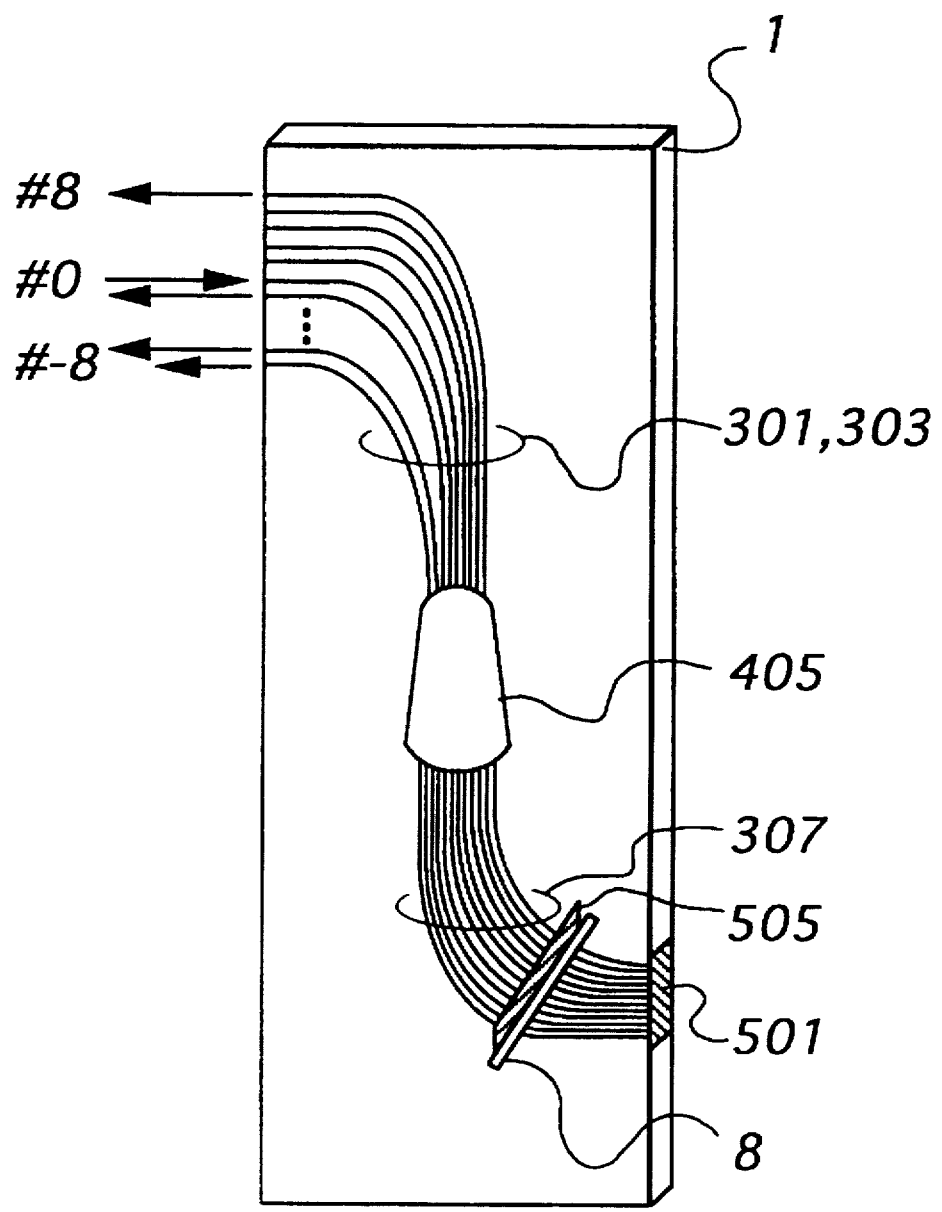
FIG. 33 is a schematic view showing the optical power splitter with a wavelength routing function in an eleventh embodiment.

FIG. 33 shows an optical power splitter with wavelength routing function as an eleventh embodiment of the present invention. As Embodiment 10, the present embodiment is also based on Embodiment 7 from which the polarization dependence of the reflective arrayed-waveguide grating.

The construction is based on Embodiment 7, in which a groove 8 is formed in the arrayed-waveguide 307 of the reflective arrayed-waveguide grating, where a half waveplate 505 is inserted so that its optical principal axis is inclined at an angle of 45° to the substrate. Position of the groove 8 is limited as follows.

A maximum transmission wavelength $\lambda_c$ (hereinafter referred to as central wavelength) from the central port of the arrayed-waveguide grating to the central port is given by the following equation:

$$\lambda_c = n \times \Delta L / m$$

where m is a diffraction order (integer), $\Delta L$ is a difference in length between adjacent arrayed-waveguides, and n is a refractive index. The polarization dependence of central wavelength is due to a difference in refractive index between TE mode light and TM mode light. The relation is represented by the following equations:

$$\lambda_c(n_{TE}) = n_{TE} \times \Delta L / m$$

$$\lambda_c(n_{TM}) = n_{TM} \times \Delta L / m$$

Figure 34:
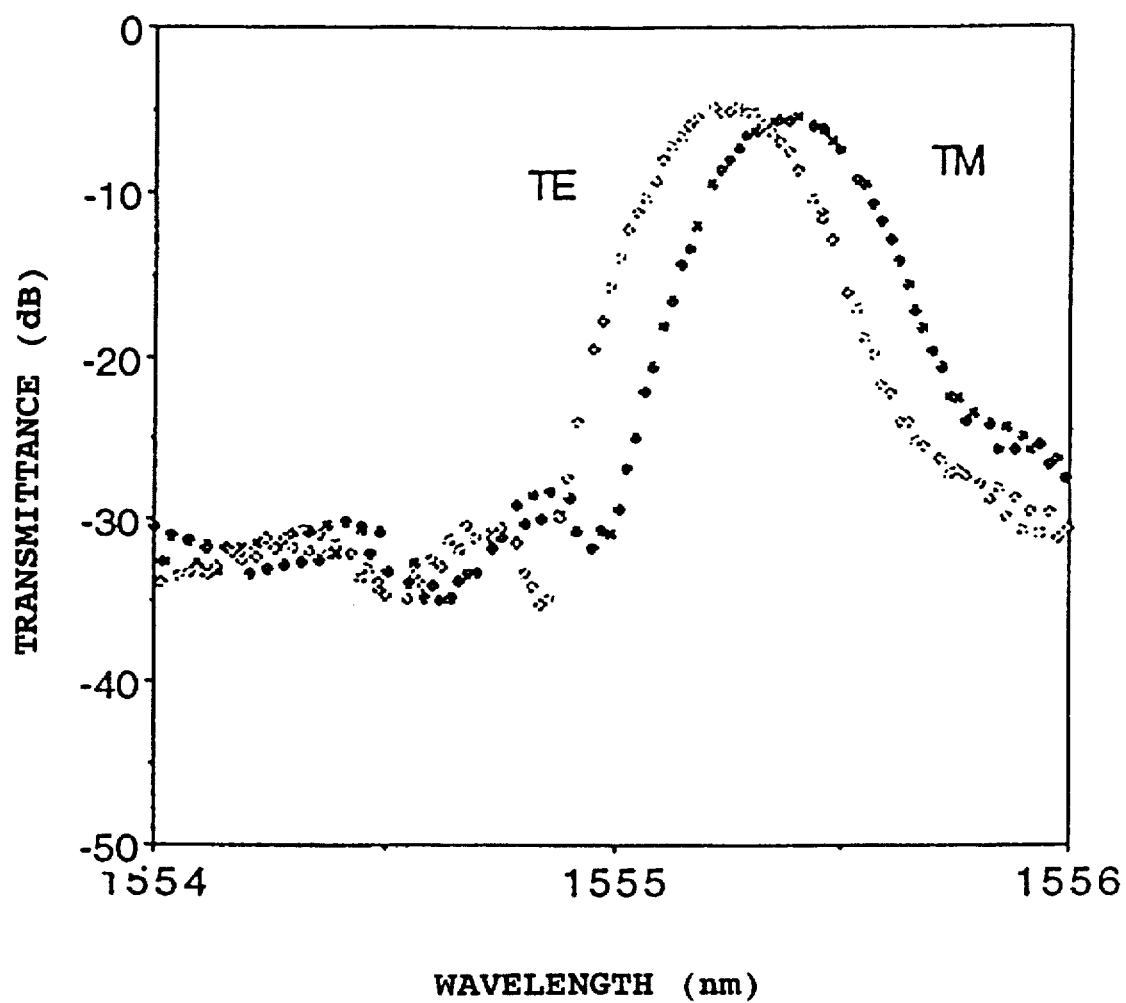
FIG. 34 and FIG. 35 are diagrams showing transmission wavelength characteristics before and after mounting a half waveplate, respectively.
Figure 35:
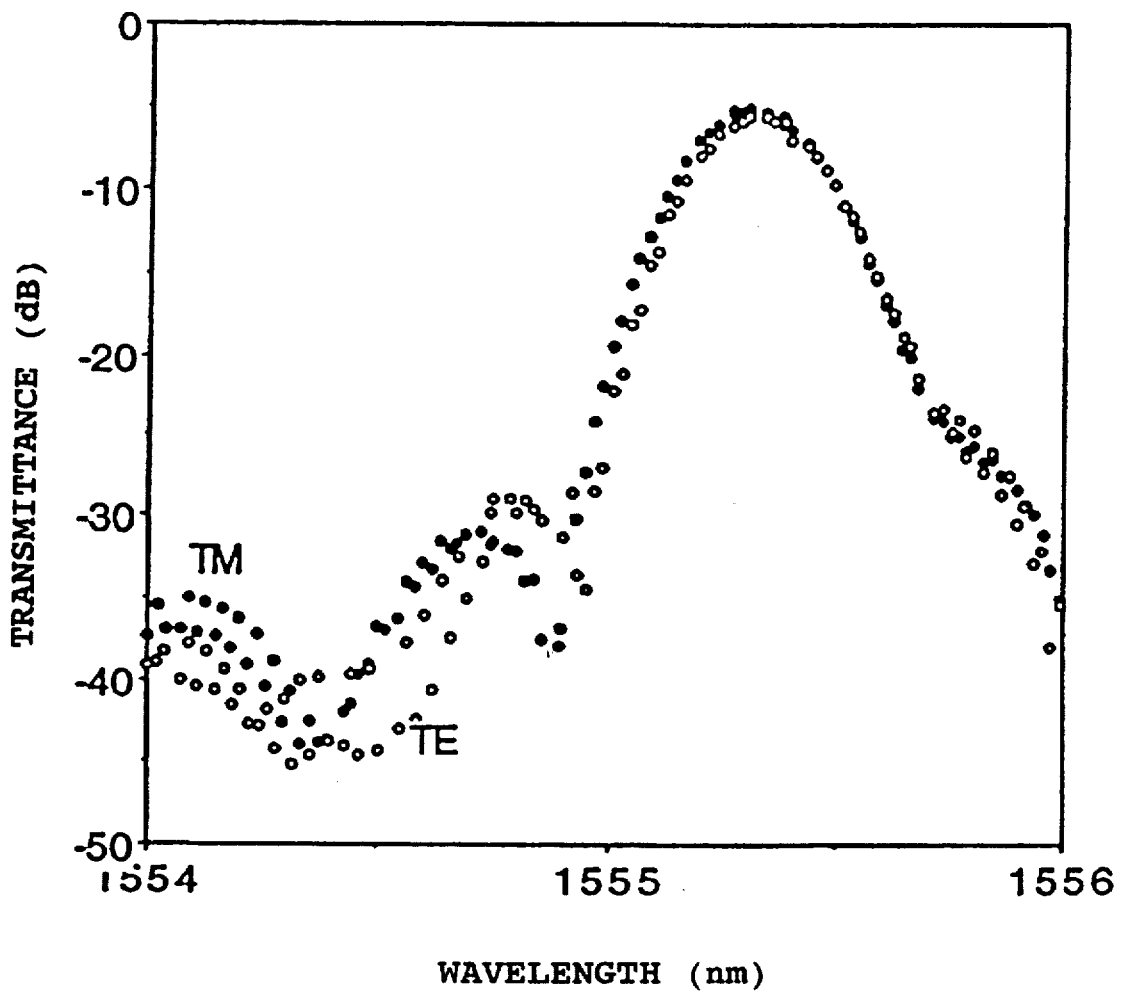

The polarization dependence of central wavelength can be eliminated by inserting the TE/TM mode converter so that light is transmitted in the TE mode in a half of the length difference between adjacent arrayed-waveguides and in the TM mode in the remaining length difference. For example, when the length difference between adjacent arrayed-waveguides is $\Delta L/2$ in a reflective arrayed-waveguide grating, the half waveplate is inserted so that the distance from the reflection end face of each arrayed-waveguide to the half waveplate 505 is shifted by $\Delta L/4$ between adjacent arrayed-waveguides, thereby eliminating the polarization dependence of central wavelength. Actually, the excessive loss is smaller when the groove 8 is provided at an angle as close to perpendicular to the waveguide as possible. For this purpose, in the present embodiment, as shown in FIG. 33, the groove 8 is formed so as to be perpendicular to the waveguide at the bent portion of the arrayed-waveguide 307. FIG. 34 shows transmission wavelength characteristics between central ports before inserting the half waveplate, and FIG. 35 shows characteristics after inserting the half waveplate. It can be seen that the polarization dependence is obviously eliminated.

Embodiment 12

Figure 36:
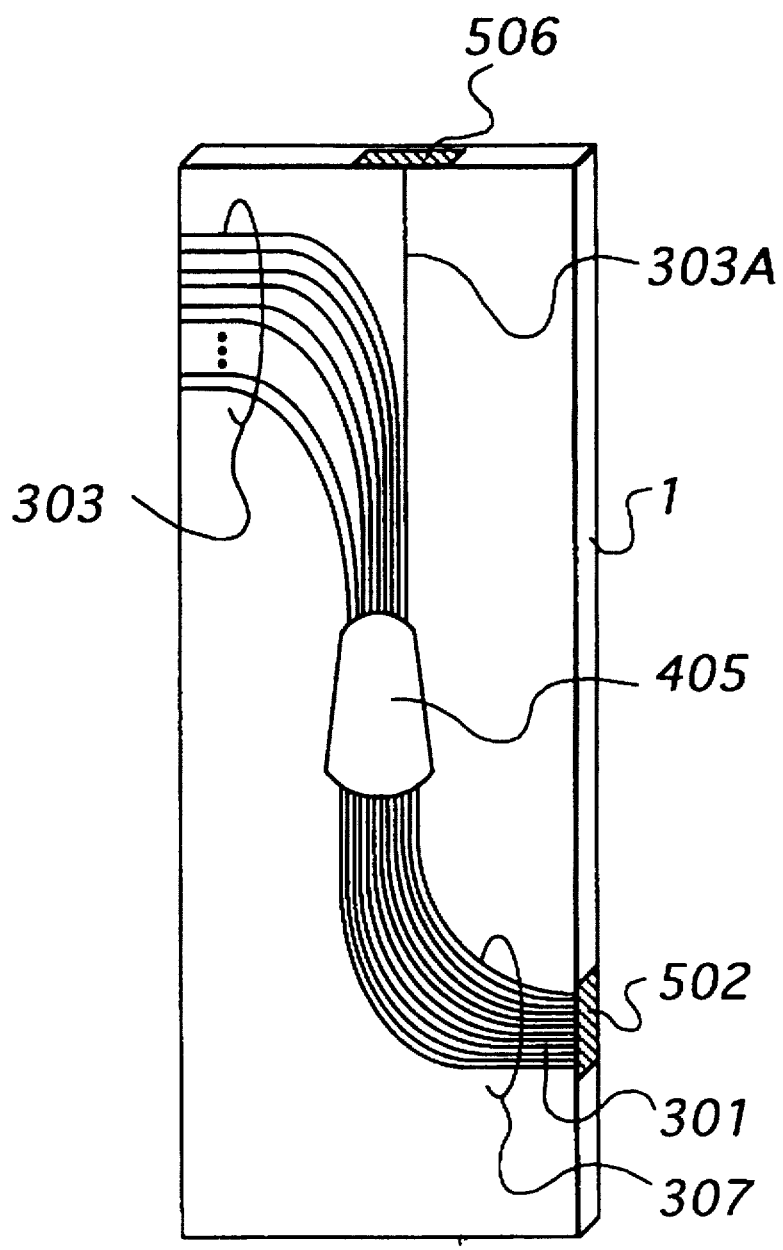
FIG. 36 is a schematic view showing the optical power splitter with a wavelength routing function in a twelfth embodiment.

FIG. 36 shows an optical power splitter with wavelength routing function as a twelfth embodiment of the present invention.

Figure 37:
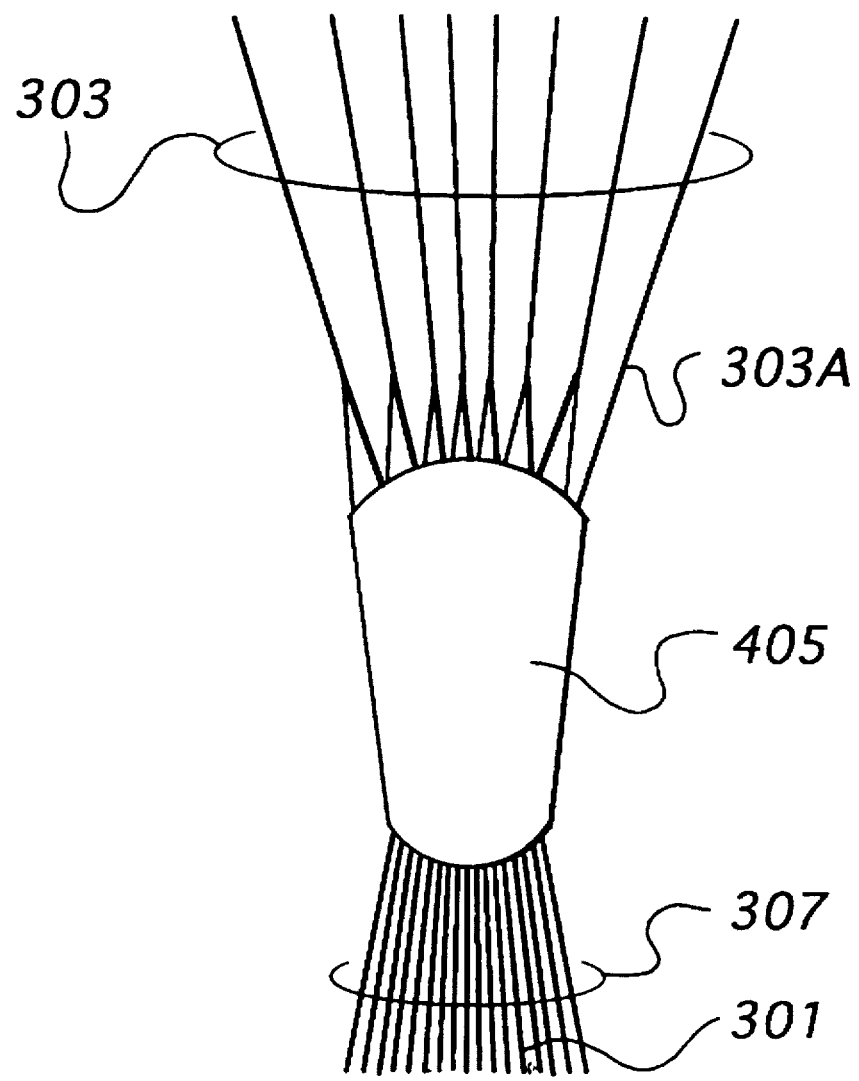
FIG. 37 is a schematic enlarged view showing part of FIG. 36.

The construction is based on Embodiment 7 of the optical power splitter with wavelength routing function, in which reflective treatment is provided on a substrate end face of the input/output waveguide. Specifically, as shown in FIG. 37, a waveguide 303A of the input/output waveguides 303 is caused to cross a substrate end face different from other input/output waveguides, where a metal film 506 is vacuum evaporated to provide reflective treatment. The reflective treatment is to monitor variations with temperature in the central wavelength of the arrayed-waveguide grating from the outside. Therefore, the portion connected to the slab waveguide of the reflective treated input/output waveguide is not tapered. FIG. 37 shows an enlarged view of the slab waveguide portion.

When the arrayed-waveguide grating wavelength multiplexer is used as a wavelength router, loss of the wavelength router is increased if the central wavelength of the wavelength multiplexer varies with temperature. To prevent this, the central wavelength is determined, by using a reflective port, according to the present embodiment and light differing by a certain wavelength from the central wavelength is input to achieve a desired wavelength router.

The present embodiment uses a metal film for reflective treatment, but this can be achieved only by polishing the substrate end face depending on application. That is, Fresnel reflection of glass waveguide and air can be utilized.

The above-described embodiments use glass waveguides on the silicon substrate to achieve an integrated waveguide circuit. However, this circuit can also be achieved with other optical waveguide circuit components.

[Application of Integrated Optical Waveguide to Communication System]

Embodiment 13

Figure 38A:
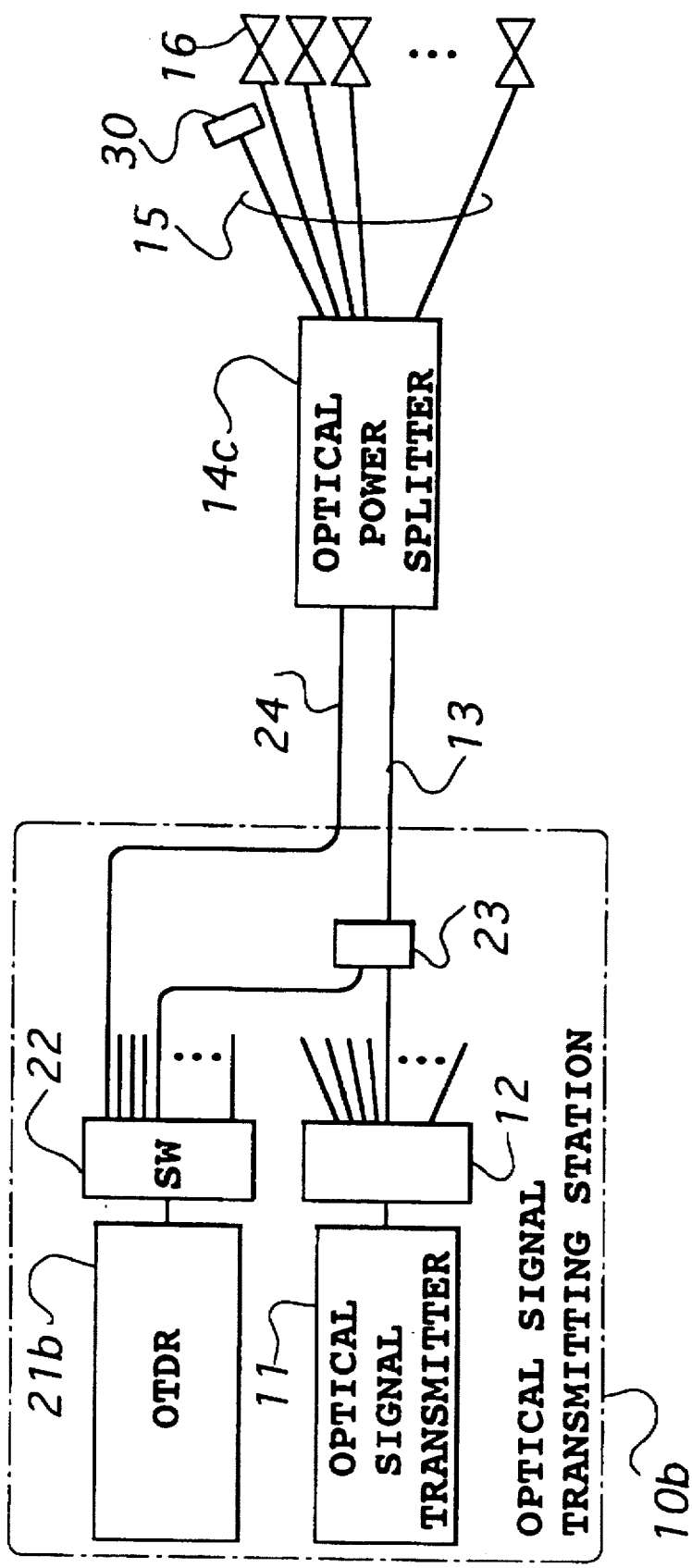
FIG. 38A is a schematic view showing construction of an embodiment of the PDS test system of the present invention.
Figure 38B:
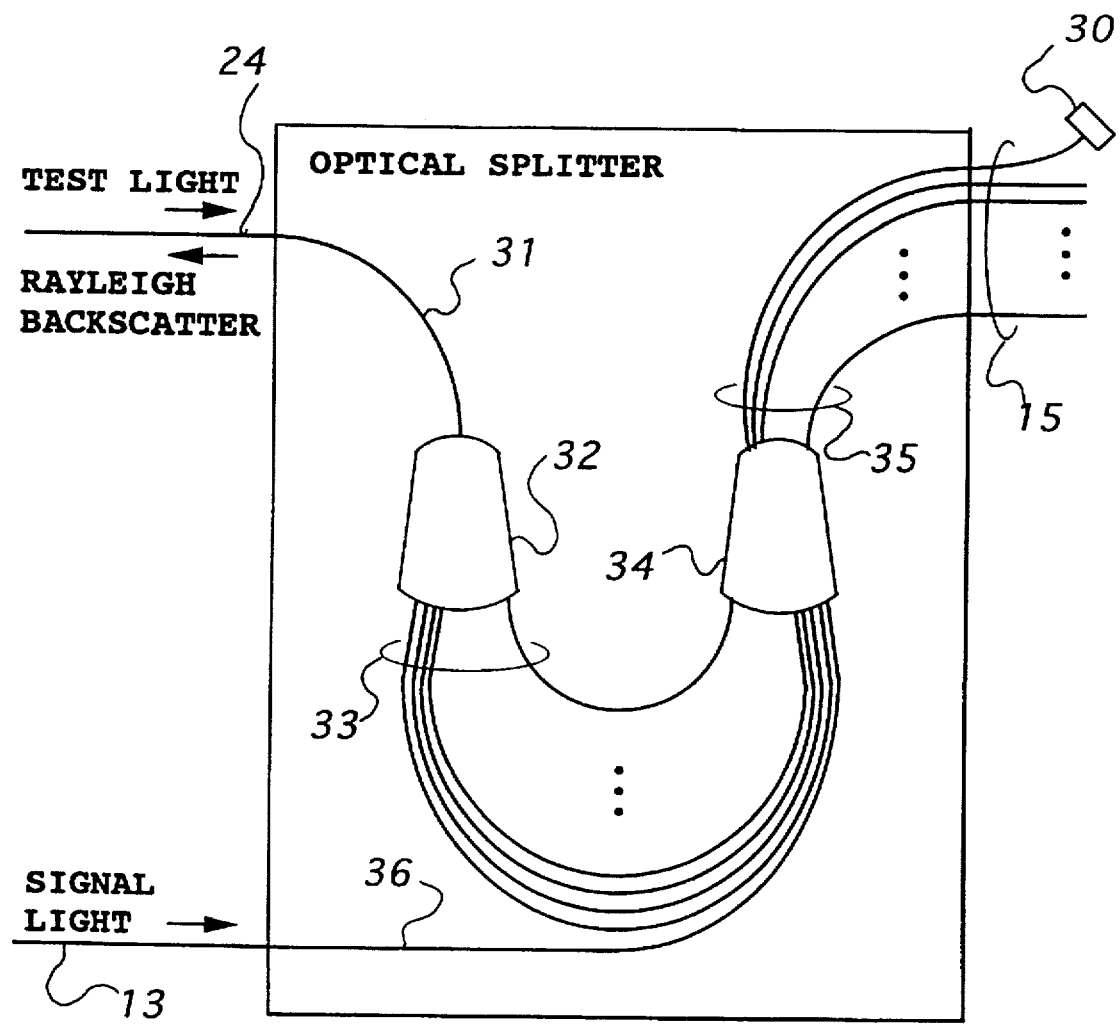
FIG. 38B is a schematic view showing the optical waveguide circuit of an optical power splitter.

FIGS. 38A and 38B show a construction of an embodiment of the PDS test system of the present invention. FIG. 38A shows the entire construction, and FIG. 38B shows a construction of an optical power splitter 14c. Similar components to those used in a prior art PDS test system have similar reference numerals.

In the present embodiment, it is similar to the prior art system that an optical pulse line test device (OTDR) 21b selects the wavelength of test light. The present embodiment is characterized by the construction of the optical power splitter 14c.

The present embodiment requires a measure for temperature due to characteristics of the optical power splitter 14c, function of an optical reflective treated portion 30 as a means to resolve this problem and the corresponding optical pulse line test device 21b will be describe later.

The optical power splitter of the present embodiment uses the integrated optical waveguide circuit or an optical power splitter with wavelength routing function. The function of the optical power splitter 14c of FIG. 38B is equivalent to the integrated waveguide circuit or the optical power splitter with wavelength routing function of Embodiment 1 shown in FIG. 5.

That is, an input waveguide 31 input with test light from an optical line 24, a slab waveguide 32, a plurality of arrayed-waveguides 33 with different lengths, a slab waveguide 34, and a plurality of output waveguides 35 connected to individual optical lines 15 are connected in series to form an arrayed-waveguide grating wavelength multiplexer. Further, an input waveguide 36 input with signal light from an optical line 13 is connected to the slab waveguide 34 parallel to the arrayed-waveguide 33 to form an optical power splitter, in which the slab waveguide 34 and the output waveguide 35 are commonly used.

Split of signal light by the optical power splitter and wavelength branch operation by the arrayed-waveguide grating wavelength multiplexer will be described.

Figure 39:
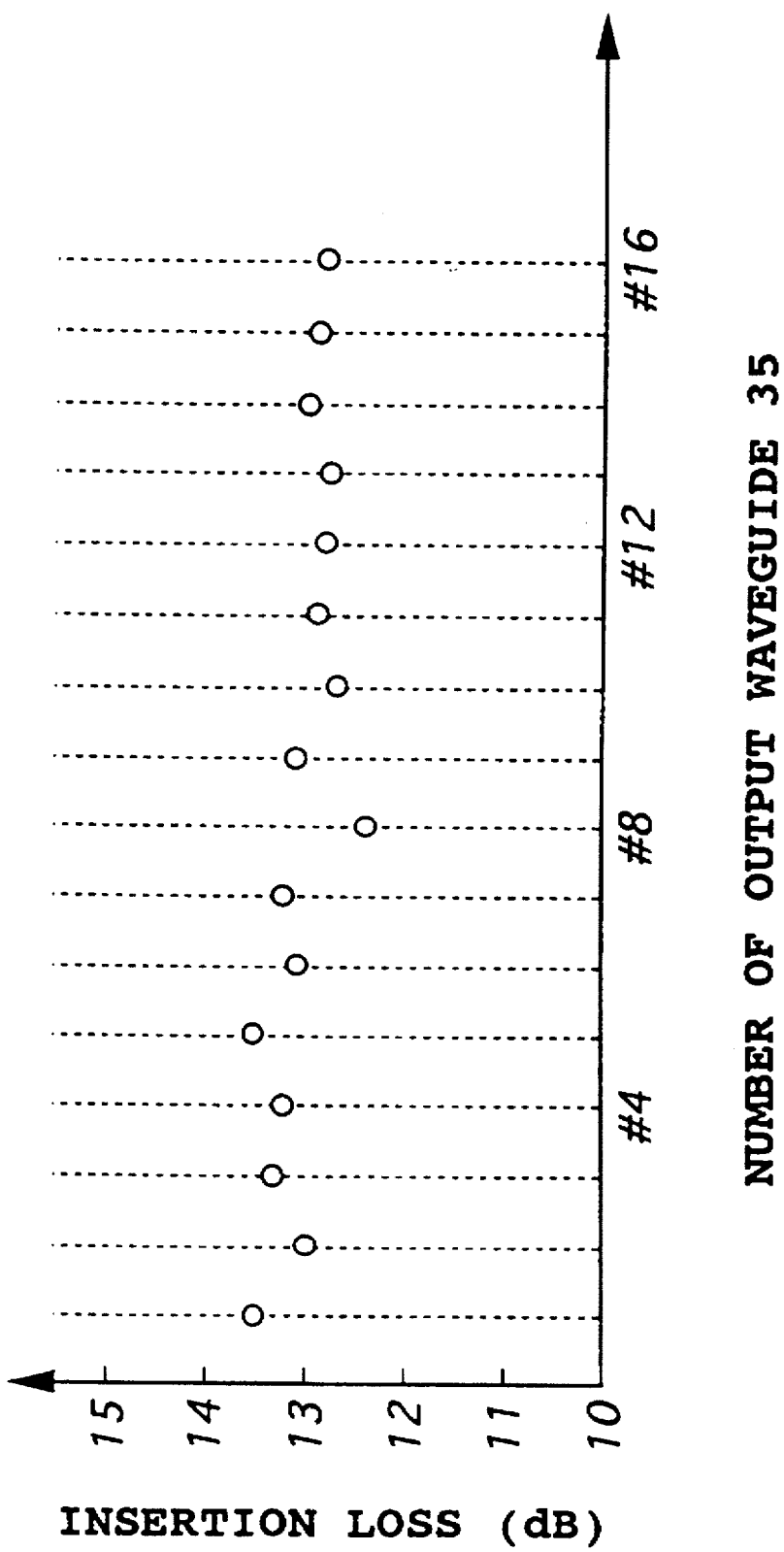
FIG. 39 is a diagram showing insertion loss of signal light in the output optical waveguide 35 of the optical power splitter 14c.

When signal light is input from the input waveguide 36 to the slab waveguide 34, the light is split to the individual optical lines 15 through the individual output waveguides 35. At this moment, since intensity distribution of the signal light diffracted by the slab waveguide 34 has Gaussian distribution, light coupled with the waveguide disposed outside of the plurality of output waveguides 35 arranged in parallel is weakened. Then, slab waveguide 34 side inlet of the individual waveguides 35 is formed to a horn-like shape, narrow in width at the center and wide at the periphery, so that the signal light is split with the same intensity to the individual output waveguides 35. As a result, insertion loss to the signal light is almost uniform (about 13 dB) in the individual output waveguides 35 as shown in FIG. 39, and intensity of the signal light split to the individual optical lines 15 can be nearly equal to each other. FIG. 39 shows the insertion loss when the branch number is 16 and, since the theoretical branch loss of this case is 12 dB, the excessive loss obtained by subtracting the theoretical branch loss from the insertion loss is 1 to 2 dB.

As described above, by connecting the input waveguide 36, the slab waveguide 34, and the output waveguides 35, the signal light can be uniformly split, and an optical power splitter can be constructed which suppresses the branch loss nearly to the theoretical value.

On the other hand, when test light is input from the input waveguide 31 to the slab waveguide 32, the test light is split to the plurality of arrayed-waveguides 33 disposed in parallel. Since the arrayed-waveguides 33 differ in optical path length by $\Delta L$ between the individual adjacent waveguides, a phase shift occurs to the extent corresponding to the optical path difference, and multi flux interference occurs in the subsequent slab waveguide 34. As a result, the position where the test light is focused, that is, the output waveguide 35, varies according to the wavelength of the test light.

Figure 40:
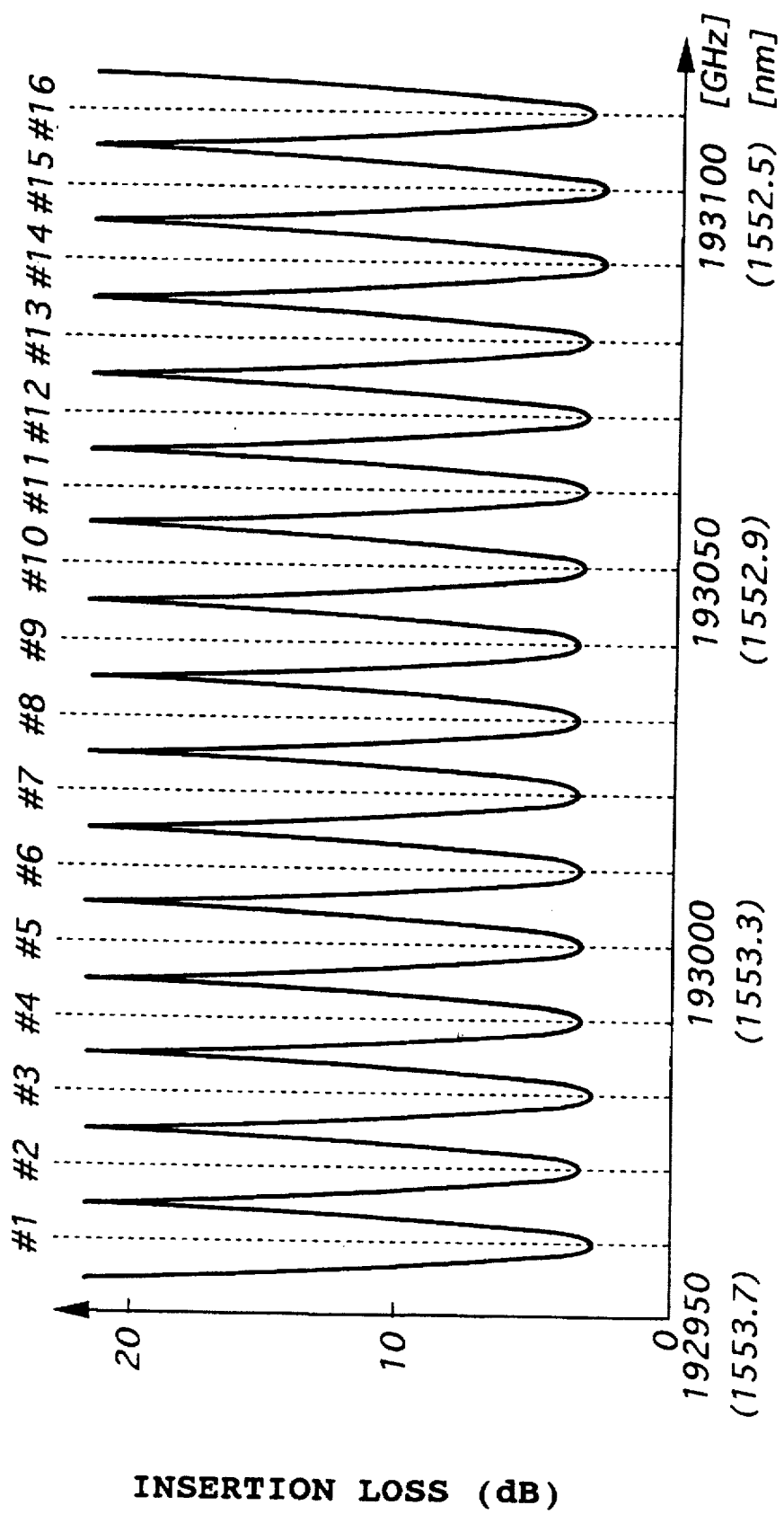
FIG. 40 is a diagram showing insertion loss wavelength characteristics of test light in the optical power splitter 14c.

Here, insertion loss versus wavelength characteristics of the test light output from the 16 output waveguides 35 are shown in FIG. 40. The present embodiment shows that the test light is wavelength demultiplexed to the #1 output waveguide 35 when, for example, the frequency of the test light is 192,960 GHz. It is also shown that when the test light frequency is shifted by every 10 GHz, the wavelength demultiplexed output waveguide 35 is moved from #2 to #16. The output waveguide 35 (#1 to #16) relative to the test light frequency (wavelength) is determined by the position of the input waveguide 31 relative to the slab waveguide 32, and the relationship is also rotationally shifted by shifting the position of the input waveguide 31. Further, in FIG. 40, insertion loss of the individual transmission wavelength is 3 to 4 dB. This insertion loss is due to the fact that the output waveguides 35 are disposed so that the loss to the signal light is minimized in the commonly used optical power splitter, and this can be theoretically reduced to zero by adjusting the circuit pattern.

As described above, by connecting the input waveguide 31, the slab waveguide 32, the arrayed-waveguide 33, the slab waveguide 34, and the output waveguides 35, an arrayed-waveguide grating wavelength multiplexer which wavelength demultiplexes the test light to the output waveguide 35 according to the wavelength can be constructed. Therefore, by selecting the test light frequency, it is possible to select the optical line 15 which conducts the test light, thereby achieving individual testing of the individual optical lines 15. Back scattered light of the same wavelength as the test light is conducted to the input waveguide 31 through the reverse route due to the symmetry of the arrayed-waveguide grating wavelength multiplexer.

As described above, in the optical power splitter 14c, the function of the arrayed-waveguide grating wavelength multiplexer for outputting to one optical line 15 according to the wavelength of the test light, and the function as an optical power splitter for splitting the signal light to the plurality of optical lines 15 can be achieved on the same substrate.

The optical pulse line test device 21b has a DFB laser, for example, as a wavelength variable light source, and an optical pulse obtained by cutting the laser light with an acoustooptic filter control to a predetermined wavelength is used as test light. The optical pulse has a very narrow spectrum, normally achieving a line width of less than 10 MHz. The wavelength control is made by controlling the temperature of the laser element by using Peltier effect. The test light is input to the optical power splitter 14c through a space switch 22 and the optical line 24, and output to the corresponding optical line 15. On the other hand, Rayleigh backscatter of the same wavelength as the test light generated in the optical line 15 returns to the optical pulse line test device 21b through the optical power splitter 14c, the optical line 24, and the space switch 22, thus effecting a predetermined monitoring. When the test light output from the optical pulse line test device 21b had a power of 0 dBm, the power of the test light reached the optical line 15 was −9 dB. When the minimum detection level of the optical pulse line test device 21b was −95 dBm and the Rayleigh backscatter was −57 dB, the dynamic range of the optical pulse line test device 21b was 0+95−57−9×2= 20 dB.

Further, by conducting the test light from the space switch 22 to an optical coupler 23 to be coupled with the optical line 13, the optical line 13 from an optical signal transmission station 10c to the optical power splitter can be monitored as in the prior art device.

Wavelength characteristics of the arrayed-waveguide grating wavelength multiplexer produced using silica-based planar lightwave circuits on the silicon substrate vary with the substrate temperature at a rate of 1.4 GHz/°C. That is, the insertion loss characteristics of test light shown in FIG. 40 are shifted in response to the substrate temperature. Therefore, if the optical power splitter 14c is used without temperature control, transmission wavelength of the individual output waveguides 35 is shifted and the test light loss is considerably increased. Further, when variation in substrate temperature is large, for example, when the substrate temperature is varied by 7° C., test light to be demultiplexed to a predetermined output waveguide 35 is output to the adjacent output waveguide. This may result in that the test is impossible due to too large loss, or the optical line 15 being tested differs from the object, even though the wavelength of test light is set only by the optical pulse line test device 21b.

Figure 41:
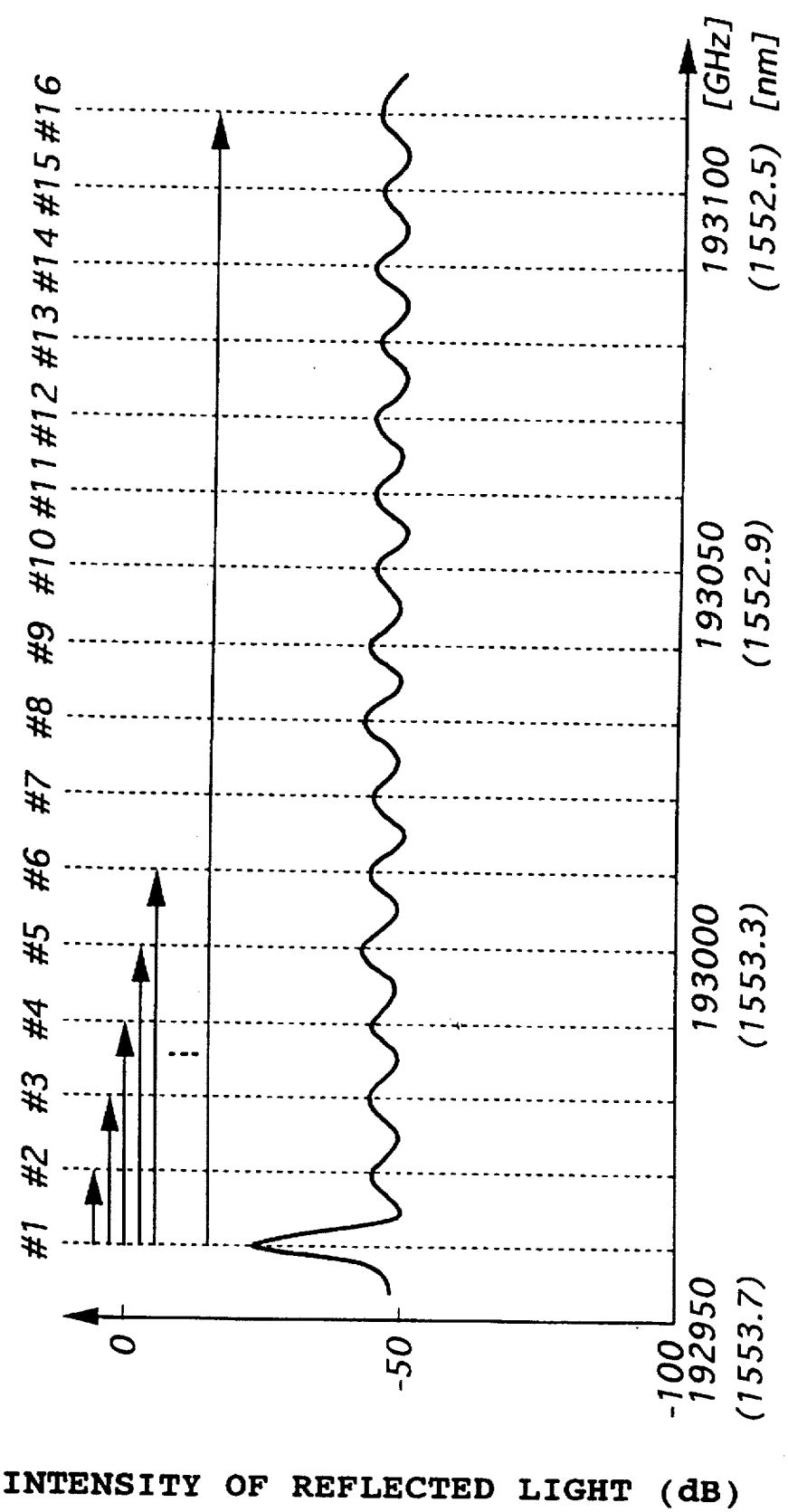
FIG. 41 is a reflection spectrum when sweeping wavelength of a test light.

Then, an optical reflective treated portion 30 is formed on the end face of a predetermined output waveguide 35 or at the other end of a predetermined optical line 15, and the optical pulse line test device 21b sweeps the wavelength of test light within a predetermined range. At this moment, test light of the wavelength demultiplexed to the predetermined output waveguide 35 is relatively reflected strongly. For example, in the example of insertion loss versus wavelength characteristics in FIG. 40, when the #1 output waveguide 35 is provided with optical reflection treatment, and the frequency of test light is swept from 192,950 GHz to 193,110 GHz, 192,960 GHz reflection light has the greatest intensity as shown in FIG. 41. Others are intensities of Rayleigh backscatter from the optical line 15 for the individual wavelengths.

As described above, by detecting the wavelength of reflected light showing the highest intensity in the optical pulse line test device 21b, wavelength of test light demultiplexed to the #1 output waveguide 35 can be identified. Further, the wavelength of the test light corresponds to the substrate temperature of the optical power splitter 14c, which can be used as a standard. That is, since the central wavelength interval of light demultiplexed to the individual output waveguides 35 is almost unchanged by the temperature, in the above example, by controlling the test light frequency at every 10 GHz intervals with respect to the reflected light frequency showing the highest intensity, the test light can be demultiplexed to a predetermined output waveguides 35. For example, when frequency of +30 GHz from the reference frequency is used, test light can be demultiplexed to the #4 output waveguide 35, thereby testing the corresponding optical line 15.

At present, the signal light wavelength and the test light wavelength are unknown when the optical branch line system is practically applied. When an optical branch line test system is constructed under such circumstances, the system is strongly required to have flexibility. Of constructions of the optical power splitter 14c used in the system of the present invention, the optical power splitter has no wavelength dependence since it is very simple in construction. Further, since the arrayed-waveguide grating wavelength multiplexer periodically shows the same wavelength characteristics with a period of its FSR (free spectral range), it can be functioned as a wavelength multiplexer independent of the 1.3 μm band, 1.55 μm band, or 1.6 μm band. That is, the optical branch line test system of the present invention can be used, as is, even when it is required to change the wavelength of the signal light or test light.

Further, in the construction shown in FIG. 38A, when a plurality of the optical lines 13 and 24 to the optical power splitter 14c are individually provided to improve reliability, it is sufficient to provide a plurality of the corresponding input waveguides 36 and 31. When the input waveguide 31 input with test light is changed, as described above, correspondence of the test light wavelength to the optical line 15 is changed, but this can be easily dealt with by determining the reference test light wavelength.

In this embodiment, the optical power splitter, which allows the equal insertion losses in individual output waveguides when the frequency of the test light was shifted at every 10 GHz intervals, was used. However, the optical power splitter with wavelength routing function as shown in any one of Embodiments 1 to 12 can be used in the PDS test system.

Embodiment 14

Figure 42:
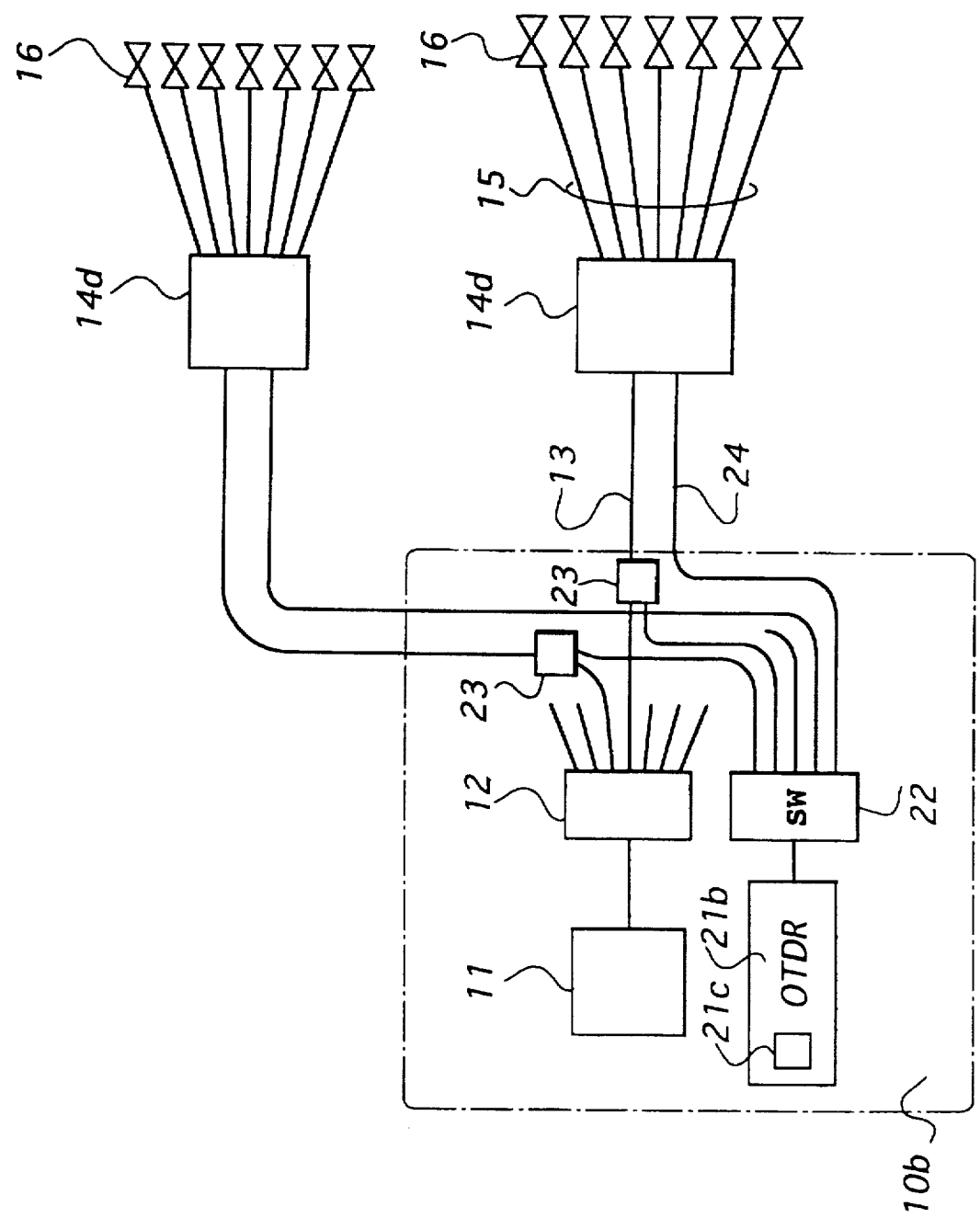
FIG. 42 is a schematic view showing construction of another embodiment of the PDS test system of the present invention.

FIG. 42 shows an optical branch line test system as a fourteenth embodiment of the present invention. Main difference of the present embodiment from the embodiment shown in FIGS. 38A and 38B is that another optical power splitter 14d with wavelength routing function is used in the optical power splitter, and the optical reflective treated portion 30 is eliminated.

Figure 43:
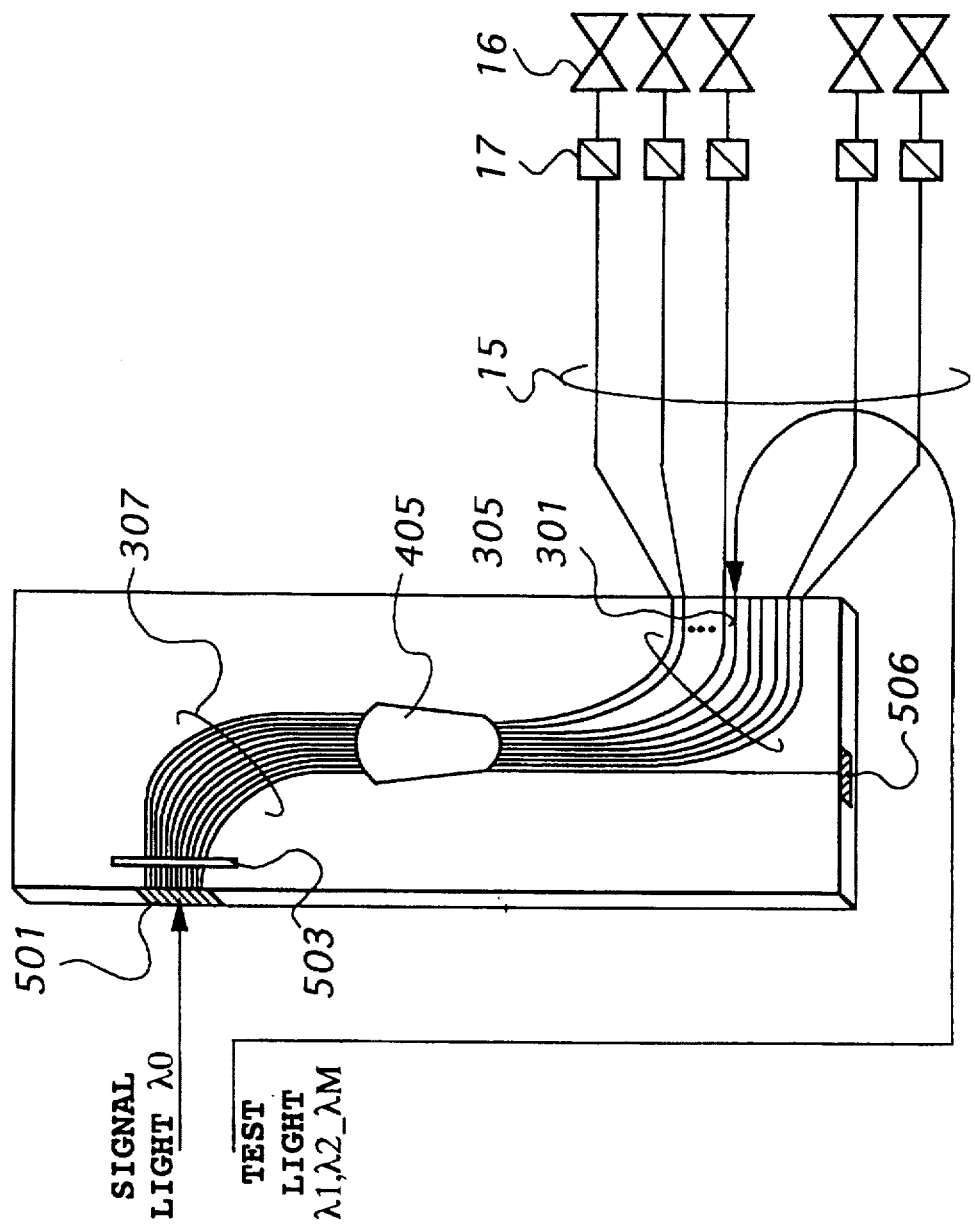
FIG. 43 is a schematic view showing construction of further embodiment of the PDS test system of the present invention.

In the present embodiment, an optical power splitter with wavelength routing function combining the function of the integrated optical waveguide circuit of Embodiments 8, 10, and 12, that is, a waveguide circuit having a dielectric multilayer wavelength filter 501, a quarter waveplate 503, and a metal reflector film 506 is used to construct a PDS system. FIG. 43 shows the circuit construction of the optical power splitter 14d. Signal light $\lambda_o$ is input to the input waveguide, which is arranged for example at the center of the arrayed-waveguides 307, for the optical power splitter, and equally output to the individual output waveguides 305. Test light $\lambda_1$ to $\lambda_M$ is input to the input/output waveguide 301 at the center of the wavelength multiplexer comprising the reflective arrayed-waveguide grating and, as described above, output to a desired branch line 15 in response to the wavelength. Therefore, the wavelength of the variable wavelength light source can be selected to test a desired branch line. A test light blocking filter 17 is provided between the individual branch line 15 and the subscriber terminal 16.

In the present embodiment, the arrayed-waveguide grating wavelength multiplexer which functions as a wavelength router is formed of silica-based planar lightwave circuit. Therefore, the central wavelength of the wavelength multiplexer slightly varies with temperature. Specifically, the central wavelength has a temperature dependence of 0.011 nm/°C. Therefore, when test light of a wavelength is output to the corresponding line, loss is varied according to a change in the central wavelength due to temperature variation of the optical power splitter with wavelength routing function. To prevent this, the present embodiment determines the reference wavelength using the following procedure. First, light with the wavelength in the vicinity of the wavelength output to the reflection treated output port is input as test light. Then, the wavelength of the test light is swept in the vicinity of the wavelength, and a wavelength of the maximum return light intensity is determined to obtain the reference wavelength. At this wavelength, the transmittance to the reflection treated output waveguide is the highest. Test light shifted in wavelength by the predetermined wavelength can be input to achieve testing of a desired branch line without increasing loss.

Figure 44:
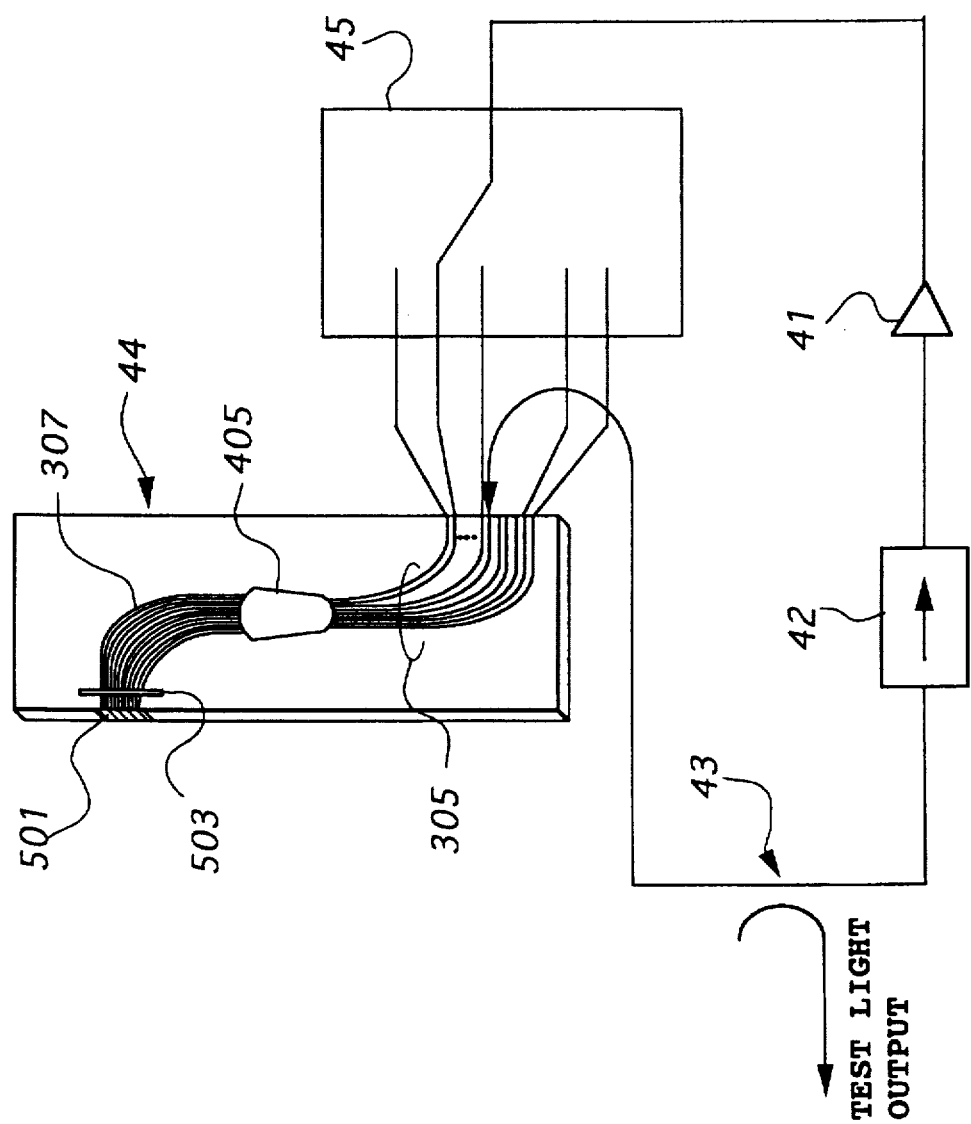
FIG. 44 is a schematic view showing construction of a light source.
Figure 45:
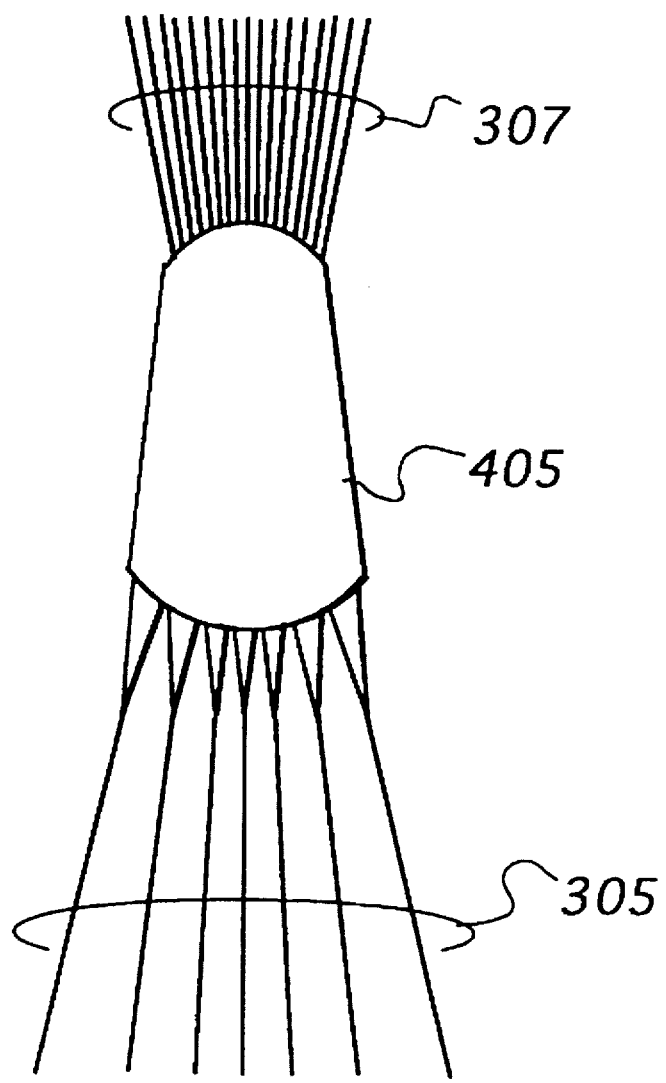
FIG. 45 is a schematic enlarged view showing part of an optical power splitter used in a light source.

Various types of the wavelength variable light source can be used, and the present embodiment uses a light source which is similarly designed to the optical power splitter with wavelength routing function used as the optical power splitter. FIG. 44 shows the construction of the wavelength variable light source, and FIG. 45 shows an enlarged view in the vicinity of the slab waveguide of the arrayed-waveguide grating.

The wavelength variable light source comprises an optical amplifier 41, an isolator 42, a coupler 43, and a wavelength filter 44 which passes only a specific wavelength. As the wavelength filter passing only a specific wavelength, an arrayed-waveguide grating wavelength multiplexer of the optical power splitter with wavelength routing function is used. As a result, a light source can be achieved which oscillates at the central wavelength of the arrayed-waveguide grating. Further, the oscillation wavelength can be digitally selected by changing over the output waveguide of the arrayed-waveguide grating by a 16×1 switch 45. In the arrayed-waveguide grating used here, as shown in FIG. 45, the position of the connection between its input/output waveguide 305 and the slab waveguide 405 was set equal to the arrayed-waveguide grating of the optical power splitter with wavelength routing function, and only the taper was eliminated. Further, the length difference between adjacent arrayed-waveguides and the shape of the slab waveguide were the same. Detailed design values were: 16 units each of input waveguides and output waveguides, focal length of the slab waveguide: 9,381 μm, optical path difference between adjacent arrayed-waveguides: 91.5 μm (actually 45.8 μm due to reflective type), number of the arrayed-waveguides: 100, diffraction order: 59, and optical wavelength used as wavelength multiplexer: 1.55 μm. Using the same basic construction of the arrayed-waveguide grating in the optical wavelength filter used as a wavelength multiplexer, oscillation wavelength when the switch of the wavelength variable light source is changed over corresponds to the central wavelength in the wavelength multiplexer with wavelength routing function. That is, test light oscillated when the switch 45 of the variable wavelength light source is set to the first output port of the arrayed-waveguide grating is input from the test light input waveguide of the optical power splitter with wavelength routing function, and output to the branch line 15.

When the temperature of the arrayed-waveguide grating for the wavelength variable light source and the temperature of the optical power splitter with wavelength routing function differ from each other, loss of test light in the optical power splitter with wavelength routing function is increased. Then, light of the variable wavelength light source is set in line with the central wavelength of the reflection treated port of the optical power splitter with wavelength routing function, temperature of the arrayed-waveguide grating at the wavelength variable light source side is varied in the vicinity of the wavelength to sweep the wavelength of the test light. At this moment, at the temperature of the arrayed-waveguide grating at which the return light intensity is the strongest, the switch can be changed over to vary the wavelength, the light of respective wavelength is output to the individual branch lines with maximum transmittance. The temperature at that time corresponds to the temperature of the optical power splitter with wavelength routing function located out of the optical communication station.

Embodiment 15

Figure 46:
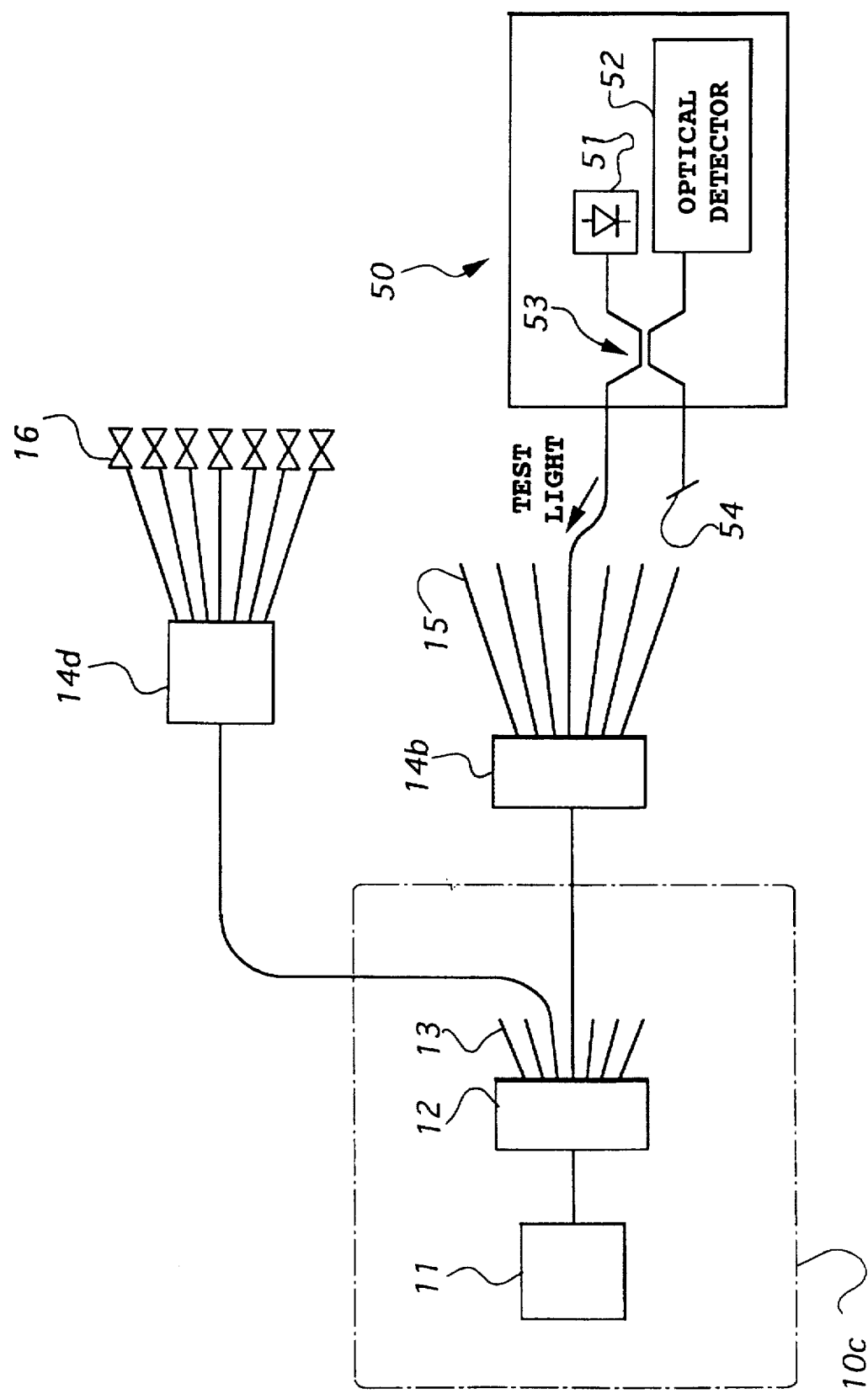
FIG. 46 is a schematic view showing construction of a line identification system of an optical branch line according to the present invention.

FIG. 46 shows an optical branch line identification system as a fifteenth embodiment of the present invention. The line identification system identifies a branch line when the branch line is once interrupted in an optical branch line work or in an initial construction work.

In the present embodiment, an optical signal from an optical transmitter 11 in an optical transmission station 10c is split by the optical power splitter 12, an optical power splitter 14d is provided in the individual branch lines 15, and line identification is carried out by test light input from an optical branch line identification device 50 to the branch line 15. The optical branch line identification device 50 comprises a wavelength variable light source 51, an optical detector 52, a coupler 53, and a mirror 54.

Figure 47:
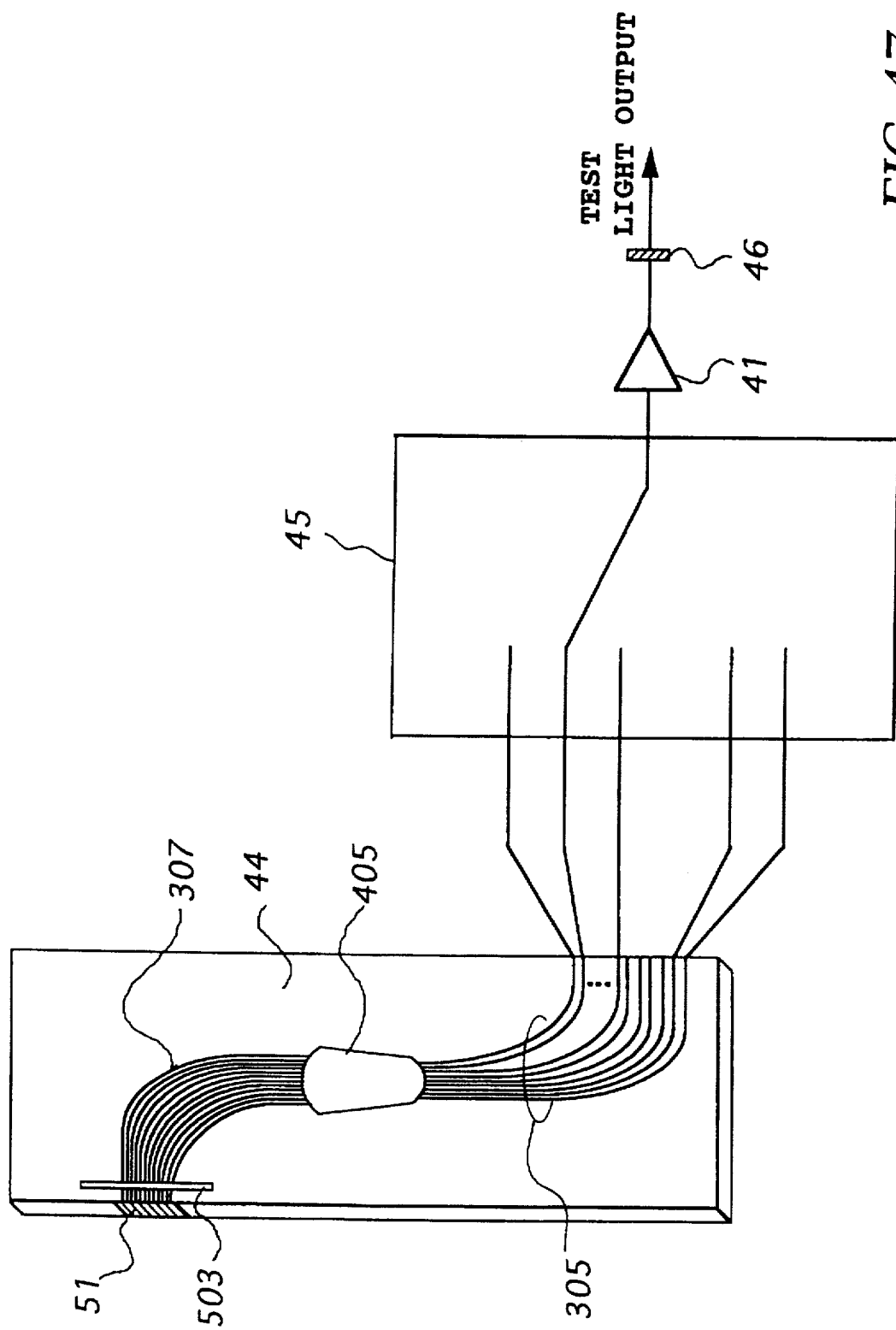
FIG. 47 is a schematic view showing construction of a light source in FIG. 46.

The optical power splitter of the present embodiment uses the optical power splitter with wavelength routing function having functions of Embodiments 8, 10, and 12 as in Embodiment 14. Further, as the light source 51 for the test light, one which is shown in FIG. 47 was used. That is, the light source 51 comprises an arrayed-waveguide grating wavelength multiplexer, a switch, for example, a 16×1 switch 45, an optical amplifier 41, and a half mirror 46. The arrayed-waveguide grating wavelength multiplexer is the same as that used in FIG. 44. As shown in FIG. 46, when test light is input from the branch line to the optical power splitter, light becomes strong at a specific wavelength. This is because light returns to itself at the specific wavelength due to the wavelength routing function of the optical power splitter with wavelength routing function. Wavelength of the return light can be measured to determine the branch line where test light is input. The light source of the test light can be any type, but one which uses the arrayed-waveguide grating shown in Example 14 enables simple and high-speed line identification.

Embodiment 16

Figure 48:
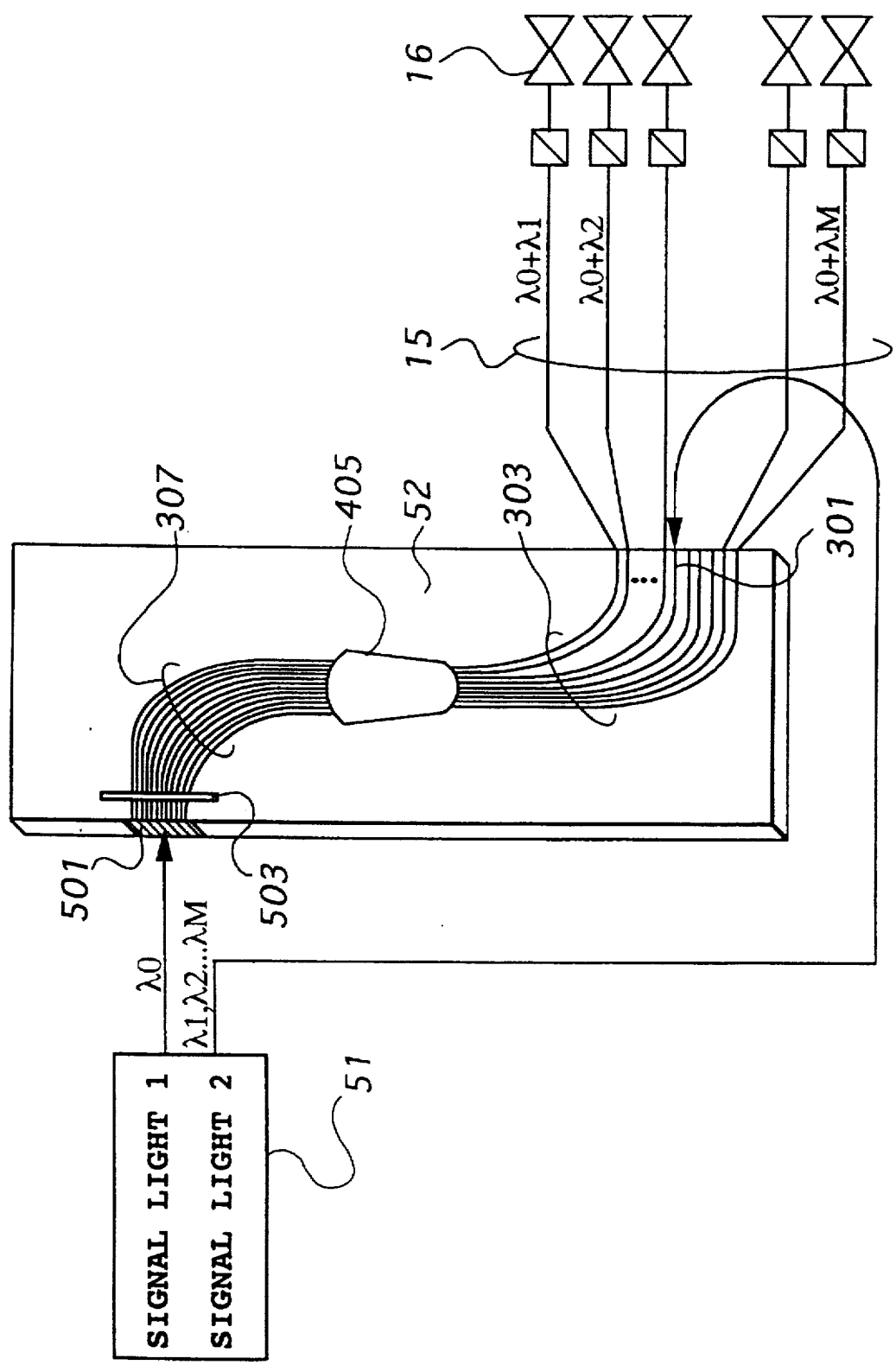
FIG. 48 is a schematic view showing construction of a communication system according to the present invention.

FIG. 48 shows a system for 1×16 and 1×1 communication of the present embodiment. The system comprises a central station 51, 16 terminals, an optical power splitter 52 with wavelength routing function, and an optical fiber line 15 for connecting these components. The central station and the individual terminals have wavelength variable light sources. Further, the optical power splitter with wavelength routing function is temperature controlled. The optical power splitter with wavelength routing function used in the present embodiment is one which is shown in Embodiment 10. Signal light 1 of 1.3 μm wavelength output from the central station is split to all terminals. Signal light 2 of 1.55 μm band output from the central station is transmitted to a specific terminal in response to the wavelength. In this case, communication is also possible between terminals and from a terminal to the central station using a desired wavelength light of 1.55 μm band.

In the present embodiment, a case of one central station is described. However, similar optical communication system can be constructed using a plurality of central stations.

As described above, with the present invention, functions of an optical power splitter for branching light to the individual output waveguides independent of the wavelength and a wavelength multiplexer for selecting an output optical waveguide depending on the wavelength can be achieved.

With the present invention, test of the individual branch lines can be carried out with reduced loss. The optical branch line test system of the present invention uses an integrated optical waveguide circuit comprising the arrayed-waveguide grating wavelength multiplexer and the optical power splitter as an optical power splitter located out of the optical signal transmission station, thereby suppressing loss of test light and signal light to a minimum. Further, since the theoretical loss in the arrayed-waveguide grating wavelength multiplexer is zero, it can deal with a case having a number of optical lines split by the optical power splitter. This is very effective for constructing a subscribe optical fiber network.

In the above embodiments, the optical power splitter of the present invention is used for testing the individual branch lines, however, the present invention is not limited to the embodiments. For example, it is also possible to transmit a large-capacity signal such as image information in a direction from the central station to other terminals to perform bidirectional communication between individual terminals and the central station using the wavelength routing function.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. An integrated optical waveguide circuit comprising:

a substrate;

an optical wavelength multiplexer formed on a surface of said substrate and composed of a first slab optical waveguide, a second slab optical waveguide, a single or a plurality of input optical waveguides connected to said first slab optical waveguide at one end of the first slab optical waveguide, an array of optical waveguides arranged in parallel and having different lengths and connected to the first slab optical waveguide and the second slab optical waveguide, and a plurality of output optical waveguides arranged in parallel and connected to the second slab optical waveguide; and an optical power splitter formed on said surface of the substrate and composed of said second slab optical waveguide, means for inputting light to said second slab optical waveguide, and said plurality of output optical waveguides arranged in parallel and connected to the second slab optical waveguide.

2. The integrated optical waveguide circuit as claimed in claim 1, further comprising: another optical power splitter formed on said surface of the substrate and composed of said first slab optical waveguide, a single or a plurality of input optical waveguides connected to said first slab optical waveguide at another end of the first slab optical waveguide, and said optical waveguides connected to said first slab optical waveguide at said one end of the first slab optical waveguide, as output optical waveguides.

3. The integrated optical waveguide circuit as claimed in claim 1, wherein said means for inputting light to said second slab optical waveguide is a single or a plurality of input optical waveguides.

4. The integrated optical waveguide circuit as claimed in claim 1, wherein said means for inputting light to said second slab optical waveguide is an optical fiber and said optical fiber is inserted in a groove formed on a surface of said second slab optical waveguide.

5. The integrated optical waveguide circuit as claimed in claim 1, wherein a wavelength filter is provided in the second slab optical waveguide.

6. An integrated optical waveguide circuit comprising:

a substrate;

an optical wavelength multiplexer formed on a surface of said substrate and composed of a first slab optical waveguide, a second slab optical waveguide, a third slab optical waveguide, means for inputting light to said first and second slab optical waveguides, a first array of optical waveguides arranged in parallel and having different lengths, a second array of optical waveguides arranged in parallel and having different lengths, said first slab optical waveguide being connected to said third slab optical waveguide via said first array of optical waveguide and said second slab optical waveguide being connected to said third slab optical waveguide via said second array of optical waveguides, and a plurality of output optical waveguides arranged in parallel and connected to the third slab optical waveguide; and an optical power splitter formed on said surface of the substrate and composed of said third slab optical waveguide, an input optical waveguide formed between said first array of optical waveguides and said second array of optical waveguides and connected to said third slab optical waveguide, and said plurality of output optical waveguides arranged in parallel and connected to the third slab optical waveguide.

7. The integrated optical waveguide circuit as claimed in claim 6, wherein said means for inputting light to said first and second slab optical waveguides is composed of an input optical waveguide and a Y-branch for branching said input optical waveguide to two branched optical waveguides, the branched optical waveguides being connected to said first and second slab optical waveguides respectively, and thermo-optic phase shifters formed, respectively, on the branched optical waveguides.

8. The integrated optical waveguide circuit as claimed in claim 6, wherein said means for inputting light to said first and second slab optical waveguides is composed of a plurality of input optical waveguides, a Mach-Zehnder interferometer for separating light to introduce into said input optical waveguide of said optical power splitter and a Y-branch, said Y-branch branches said input optical waveguide to two branched optical waveguides, the branched optical waveguides being connected to said first and second slab optical waveguides respectively, and thermo-optic phase shifters formed, respectively, on the branched optical waveguides.

9. An integrated optical waveguide circuit comprising:

a substrate;

an optical wavelength multiplexer formed on a surface of said substrate and composed of a single or a plurality of input/output optical waveguides arranged in parallel, a slab optical waveguide connected to said input/output optical waveguide(s), an array of optical waveguides arranged in parallel and having different lengths and connected to said slab optical waveguide, and a mirror being provided at an end of said array of optical waveguides and reflecting light of a specific wavelength; and an optical power splitter formed on said surface of said substrate and composed of said slab optical waveguide, a single or a plurality of input waveguides arranged in parallel and connected to said slab optical waveguide, and said input/output optical waveguides as output optical waveguides.

10. The integrated optical waveguide circuit as claimed in claim 9, wherein an angle of said input optical waveguide of said input optical waveguide of said optical power slitter at a substrate end face is not 90°; and an angle of said array of optical waveguides of said optical wavelength multiplexer other than said input optical waveguide of said optical power splitter is 90°.

11. The integrated optical waveguide circuit as claimed in claim 9, wherein a groove is provided in said array of optical waveguides of said optical wavelength multiplexer, said groove is perpendicular or nearly perpendicular to said substrate, and a waveplate is inserted in said groove so that its principal optical axis is inclined by 45° to said substrate.

12. The integrated optical waveguide circuit as claimed in claim 11, wherein said groove is provided in the vicinity of a substrate end face of said array of optical waveguides; and said waveplate is a quarter waveplate for the wavelength used in the optical wavelength multiplexer.

13. The integrated optical waveguide circuit as claimed in claim 11, wherein said waveplate is a half waveplate for the wavelength used in the optical wavelength multiplexer.

14. The integrated optical waveguide circuit as claimed in claim 9, wherein at least one end face of said output optical waveguide of said optical power splitter is optical reflection treated.

15. An optical distribution line test system, comprising:

an optical line test device for inputting test light to individual optical lines branched by an optical splitter formed only using passive optical components;

wherein said optical splitter is an optical power splitter with wavelength router comprising:

a substrate;

an optical wavelength multiplexer formed on a surface of said substrate and composed of a first slab optical waveguide, a second slab optical waveguide, a single or a plurality of input optical waveguides connected to said first slab optical waveguide at one end of the first slab optical waveguide, a array of optical waveguides arranged in parallel and having different lengths and connected to the first slab optical waveguide and the second slab optical waveguide, and a plurality of output optical waveguides arranged in parallel and connected to the second slab optical waveguide; and an optical power splitter formed on said surface of the substrate and composed of said second slab optical waveguide, means for inputting light to said second slab optical waveguide, and said plurality of output optical waveguides arranged in parallel and connected to the second slab optical waveguide;

and said optical line test device includes a wavelength variable light source and means for selecting an optical line to be tested by changing over the wavelength of the test light.

16. An optical distribution line test system, comprising:

an optical line test device for inputting test light to individual optical lines branched by an optical splitter formed only using passive optical components;

wherein said optical splitter is an optical power splitter with wavelength router comprising:
  a substrate;
  an optical wavelength multiplexer formed on a surface of said substrate and composed of a single or a plurality of input/output optical waveguides arranged in parallel, a slab optical waveguide connected to said input/output optical waveguide(s), an array of optical waveguides arranged in parallel and having different lengths and connected to said slab optical waveguide, and a mirror being provided at an end of said array of optical waveguides and reflecting light of a specific wavelength; and
  an optical power splitter formed on said surface of said substrate and composed of said slab optical waveguide, a single or a plurality of input waveguides arranged in parallel and connected to said slab optical waveguide, and said input/output optical waveguides as output optical waveguides;

and said optical line test device includes a wavelength variable light source and means for selecting an optical line to be tested by changing over the wavelength of the test light.

17. The optical distribution line test system as claimed in claim 16, wherein a groove is provided in said array of optical waveguides of said optical wavelength multiplexer; said groove is perpendicular or nearly perpendicular to said substrate, a waveplate is inserted in said groove so that its principal optical axis is inclined by 45° to said substrate; said groove is provided in the vicinity of a substrate end face of said array of optical waveguides; said waveplate is a quarter waveplate for the wavelength used in the optical wavelength multiplexer; and said optical line test device includes means for sweeping wavelength of said wavelength variable light source in a predetermined range to detect a return light intensity, and setting wavelength of the test light with respect to a wavelength of the strongest return light intensity.

18. An optical distribution line test system, comprising:

an optical line test device for inputting test light to individual optical lines branched by an optical splitter formed only using passive optical components;

wherein said optical splitter is an optical power splitter with wavelength router formed on a surface of a substrate, and said optical line test device includes a wavelength variable light source and means for selecting an optical line to be tested by changing over the wavelength of the test light; and wherein said wavelength variable light source comprises an optical amplifier, a 1×N switch, and a second optical wavelength multiplexer, connected in a ring form; and said second optical wavelength multiplexer comprises a single or a plurality of input waveguides arranged in parallel, a first slab optical waveguide, an array of optical waveguides arranged in parallel and having different lengths, a second slab optical waveguide, and a plurality of output optical waveguides arranged in parallel, being connected in series.

19. A PDS test system for line identification of individual optical lines branched by an optical splitter formed only of passive optical components comprising:

means for inputting test light from individual distribution lines to said optical splitter;

means for varying wavelength of the test light within a predetermined range;

means for measuring a return light intensity to test the individual optical lines;

wherein said optical splitter is an optical power splitter with wavelength router formed on a surface of a substrate;

wherein said means for varying wavelength comprises an optical amplifier, a 1×N switch, and a second optical wavelength multiplexer, connected in a ring form; and said second optical wavelength multiplexer comprises a single or a plurality of input waveguides arranged in parallel, a first slab optical waveguide, an of array of optical waveguides arranged in parallel and having different lengths, a second slab optical waveguide, and a plurality of output optical waveguides arranged in parallel, being connected in series.

* * * * *